(12) United States Patent
Li

(10) Patent No.: US 12,257,730 B2
(45) Date of Patent: Mar. 25, 2025

(54) BLADE-REPLACEABLE CUTTING TOOL

(71) Applicant: HANGZHOU GREAT STAR INDUSTRIAL CO., LTD., Hangzhou (CN)

(72) Inventor: Yueming Li, Hangzhou (CN)

(73) Assignee: HANGZHOU GREAT STAR INDUSTRIAL CO., LTD., Hangzhou (CN)

( * ) Notice: Subject to any disclaimer, the term of this patent is extended or adjusted under 35 U.S.C. 154(b) by 185 days.

(21) Appl. No.: 17/849,970

(22) Filed: Jun. 27, 2022

(65) Prior Publication Data

US 2022/0324124 A1 Oct. 13, 2022

Related U.S. Application Data

(60) Continuation-in-part of application No. 17/358,942, filed on Jun. 25, 2021, now Pat. No. 12,017,374,
(Continued)

(30) Foreign Application Priority Data

Dec. 27, 2016 (CN) .......................... 201621447525.0

(51) Int. Cl.
| | |
|---|---|
| B26B 5/00 | (2006.01) |
| B23D 21/10 | (2006.01) |
| B25B 7/12 | (2006.01) |
| B25B 7/14 | (2006.01) |
| B26D 3/16 | (2006.01) |
| B23D 21/06 | (2006.01) |

(52) U.S. Cl.
CPC ................ *B26B 5/00* (2013.01); *B23D 21/10* (2013.01); *B25B 7/12* (2013.01); *B25B 7/14* (2013.01); *B26D 3/16* (2013.01); *B23D 21/06* (2013.01); *B26D 3/169* (2013.01)

(58) Field of Classification Search
CPC ........... B26B 5/00; B26B 13/26; B23D 21/06; B23D 21/10; B25B 7/14; B26D 3/16; B26D 3/166; B26D 3/169
USPC ............................ 30/92, 250, 260, 353–357
See application file for complete search history.

(56) References Cited

U.S. PATENT DOCUMENTS

| | | | |
|---|---|---|---|
| 4,674,184 | A | 6/1987 | Anderson |
| 5,718,051 | A | 2/1998 | Huang |
| (Continued) | | | |

FOREIGN PATENT DOCUMENTS

| | | |
|---|---|---|
| CN | 201020671 Y | 2/2008 |
| CN | 201033435 Y | 3/2008 |
| (Continued) | | |

*Primary Examiner* — Nhat Chieu Q Do

(74) *Attorney, Agent, or Firm* — Fitch, Even, Tabin & Flannery, LLP

(57) ABSTRACT

A blade-replaceable cutting tool includes: a first handheld portion; a second handheld portion rotatably connected to the first handheld portion; a cutting structure rotatably connected to the first handheld portion, the cutting structure including a blade mounting plate rotatably mounted to the first handheld portion and a blade detachably mounted to the blade mounting plate; and a locking mechanism configured to lock the blade on the blade mounting plate when in contact with the blade, and to unlock the blade when separated from the blade, so that the blade can be detached from the blade mounting plate.

17 Claims, 26 Drawing Sheets

Related U.S. Application Data which is a division of application No. 16/344,916, filed as application No. PCT/CN2017/096468 on Aug. 8, 2017, now Pat. No. 11,045,962.

(56) References Cited

U.S. PATENT DOCUMENTS

| | | | |
|---|---|---|---|
| 6,305,087 B1 | 10/2001 | Huang | |
| 6,658,738 B1 | 12/2003 | King | |
| 7,127,819 B1* | 10/2006 | Huang | B26D 3/169 30/92 |
| 2006/0254057 A1 | 11/2006 | Houseman et al. | |
| 2008/0141538 A1 | 6/2008 | Nandkumar | |
| 2008/0307657 A1 | 12/2008 | Macsay | |
| 2010/0175267 A1* | 7/2010 | Seber | B26B 1/04 30/330 |
| 2014/0290067 A1* | 10/2014 | Ronan | B26B 13/26 30/92 |
| 2016/0059327 A1 | 3/2016 | Han | |
| 2018/0222065 A1* | 8/2018 | Chen | B26B 13/26 |
| 2018/0354044 A1* | 12/2018 | Nordlin | B23D 21/10 |
| 2019/0263009 A1 | 8/2019 | Li | |
| 2022/0193941 A1* | 6/2022 | Wilson | B26B 13/28 |

FOREIGN PATENT DOCUMENTS

| | | |
|---|---|---|
| CN | 101605637 A | 12/2009 |
| CN | 101631652 A | 1/2010 |
| CN | 201808081 U | 4/2011 |
| CN | 202781216 U | 3/2013 |
| CN | 203649525 U | 6/2014 |
| CN | 203805006 U | 9/2014 |
| CN | 205129904 U | 4/2016 |
| CN | 207373213 U | 5/2018 |
| JP | 03-038070 A | 4/1991 |
| JP | 10-328928 A | 12/1998 |
| JP | 2002253876 A | 9/2002 |
| TW | M312407 U | 5/2007 |
| WO | 2008154109 A1 | 12/2008 |

* cited by examiner

BLADE-REPLACEABLE CUTTING TOOL

This application is a continuation-in-part (CIP) application of U.S. patent application Ser. No. 17/358,942, filed Jun. 25, 2021, which is a divisional application of U.S. patent application Ser. No. 16/344,916, filed Apr. 25, 2019, now issued as U.S. Pat. No. 11,045,962, which is a national phase application of PCT/CN2017/096468, filed Aug. 8, 2017, which claims priority to Chinese Patent Application No. 201621447525.0, filed Dec. 27, 2016, the disclosures of which are incorporated herein in their entirety by reference.

FIELD OF THE INVENTION

The present invention relates to hand tools, and in particular to a blade-replaceable cutting tool.

DESCRIPTION OF THE PRIOR ART

A cutting tool, as a common tool, has a blade which will be chipped or damaged after several times of usage so that the whole tool loses its functions, resulting in a large waste of resources. If the blades are replaceable, it can better extend the service life of the tools.

For some cutting tools with simple structures, blades thereof are easy to be assembled and disassembled, and users can remove and replace the blades by themselves. However, for some cutting tools with complex structures, such as a ratchet type pipe cutter, a non-professional person cannot operate to replace blades, and once the blades are damaged, the whole cutting tool will lose its value.

Those skilled in the art devote themselves to developing a new blade-replaceable cutting tool, and regardless of whether cutting components thereof are simple fixed blade structures or complex ratchet type blade structures, blades can be easily and quickly replaced, thereby effectively extending the service life of the cutting tool to avoid a waste of resources.

SUMMARY OF THE INVENTION

The objective of the present invention is to provide a blade-replaceable cutting tool, so as to solve the technical problems in the prior art that cutting tools with complex structures, such as ratchet type pipe cutters, are difficult to replace blades and can only be eliminated as a whole after the blades are damaged.

In order to solve the above-mentioned technical problems, the present invention provides a blade-replaceable cutting tool, including: a first handheld portion; a second handheld portion rotatably connected to the first handheld portion; a blade mounting plate rotatably mounted to the first handheld portion; and a blade detachably mounted to the blade mounting plate.

Further, in different embodiments, the blade mounting plate includes: a blade mounting plate body having a front end mounted with the blade; and an arcuate plate which is provided at a rear end of the blade mounting plate body and is a part of a ratchet.

Further, in different embodiments, the arcuate plate is a part of the ratchet, which includes: ratchet teeth provided on the arcuate side wall of the arcuate plate; and a ratchet tooth clearance provided between any two adjacent ratchet teeth; wherein the second handheld portion is provided with a first buckle and/or a second buckle on the side facing the first handheld portion, which is snapped into any one of the ratchet tooth clearances.

Further, in different embodiments, the blade mounting plate includes: a blade mounting plate latch which is provided at a front end of the blade mounting plate body and is connected to the middle of the arcuate plate; and a blade mounting plate bayonet which is provided between the blade mounting plate latch and the arcuate plate and opens to the blade.

Further, in different embodiments, the blade includes: a ridge portion; a cutting edge portion provided integrally with the ridge portion; a blade latch which is provided at an edge of the blade, is provided opposite to the cutting edge portion, and is snapped into the blade mounting plate bayonet; and a blade bayonet which is provided between the blade latch and the cutting edge portion, wherein the blade mounting plate latch is snapped into the blade bayonet.

Further, in different embodiments, the blade mounting plate includes an elastic sheet mounting notch which is provided on the side of the arcuate plate away from the arcuate side wall and opens to the blade; and the blade includes a blade fixing bayonet which is provided opposite to the elastic sheet mounting notch.

Further, in different embodiments, the elastic sheet mounting notch includes a first notch portion, the opening of which is located on the side of the arcuate plate away from the arcuate side wall; and a second notch portion which is communicated to the first notch portion and is provided perpendicular to the first notch portion.

Further, in different embodiments, the blade mounting plate includes a first latch of the blade mounting plate which is provided at a front end of the blade mounting plate body; a second latch of the blade mounting plate which is provided at the middle of the blade mounting plate body and corresponds to a ridge portion; a third latch of the blade mounting plate which is provided at the middle of the blade mounting plate body and corresponds to a cutting edge portion; a first bayonet of the blade mounting plate which is provided between the first latch of the blade mounting plate and a locking member; and a second bayonet of the blade mounting plate which is provided between the second latch of the blade mounting plate and the third latch of the blade mounting plate; and the blade includes: a ridge portion; a cutting edge portion provided integrally with the ridge portion; a first latch of the blade which protrudes from the ridge portion and is snapped into the first bayonet of the blade mounting plate; a second latch of the blade which protrudes from the ridge portion and is snapped into the second bayonet of the blade mounting plate; a first bayonet of the blade which is provided at a front end of the ridge portion, the first latch of the blade mounting plate being snapped into the first bayonet of the blade and being tangent to the first latch of the blade; a second bayonet of the blade which is provided at a rear end of the ridge portion, the second latch of the blade mounting plate being snapped into the second bayonet of the blade; and a third bayonet of the blade which is provided at a rear end of the cutting edge portion, the third latch of the blade mounting plate being snapped into the third bayonet of the blade and being tangent to the second latch of the blade.

Further, in different embodiments, the blade mounting plate includes an elastic member mounting notch which is communicated to the first bayonet of the blade mounting plate; and a locking member mounting notch which is communicated to the elastic member mounting notch; the blade includes: a blade locking latch which protrudes from the first latch of the blade; and a blade locking bayonet which is enclosed by the blade locking latch, the first latch of the blade and the ridge portion; and the blade-replaceable cutting tool further includes a locking member which includes: a locking lever provided integrally, wherein the locking lever slides within the locking member mounting notch and has a front end snapped into the blade locking bayonet; a locking block which is connected to the middle of the locking lever and slides within the elastic member mounting notch; and an elastic member which is provided within the elastic member mounting notch, wherein one end of the elastic member is connected to a side wall of the locking block and the other end thereof is connected to an inner side wall of the elastic member mounting notch.

Further, in different embodiments, the blade-replaceable cutting tool further includes a first clamping plate which is attached and fixed to one side of the blade mounting plate; and a second clamping plate which is attached and fixed to the other side of the blade mounting plate; wherein a joint between the blade and the blade mounting plate is sandwiched between the first clamping plate and the second clamping plate.

Further, in different embodiments, the first clamping plate is provided with a first kidney-shaped slot; the second clamping plate is provided with a second kidney-shaped slot provided opposite to the first kidney-shaped slot; wherein the first kidney-shaped slot and the second kidney-shaped slot are provided opposite to a portion of the first notch portion and the blade fixing bayonet.

Further, in different embodiments, the blade-replaceable cutting tool further includes: a toggle lever which successively passes through the first kidney-shaped slot, the elastic sheet mounting notch and/or the blade fixing bayonet, and the second kidney-shaped slot; and an elastic sheet which is provided within the elastic sheet mounting notch; wherein one end of the elastic sheet is fixed to the blade mounting plate and the other end thereof is tangent to a side wall of the toggle lever.

Further, in different embodiments, the toggle lever includes a first toggle member and a second toggle member, wherein the first toggle member includes a first toggle knob formed integrally which is tangent to the first clamping plate and is exposed to the outside of the first clamping plate and a first toggle post which passes through the first kidney-shaped slot; and the second toggle member includes a second toggle knob formed integrally which is tangent to the second clamping plate and a second toggle post which passes through the second kidney-shaped slot and is connected to the first toggle post.

Further, in different embodiments, the elastic sheet includes: a bent portion formed integrally, which is provided within a second notch portion; and a linear portion, which is provided within a first notch portion; wherein one end of the linear portion is connected to the bent portion and the other end thereof is tangent to the side wall of the toggle lever.

Further, in different embodiments, the blade-replaceable cutting tool further includes: a blade pin mounting hole which penetrates through the blade and is located at the portion of the ridge portion close to the blade mounting plate; a first clamping plate pin mounting hole which penetrates through the first clamping plate and is provided opposite to the blade pin mounting hole; a second clamping plate pin mounting hole which penetrates through the second clamping plate and is provided opposite to the blade pin mounting hole; a pin which successively passes through the second clamping plate pin mounting hole, the blade pin mounting hole, and the first clamping plate pin mounting hole, wherein one end of the pin is provided with a pin cap and a side wall of the other end thereof is provided with a sunken positioning slot; a positioning ball which is provided at the opening of the positioning slot; and a positioning spring, wherein one end of the positioning spring is connected to the bottom of the positioning slot and the other end thereof is connected to the positioning ball.

Further, in different embodiments, the blade-replaceable cutting tool further includes: a first control hole which penetrates through the first clamping plate and is provided opposite to the locking block; and a third toggle member which protrudes from the side of the locking block facing the first clamping plate and passes through the first control hole.

Further, in different embodiments, the blade-replaceable cutting tool further includes: a second control hole which penetrates through the second clamping plate and is provided opposite to a front end of the locking lever; and a fourth toggle member which protrudes from the side of the front end of the locking lever facing the second clamping plate and passes through the second control hole.

Further, in different embodiments, the first clamping plate includes: a first clamping plate arcuate plate which is provided at a rear end of the first clamping plate and is a part of the ratchet; first clamping plate ratchet teeth which are provided on an arcuate side wall of the first clamping plate arcuate plate; and a first clamping plate ratchet tooth clearance which is provided between any two adjacent first clamping plate ratchet teeth.

Further, in different embodiments, the second clamping plate includes: a second clamping plate arcuate plate which is provided at a rear end of the second clamping plate and is a part of the ratchet; second clamping plate ratchet teeth which are provided on an arcuate side wall of the second clamping plate arcuate plate; and a second clamping plate ratchet tooth clearance which is provided between any two adjacent second clamping plate ratchet teeth.

Further, in different embodiments, the blade-replaceable cutting tool further includes: a first fastener for fixing the first clamping plate and the second clamping plate to both sides of the blade mounting plate; and a second fastener for fixing the first side wall of the first handheld portion, the first clamping plate, the blade mounting plate, the second clamping plate, and the second side wall of the first handheld portion together in sequence.

Further, in different embodiments, the first side wall of the first handheld portion is provided with a first side wall through hole of the first handheld portion; the second side wall of the first handheld portion is provided with a second side wall through hole of the first handheld portion; the first clamping plate is provided with a first clamping plate through hole; the second clamping plate is provided with a second clamping plate through hole; and the blade mounting plate is provided with a blade mounting plate through hole; wherein the second fastener successively passes through the first side wall through hole of the first handheld portion, the first clamping plate through hole, the blade mounting plate through hole, the second clamping plate through hole, and the second side wall through hole of the first handheld portion.

Further, in different embodiments, the first handheld portion includes: a first side wall of the first handheld portion; a second side wall of the first handheld portion, which is provided opposite to the first side wall of the first handheld portion; and a first handheld portion opening cavity, which is enclosed by the first side wall of the first handheld portion and the second side wall of the first handheld portion, and opens to the second handheld portion; wherein the blade mounting plate and the blade is provided within the first handheld portion opening cavity.

Further, in different embodiments, the first handheld portion further includes a first arcuate groove, which is provided at an edge of the first side wall of the first handheld portion; and a second arcuate groove, which is provided at an edge of the second side wall of the first handheld portion and is provided opposite to the first arcuate groove; wherein the first arcuate groove and the second arcuate groove are provided on both sides of the first handheld portion opening cavity, respectively.

Further, in different embodiments, the second handheld portion includes: a first side wall of the second handheld portion; a second side wall of the second handheld portion, which is provided integrally with the first side wall of the second handheld portion and opposite to each other; and a second handheld portion opening cavity, which opens to the first handheld portion.

Further, in different embodiments, the blade-replaceable cutting tool includes: a first elastic member having one end fixed to the first handheld portion and the other end fixed to the blade mounting plate; and a second elastic member having one end fixed to the first handheld portion and the other end fixed to the second handheld portion.

Further, in different embodiments, the blade-replaceable cutting tool further includes: a first pin which is perpendicularly assembled on an inner side of the two side walls of the first handheld portion, wherein the first handheld portion and the second handheld portion are rotatably sleeved on the first pin; a first buckle having a rear end rotatably sleeved on the first pin and a front end snapped into any one of the ratchet tooth clearances; and a first elastic member having one end connected to the first handheld portion and the other end connected to the first buckle. The first elastic member is a torsion spring.

Further, in different embodiments, the blade-replaceable cutting tool further includes: a second pin which is perpendicularly assembled on an inner side of the two side walls of the second handheld portion; a second buckle having a rear end rotatably sleeved on the second pin and a front end snapped into any one of the ratchet tooth clearances; and a second elastic member having one end connected to the second handheld portion and the other end connected to the second buckle. The second elastic member is a torsion spring which is sleeved on the second pin, and one end of the torsion spring is connected to the first handheld portion and the other end thereof is detachably connected to the second buckle.

Further, in different embodiments, the blade-replaceable cutting tool further includes: a third elastic member having one end fixed to the first handheld portion and the other end fixed to the blade mounting plate. The third elastic member is an extension spring.

In order to solve the above-mentioned technical problems, the present invention further provides another blade-replaceable cutting tool, including: a first handheld portion; a second handheld portion rotatably connected to the first handheld portion; and a ratchet blade which is detachably and rotatably mounted to the first handheld portion.

Further, in different embodiments, the blade-replaceable cutting tool further includes: a detachable pin, which is provided at a joint between the first handheld portion and the ratchet blade, and the first handheld portion and the ratchet blade can be rotated about the detachable pin.

Further, in different embodiments, the blade-replaceable cutting tool further includes: a first side wall through hole of the first handheld portion, which penetrates through the first side wall of the first handheld portion; a second side wall through hole of the first handheld portion, which penetrates through the second side wall of the first handheld portion; and a blade through hole, which penetrates through the ratchet blade, wherein the detachable pin successively passes through the first side wall through hole of the first handheld portion, the blade through hole, and the second side wall through hole of the first handheld portion.

Further, in different embodiments, the detachable pin includes: a hollow shaft which includes a hollow shaft sleeve and a shaft sleeve base that are formed integrally, wherein the hollow shaft sleeve successively passes through the first side wall through hole of the first handheld portion, the blade through hole, and the second side wall through hole of the first handheld portion, and the shaft sleeve base is exposed to the outside of the first side wall of the first handheld portion; and a rotating member which includes a rotating shaft and a rotating shaft base that are formed integrally, wherein the rotating shaft is inserted into and threadedly connected to the hollow shaft sleeve, and the rotating shaft base is exposed to the outside of the second side wall of the first handheld portion, and an outer surface thereof is provided with a flat or cross-shaped groove.

Further, in different embodiments, the detachable pin includes: a nut and a screw, wherein the nut is exposed to the outside of a first side wall of the first handheld portion; a front end of the screw is inserted into and threadedly connected to the nut and a rear end thereof is provided with a screw base; and the screw base is exposed to the outside of a second side wall of the first handheld portion, and an outer surface thereof is provided with a flat or cross-shaped groove.

Further, in different embodiments, the ratchet blade includes a cutting portion, an arcuate plate, and a connecting portion, wherein the cutting portion is provided at a front end of the ratchet blade; the arcuate plate is provided at a rear end of the ratchet blade; and the connecting portion is used for connecting the cutting portion and the arcuate plate, and is rotatably connected to the first handheld portion.

Further, in different embodiments, the cutting portion includes a ridge portion and a cutting edge portion, wherein the ridge portion faces the outside of the first handheld portion; and the cutting edge portion faces the second opening of the first handheld portion.

Further, in different embodiments, the cutting edge portion is linear or arcuate.

Further, in different embodiments, the arcuate plate is a part of the ratchet, which includes: ratchet teeth provided on the arcuate side wall of the arcuate plate; and a ratchet tooth clearance provided between any two adjacent ratchet teeth; wherein the second handheld portion is provided with a first buckle and/or a second buckle on the side facing the first handheld portion, which is snapped into any one of the ratchet tooth clearances.

Further, in different embodiments, the arcuate plate includes an arcuate plate retaining hole which penetrates through one end of the arcuate plate and is snapped by one end of a third elastic member.

Further, in different embodiments, the connecting portion includes a connecting portion retaining slot which is sunken to a side wall of the connecting portion and is snapped by one end of the third elastic member.

Further, in different embodiments, the first handheld portion includes: a first side wall of the first handheld portion; a second side wall of the first handheld portion, which is provided opposite to the first side wall of the first handheld portion; and a first handheld portion opening cavity, which is enclosed by the first side wall of the first handheld portion and the second side wall of the first handheld portion, and includes a first opening of the first handheld portion and a second opening of the first handheld portion, wherein the first opening of the first handheld portion faces the direction of the second handheld portion; the second opening of the first handheld portion faces the outside of the first handheld portion; and a part of the ratchet blade is provided within the first handheld portion opening cavity.

Further, in different embodiments, the first handheld portion further includes a first arcuate groove, which is provided at an edge of the first side wall of the first handheld portion; and a second arcuate groove, which is provided at an edge of the second side wall of the first handheld portion and is provided opposite to the first arcuate groove; wherein the first arcuate groove and the second arcuate groove are provided on both sides of the second opening, respectively.

Further, in different embodiments, the second handheld portion includes: a first side wall of the second handheld portion; a second side wall of the second handheld portion, which is provided integrally with the first side wall of the second handheld portion and opposite to each other; and a second handheld portion opening cavity, which opens to the first handheld portion.

Further, in different embodiments, the blade-replaceable cutting tool further includes: a first pin which is perpendicularly assembled on an inner side of the two side walls of the first handheld portion, wherein the first handheld portion and the second handheld portion are rotatably sleeved on the first pin; a first buckle having a rear end rotatably sleeved on the first pin and a front end snapped into any one of the ratchet tooth clearances; and a first elastic member having one end connected to the first handheld portion and the other end connected to the first buckle.

Further, in different embodiments, the first elastic member is an extension spring.

Further, in different embodiments, the blade-replaceable cutting tool further includes: a second pin which is perpendicularly assembled on an inner side of the two side walls of the second handheld portion; a second buckle having a rear end rotatably sleeved on the second pin and a front end snapped into any one of the ratchet tooth clearances; and a second elastic member having one end connected to the second handheld portion and the other end connected to the second buckle.

Further, in different embodiments, the second elastic member is a torsion spring which is sleeved on the second pin, and one end of the torsion spring is connected to the first handheld portion and the other end thereof is detachably connected to the second buckle.

Further, in different embodiments, the blade-replaceable cutting tool further includes: a third elastic member having one end fixed to the first handheld portion and the other end fixed to the blade ratchet blade.

Further, in different embodiments, the third elastic member is a torsion spring which is sleeved on a torsion spring mounting shaft, one end of the third elastic member is connected to the first handheld portion and the other end thereof is connected to the ratchet blade; and both ends of the torsion spring mounting shaft are perpendicularly fixed to the inner side of the two side walls of the first handheld portion.

Further, in different embodiments, one end of the torsion spring is fixed to the first handheld portion and the other end thereof is snapped into an arcuate plate retaining hole of the ratchet blade or a connecting portion retaining slot.

In order to solve the above-mentioned technical problems, the present invention further provides another blade-replaceable cutting tool, including:

a first handheld portion;
a second handheld portion rotatably connected to the first handheld portion;
a cutting structure rotatably connected to the first handheld portion,
wherein the cutting structure includes:
a blade mounting plate rotatably mounted to the first handheld portion; and
a blade detachably mounted to the blade mounting plate; and
a locking mechanism configured to lock the blade on the blade mounting plate when in contact with the blade, and to unlock the blade when separated from the blade, so that the blade can be detached from the blade mounting plate.

Further, the cutting structure further includes:
a first clamping plate attached and fixed to one side of the blade mounting plate; and
a second clamping plate attached and fixed to the other side of the blade mounting plate,
wherein a joint between the blade and the blade mounting plate is sandwiched between the first clamping plate and the second clamping plate.

Further, the locking mechanism includes a toggle component and an elastic component, the elastic component is connected to the blade mounting plate and the toggle component respectively, and the toggle component is movably connected to the blade mounting plate and configured to be in contact with the blade to lock the blade under the action of an elastic force of the elastic component, and to overcome the elastic force and move to separate from the blade under the action of an external force, thereby unlocking the blade.

Further, the blade mounting plate includes an elastic sheet mounting notch which opens to the toggle component; and the elastic component is provided within the elastic sheet mounting notch, one end of the elastic component is connected to the blade mounting plate, and at least a part of the elastic component is attached to the toggle component; and
the blade includes a blade fixing bayonet, and at least a part of the toggle component can be snapped into the blade fixing bayonet.

Further, the toggle component is a toggle sheet rotatably connected to the first clamping plate and the second clamping plate, one side of the toggle sheet is in contact with at least a part of the elastic component, and the elastic component exerts an elastic force on the toggle sheet to make the toggle sheet rotate towards the blade.

Further, the toggle sheet is provided with a latch portion on the side facing the blade, and the latch portion can be snapped into the blade fixing bayonet.

Further, the toggle sheet includes a toggle portion that is exposed to the outside of the first clamping plate and the second clamping plate.

Further, the blade mounting plate further includes:
a blade mounting plate body having one end mounted with the blade; and
an arcuate plate provided on the other end of the blade mounting plate body; and
the elastic sheet mounting notch is provided on the side of the arcuate plate away from its arcuate side wall.

Further, the arcuate plate is a part of a ratchet, which includes:
ratchet teeth provided on the arcuate side wall of the arcuate plate; and
a ratchet tooth clearance provided between any two adjacent ratchet teeth, wherein the second handheld portion is provided with a first buckle and/or a second buckle on the side facing the first handheld portion, which is snapped into any one of the ratchet tooth clearances.

Further, the blade mounting plate includes:

at least one blade mounting plate latch; and at least one blade mounting plate bayonet which opens to the blade;

the blade includes:

a ridge portion;

a cutting edge portion provided integrally with the ridge portion;

at least one blade latch snapped into a corresponding one of the blade mounting plate bayonets; and at least one blade bayonet snapped into a corresponding one of the blade mounting plate latches;

the blade mounting plate latch is provided on one end of the blade mounting plate body opposite to the arcuate plate, and the blade mounting plate bayonet is provided between the blade mounting plate latch and the arcuate plate; and the blade latch is provided at an edge of the blade and is provided opposite to the cutting edge portion, and the blade bayonet is provided between the blade latch and the cutting edge portion.

Further, the cutting tool further including a movable portion that is movably connected to one end of the first handheld portion mounted with the blade, and forms a groove for accommodating a pipe with the first handheld portion; and the movable portion is configured to be able to move in a length direction of the first handheld portion to adjust the size of the groove.

Further, the cutting tool further including a locking assembly provided at a joint between the movable portion and the first handheld portion, and the locking assembly is configured to lock the movable portion at a preset position of the first handheld portion when in a first state, and to unlock the movable portion when in a second state.

Further, the movable portion includes a first movable portion and a second movable portion that are provided oppositely, the first handheld portion includes a first side wall and a second side that are provided oppositely, the first movable portion is movably connected to the first side wall, and the second movable portion is movably connected to the second side wall; and the locking assembly is provided at a joint between the first movable portion and the first side wall.

Further, the first side wall includes a first guide rail, and the first movable portion includes a first chute that is sleeved on the first guide rail and configured to be movable in the first guide rail; and the second side wall includes a second guide rail, and the second movable portion includes a second chute that is sleeved on the second guide rail and configured to be movable in the second guide rail.

Further, the locking assembly includes a button, an elastic element, and a blocking sheet, one end of the button successively passes through the first movable portion and the first side wall and faces the blocking sheet, the elastic element is located between the button and the blocking sheet, and the button is configured to lock the first movable portion at the preset position of the first side wall when not subjected to an external force, and to be able to overcome an elastic force of the elastic element and move in the direction of the blocking sheet to unlock the first movable portion when subjected to the external force.

Further, the first movable portion includes a first through hole and a second through hole that are opposite to each other, and the first through hole and the second through hole are communicated with a first channel respectively; the first guide rail includes a third through hole; and the button successively passes through the second through hole, the third through hole, and the first through hole, and is configured to be able to move in a length direction of the third through hole.

Further, one end of the button facing the blocking sheet is provided with at least one protruding portion, and the side of the first side wall facing the blocking sheet is provided with a plurality of parallel limiting slots, the protruding portion is configured to lock the first movable portion at the preset position when falling into the limiting slot, and to be able to be disengaged from the limiting slot when the button moves in the direction of the blocking sheet, so that the button can move in the length direction of the third through hole.

Further, one end of the third through hole is provided with at least one slot recessed in the direction of the limiting slot, and the protruding portion of the button is configured to be able to pass through the slot from one side of the first guide rail to the other side of the first guide rail.

Further, the second through hole is provided in a stepped shape and includes a second portion close to the third through hole and a first portion away from the third through hole, and the inner diameter of the second portion is smaller than that of the first portion; and the button includes a pressing portion, which matches the shape of the second through hole and includes a third portion that matches the second portion and a fourth portion that cooperates with the first portion, and the button is configured to be blocked when moving toward the blocking sheet until the fourth portion is in contact with the second portion, such that the protruding portion is disengaged from the limiting slot.

Further, the first handheld portion is provided with scales to display the pipe diameter of the pipe that can be cut by the movable portion at a current position.

The beneficial effect of the present invention is in that the present invention provides a blade-replaceable cutting tool, which can achieve the quick replacement of the blade and is simple to operate and convenient to use; and it requires lower manipulative ability, and an ordinary user can replace the blade, which can effectively extend the overall service life of the cutting tool. In addition, in the present invention, the opening size of the cutting tool can be adjusted so as to be suitable for pipes of different sizes.

Figure 1:
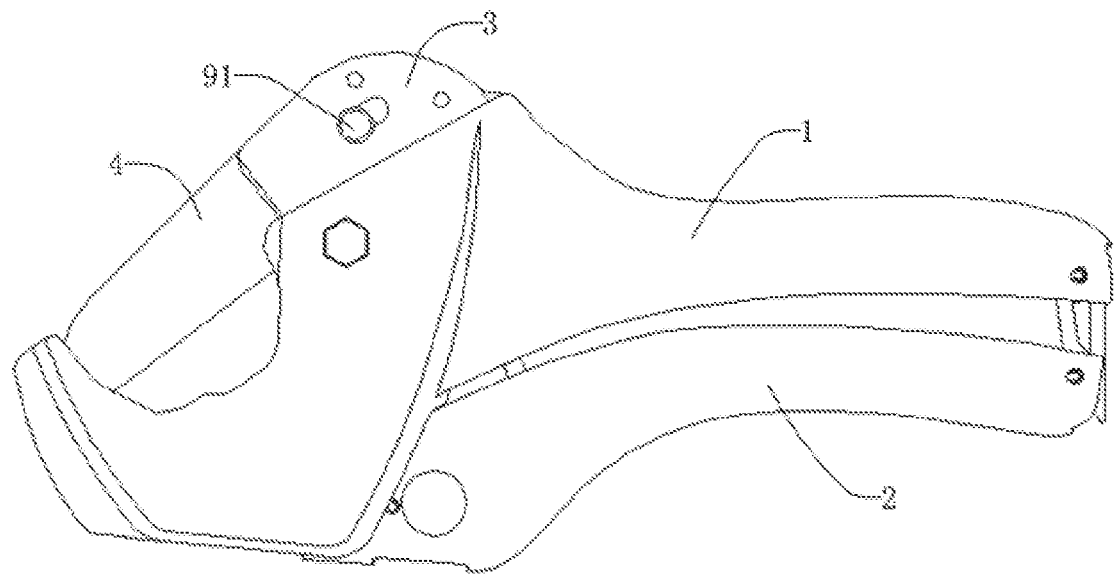
FIG. 1 is a schematic view of the overall structure of Embodiment 1 of the present invention in a locked state.

1 first handheld portion, 2 second handheld portion, 3 blade mounting plate, 4 blade, 5 ratchet blade;

6 detachable pin, 7 first clamping plate, 8 second clamping plate, 9 first fastener, 10 second fastener;

11 first side wall of the first handheld portion, 12 second side wall of the first handheld portion, 13 first handheld portion opening cavity;

14 first pin, 15 first buckle, 16 first elastic member, 17, first arcuate groove;

18 second arcuate groove, 19 third elastic member, 20 torsion spring mounting shaft;

21 first side wall of the second handheld portion, 22 second side wall of the second handheld portion, 23 second handheld portion opening cavity;

24 second pin, 25 second buckle, 26 second elastic member, 27 handheld portion fixing device;
31 blade mounting plate body, 32 arcuate plate, 33 blade mounting plate through hole, 34 blade mounting plate latch;
35 blade mounting plate bayonet, 36 elastic sheet mounting notch; 41 ridge portion, 42 cutting edge portion, 43 blade latch, 44 blade bayonet, 45 blade fixing bayonet, 46 blade pin mounting hole;
51 cutting portion, 52 arcuate plate, 53 connecting portion, 54 blade through hole;
61 hollow shaft, 62 rotating member, 63 nut, 64 screw, 65 screw base;
71 first clamping plate through hole, 72 first kidney-shaped slot, 73 first clamping plate pin mounting hole, 74 first control hole;
75 first clamping plate arcuate plate, 76 first clamping plate ratchet teeth, 77 first clamping plate ratchet tooth clearance;
81 second clamping plate through hole, 82 second kidney-shaped slot, 83 second clamping plate pin mounting hole, 84 second control hole;
85 second clamping plate arcuate plate, 86 second clamping plate ratchet teeth, 87 second clamping plate ratchet tooth clearance;
91 toggle lever, 92 elastic sheet, 93 locking member, 94 fourth elastic member;
95 pin, 96 positioning ball, 97 positioning spring, 98 pin cap, 99 positioning slot;
101 nut base, 102 stem nut, 103 screw base, 104 screw;
111 first side wall through hole of the first handheld portion; 121 second side wall through hole of the first handheld portion;
131 first opening of the first handheld portion, 132 second opening of the first handheld portion;
311 first latch of the blade mounting plate, 312 second latch of the blade mounting plate;
313 third latch of the blade mounting plate, 314 first bayonet of the blade mounting plate;
315 second bayonet of the blade mounting plate, 316 elastic member mounting notch, 317 locking member mounting notch;
321 ratchet teeth, 322 ratchet tooth clearance; 361 first notch portion, 362 second notch portion;
411 first latch of the blade, 412 second latch of the blade, 413 first bayonet of the blade, 414 second bayonet of the blade;
415 third bayonet of the blade, 416 blade locking latch, 417 blade locking bayonet;
511 ridge portion, 512 cutting edge portion, 521 ratchet teeth, 522 ratchet tooth clearance;
531 connecting portion snap slot, 532 arcuate plate snap hole;
611 hollow shaft sleeve, 612 shaft sleeve base, 621 rotating shaft, 622 rotating shaft base;
911 first toggle knob, 912 first toggle post, 913 second toggle knob, 914 second toggle post;
921 linear portion, 922 bent portion;
931 locking lever, 932 locking block, 933 third toggle member, 934 fourth toggle member;
47 blade fixing latch, 630 second elastic sheet mounting notch, 631 first notch, 632 second notch, 640 first protruding portion, 650 toggle sheet, 656 toggle portion, 651 first side, 652 second side, 653 pin hole, 654 latch portion, 655 bayonet portion, 656 toggle portion;
78 movable portion, 781 first movable portion, 7811 first side, 7812 second side, 7813 first through hole, 7814 second through hole, 7815 first portion, 7816 second portion, 7817 fourth slot, 7818 sunken slot, 782 second movable portion, 791 first guide rail, 7911 first vertical portion, 7912 first side wing, 7913 second side wing, 7914 third through hole, 7915 limiting slot, 7916 third slot, 792 second guide rail, 801 first chute, 802 second chute, 8011 first channel, 8012 first slot, 8013 second slot, 8013 first opening, 8023 second opening, 100 locking assembly, 1001 button, 10011 pressing portion, 10012 guide post, 10013 protruding portion, 10014 fourth hole, 10015 third portion, 10016 fourth portion, 1002 elastic element, 1003 blocking sheet, 1000 scale.

DETAILED DESCRIPTION OF THE PREFERRED EMBODIMENTS

The preferred embodiments of the present invention will be described fully hereafter with reference to the accompanying drawings of the description, so that the technical contents thereof will be more clearly and easily understood. The present invention may be embodied in many different forms of embodiments, and the protection scope thereof is not limited to the embodiments mentioned herein.

In the drawings, the components having same structures are denoted by same reference numerals, and the components having similar structures or functions are denoted by similar reference numerals. The dimension and thickness of each of the components shown in the drawings are shown arbitrarily, and the present invention does not limit the dimension and thickness of each of the components. In order to make the illustration clearer, the thickness of the components is appropriately exaggerated in some places in the drawings.

The directional words mentioned in the present invention such as upper, lower, front, rear, left, right, inner, outer, side, top, bottom, top end, bottom end, distal end, etc., are only the directions in the drawings and are only intended to explain and illustrate the present invention, but not to limit the protection scope of the present invention.

When a certain component is described as being "on" another component, the component may be placed directly on another component; and an intermediate component may also be present, on which the component is placed, and the intermediate component is placed on another component. When a component is described as being "mounted to" or "connected to" another component, the two may be understood to be directly "mounted" or "connected", or one component is indirectly "mounted to" or "connected to" another component via an intermediate component.

Embodiment 1

Figure 2:
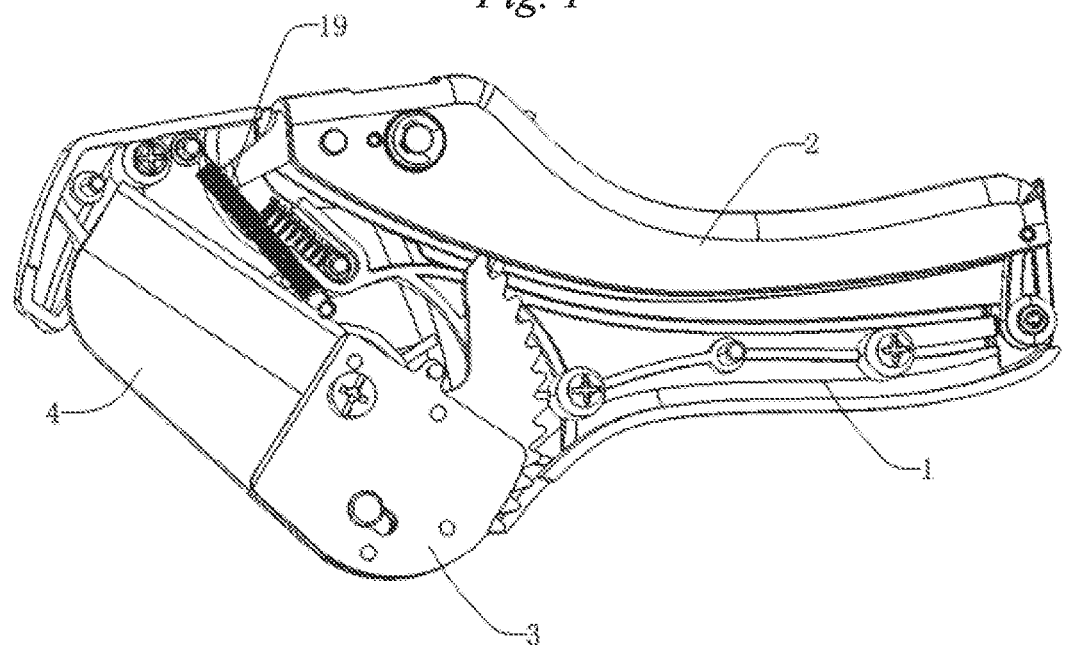
FIG. 2 is a structural schematic view of Embodiment 1 of the present invention with a first side wall of a first handheld portion removed.

As shown in FIGS. 1 to 2, this embodiment provides a blade-replaceable cutting tool, including a first handheld portion 1, a second handheld portion 2, a blade mounting plate 3, and a blade 4.

Figure 3:
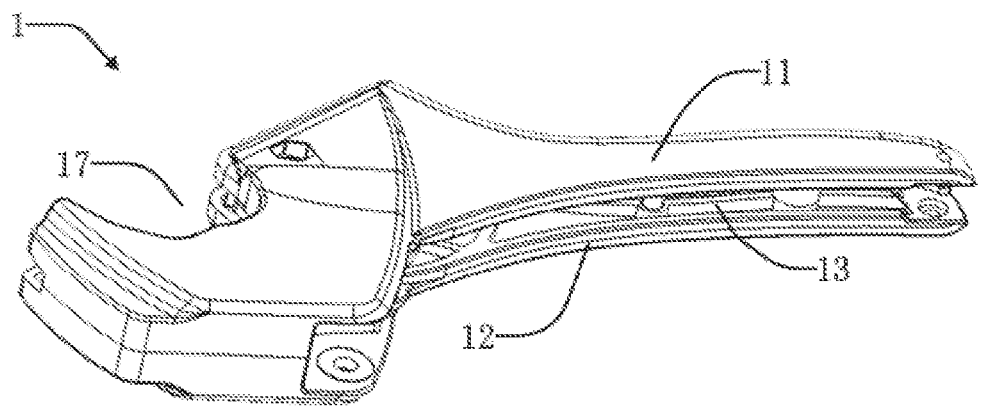
FIG. 3 is a structural schematic view of the first handheld portion according to Embodiment 1 of the present invention.

As shown in FIG. 3, the first handheld portion 1 includes a first side wall 11 of the first handheld portion and a second side wall 12 of the first handheld portion which are opposite to each other and provided integrally, and the first side wall 11 of the first handheld portion and the second side wall 12 of the first handheld portion enclose a first handheld portion opening cavity 13 which opens to the second handheld portion 2; and the blade mounting plate 3 and a part of the blade 4 are provided within the first handheld portion opening cavity 13.

Figure 4:
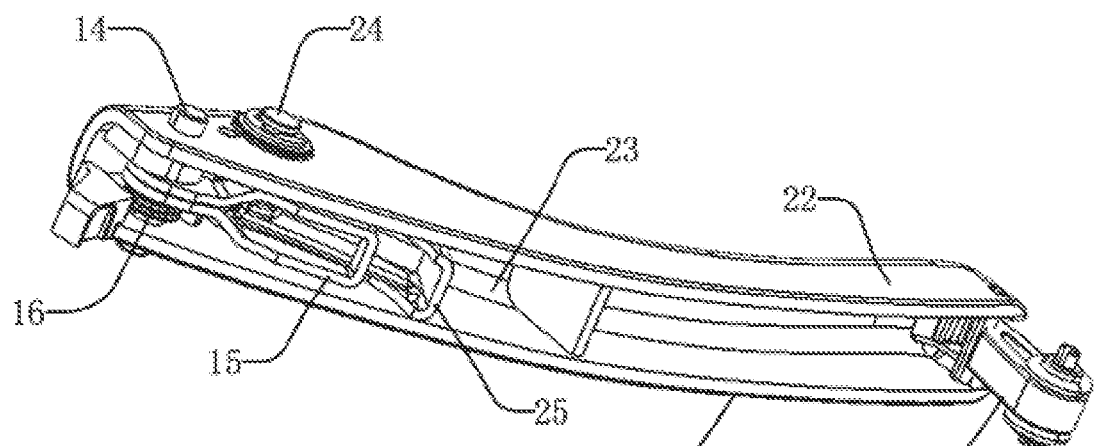
FIG. 4 is a structural schematic view of a second handheld portion according to Embodiment 1 of the present invention.
Figure 5:
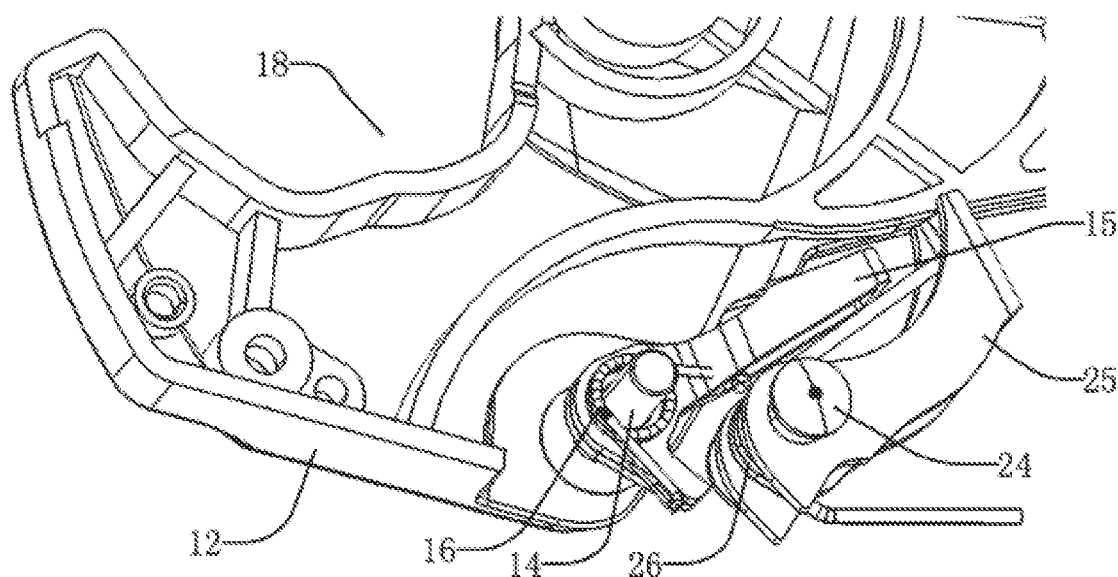
FIG. 5 is a structural schematic view of some components inside the first and second handheld portions according to Embodiment 1 of the present invention.

As shown in FIG. 4, this embodiment further includes a first pin 14, a first buckle 15, and a first elastic member 16, and the first pin 14 is perpendicularly assembled to an inner side of the two side walls 11, 12 of the first handheld portion 1; and the first handheld portion 1 and the second handheld portion 2 are rotatably sleeved on the first pin 14. A rear end of the first buckle 15 is rotatably sleeved on the first pin 14 and a front end thereof is snapped into any ratchet tooth clearance 322. One end of the first elastic member 16 is connected to the first handheld portion 1 and the other end thereof is connected to the first buckle 15, and the first elastic member 16 in this embodiment is preferably a torsion spring, so that the first buckle 15 can be rotated within a certain range. As shown in FIGS. 4 to 5, the end of the first handheld portion 1 mounted with the blade 4 further includes a first arcuate groove 17 and a second arcuate groove 18, and the first arcuate groove 17 is provided at an edge of the first side wall 11 of the first handheld portion; the second arcuate groove 18 is provided at an edge of the second side wall 12 of the first handheld portion and is provided opposite to the first arcuate groove 17; and the first arcuate groove 17 and the second arcuate groove 18 are provided on both sides of the opening of the first handheld portion opening cavity 13, respectively, and the two arcuate grooves 17, 18 are used for placing and fixing a pipe to achieve the function of cutting the pipe. The blade 4 directly faces the first handheld portion opening cavity 13, and falls into the first handheld portion opening cavity 13 after the cutting process is completed.

As shown in FIGS. 4 to 5, the second handheld portion 2 is rotatably connected to the first handheld portion 1. The second handheld portion 2 includes a first side wall 21 of the second handheld portion and a second side wall 22 of the second handheld portion which are opposite to each other and provided integrally, the first side wall 21 of the second handheld portion and the second side wall 22 of the second handheld portion enclose a second handheld portion opening cavity 23, and the second handheld portion opening cavity 23 opens to the first handheld portion 1.

As shown in FIGS. 4 to 5, this embodiment further includes a second pin 24, a second buckle 25, and a second elastic member 26, and the second pin 24 is perpendicularly assembled to the inner side of the two side walls 21, 22 of the second handheld portion 2. A rear end of the second buckle 25 is rotatably sleeved on the second pin 24 and a front end thereof is snapped into any one of the ratchet tooth clearances 322; and one end of the second elastic member 16 is connected to the second handheld portion 2 and the other end thereof is connected to the second buckle 25. The second elastic member 26 is preferably a torsion spring which is sleeved on the second pin 24, and one end of the torsion spring is connected to the first handheld portion 1 and the other end thereof is detachably connected to the second buckle 25, so that the second buckle 25 can be rotated within a certain range. In this embodiment, the first buckle 15 or the second buckle 25, under the action of the first elastic member 16 or the second elastic member 26, is snapped into the ratchet tooth clearance at an appropriate position, and during the cutting of the pipe, the two buckles can assist the blade in exerting a force to cut the pipe located between the blade 4 and the two arcuate grooves 17, 18, thereby achieving a labor-saving effect. The pipe will vibrate during the cutting, resulting in discomfort of a user's hand, and the first elastic member 16 or the second elastic member 26 may have the function of damping and cushioning. The first elastic member 16 and the second elastic member 26 may assist in closing or opening of the first handheld portion 1 and the second handheld portion 2, and the operation principle thereof is the same as that of the same type of pipe cutter and will not be described here.

As shown in FIG. 2, this embodiment further includes a third elastic member 19 having one end connected to the first handheld portion 1 and the other end connected to the blade mounting plate 3, and the third elastic member 19 is preferably an extension spring. In this embodiment, during the opening or closing of the first handheld portion 1 and the second handheld portion 2, the third elastic member 19 assists in exerting a force or limits the range of movement of the blade mounting plate 3 and the blade 4, which can ensure that the opening angle is within an appropriate range to prevent the components from being damaged and to reduce the security risk during use.

A distal end of the second handheld portion 2 is provided with a handheld portion fixing device 27 having one end hinged to the distal end of the second handheld portion 2 and the other end detachably mounted to a distal end of the first handheld portion 1 for closing the first handheld portion 1 and the second handheld portion 2.

Figure 6:
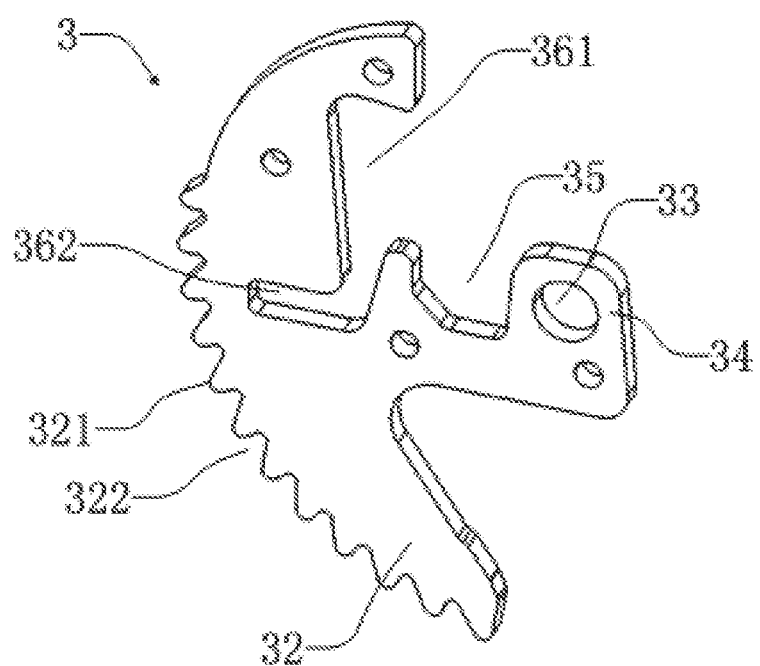
FIG. 6 is a structural schematic view of a blade mounting plate according to Embodiment 1 of the present invention.

As shown in FIG. 6, the blade mounting plate 3 is rotatably mounted to the first handheld portion 1, and includes a blade mounting plate through hole 33, and the blade mounting plate 3 can be rotated with the central axis of the blade mounting plate through hole 33 as the axis of rotation. The blade 4 is detachably mounted to the blade mounting plate 3, preferably, the blade 4 is in the same plane as the blade mounting plate 3, and is integrally combined with the blade mounting plate 3, and the outer edge shape, the working principle and the functions thereof are substantially equivalent to that of a complete ratchet blade. The blade mounting plate 3 includes a blade mounting plate body 31 having a front end mounted with the blade 4 and a rear end provided with an arcuate plate 32, the arcuate plate 32 is a part of a ratchet, the arcuate plate 32 includes an arcuate side portion and a non-arcuate side portion, and a side wall thereof includes an arcuate side wall and a non-arcuate side wall; the arcuate side wall of the arcuate plate 32 is provided with a plurality of equally spaced ratchet teeth 321, and faces the second handheld portion 2; and a ratchet tooth clearance 322 is formed between any two adjacent ratchet teeth 321 so that the first buckle 15 or the second buckle 25 provided within the second handheld portion opening cavity 23 is snapped into any one of the ratchet tooth clearances 322.

This embodiment is opened and closed when in use, the first handheld portion 1 and the second handheld portion 2 are relatively rotated, and the arcuate plate 32 of the blade mounting plate 3 cooperates with the first buckle 15 and the second buckle 25, so that the blade 4 can achieve an effective cutting operation, the working principle of which is the same as that of an existing ratchet type pipe cutter and will not be described here.

Figure 7:
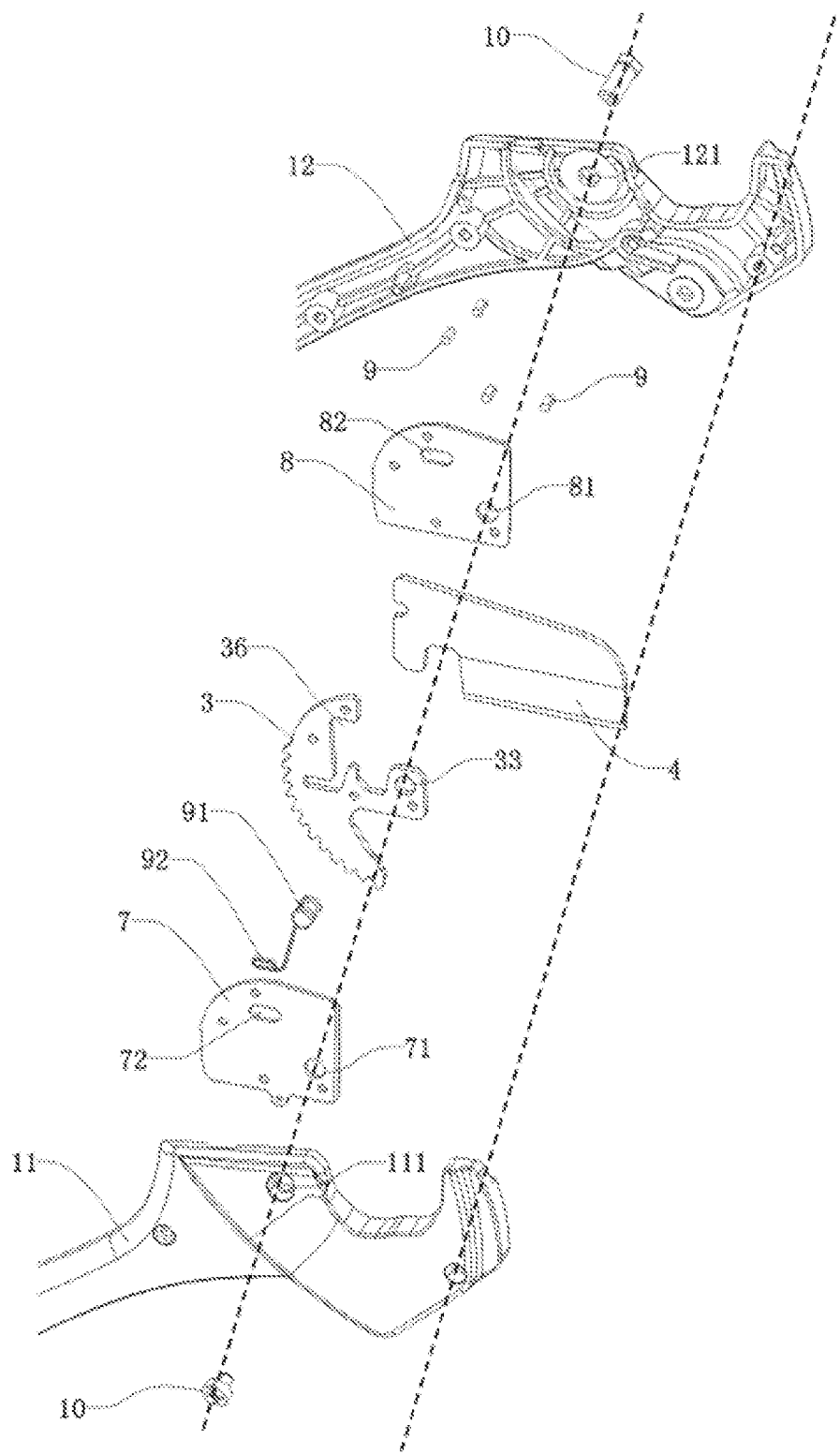
FIG. 7 is an exploded structural schematic view of a cutting structure and the first handheld portion according to Embodiment 1 of the present invention.

As shown in FIG. 7, this embodiment further includes a first clamping plate 7 and a second clamping plate 8 for fixing the blade 4 and the blade mounting plate 3. The first clamping plate 7 is attached and fixed to one side of the blade mounting plate 3; the second clamping plate 8 is attached and fixed to the other side of the blade mounting plate 3; and a joint between the blade 4 and the blade mounting plate 3 is sandwiched between the first clamping plate 7 and the second clamping plate 8.

This embodiment further includes a first fastener 9 and a second fastener 10. The first fastener 9 fixes the first clamping plate 7 and the second clamping plate 8 to both sides of the blade mounting plate 3; edges of the first clamping plate 7, the second clamping plate 8, and the blade mounting plate 3 are provided with a plurality of fastener mounting holes (not shown) in positions corresponding to them, respectively, and the first fastener 9 includes, but is not limited to, a rivet or a bolt, and successively passes through the first clamping plate 7, the blade mounting plate 3, and the second clamping plate 8, thereby assembling the first clamping plate 7, the second clamping plate 8, and the blade mounting plate 3 together.

The second fastener 10 successively assembles the first side wall 11 of the first handheld portion, the first clamping plate 7, the blade mounting plate 3, the second clamping plate 8, and the second side wall 12 of the first handheld portion together, so that the blade mounting plate 3 is hinged to the first handheld portion 1, both of which may be relatively rotated.

Specifically, the first side wall 11 of the first handheld portion is provided with a first side wall through hole 111 of the first handheld portion; the second side wall 12 of the first handheld portion is provided with a second side wall through hole 121 of the first handheld portion; the first clamping plate 7 is provided with a first clamping plate through hole 71; the second clamping plate 8 is provided with a second clamping plate through hole 81; and the blade mounting plate 3 is provided with a blade mounting plate through hole 33. The second fastener 10 includes, but is not limited to, a bolt, and successively passes through the first side wall through hole 111 of the first handheld portion, the first clamping plate through hole 71, the blade mounting plate through hole 33, the second clamping plate through hole 81, and the second side wall through hole 121 of the first handheld portion.

Figure 8:
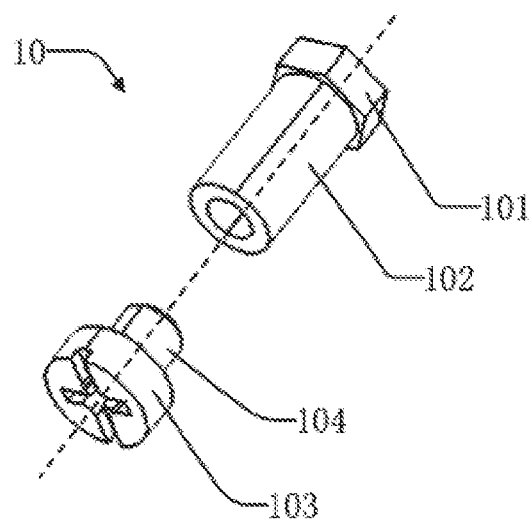
FIG. 8 is a structural schematic view of a second fastener according to Embodiment 1 of the present invention.

As shown in FIGS. 7 to 8, the second fastener 10 is preferably a bolt including a nut portion and a screw portion, the nut portion includes a nut base 101 and a stem nut 102 which are formed integrally, and the screw portion includes a screw base 103 and a screw 104 which are formed integrally. The nut base 101 is attached to an outer surface of the first side wall 11 of the first handheld portion; and the screw base 103 is attached to an outer surface of the second side wall 12 of the first handheld portion. The stem nut 102 is perpendicularly fixed to the nut base 101, and successively passes through the first side wall through hole 111 of the first handheld portion, the first clamping plate through hole 71, the blade mounting plate through hole 33, the second clamping plate through hole 81, and the second side wall through hole 121 of the first handheld portion. The stem nut 102 is provided with a threaded cavity at its center, and the screw 104 is rotatably and threadedly connected to the threaded cavity for adjusting the relative position of the nut base 101 and the screw base 103.

The blade mounting plate 3, the blade 4, the first clamping plate 7, and the second clamping plate 8 collectively constitute a cutting structure, and the cutting structure of this embodiment is a ratchet type component.

As shown in FIG. 6, in this embodiment, the blade mounting plate 3 includes a blade mounting plate latch 34 and a blade mounting plate bayonet 35. The blade mounting plate latch 34 is provided at a front end of the blade mounting plate body 31 and is connected to the non-arcuate side portion at the middle of the arcuate plate 32; and the blade mounting plate bayonet 35 is provided between the blade mounting plate latch 34 and the arcuate plate 32 and opens to the blade 4.

Figure 9:
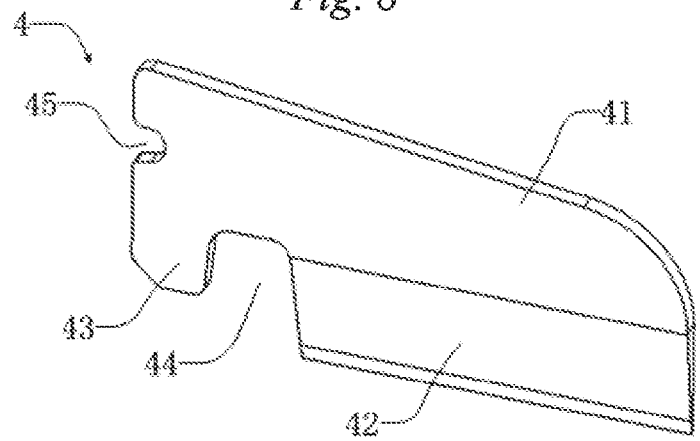
FIG. 9 is a structural schematic view of a blade according to Embodiment 1 of the present invention.

As shown in FIGS. 6 and 9, in this embodiment, the blade 4 includes a ridge portion 41 and a cutting edge portion 42 which are provided integrally, and further includes a blade latch 43 and a blade bayonet 44. The blade latch 43 is provided at an edge of the blade 4 and is provided opposite to the cutting edge portion 42 and is in the same direction as the cutting edge portion 42, and the blade latch 43 is snapped into the blade mounting plate bayonet 35. The blade bayonet 44 is provided between the blade latch 43 and the cutting edge portion 42 and the blade mounting plate latch 34 is snapped into the blade bayonet 44, so that the blade mounting plate 3 is assembled integrally with the blade 4 and remains relatively stable.

As shown in FIGS. 6, 7 and 9, the blade mounting plate 3 further includes an elastic sheet mounting notch 36, and the elastic sheet mounting notch 36 is provided on the side of the arcuate plate 32 away from the arcuate side wall, opens to the blade 4 and is used to assemble the elastic sheet. The elastic sheet mounting notch 36 includes a first notch portion 361 and a second notch portion 362, and the opening of the first notch portion 361 is located on the side of the arcuate plate 32 away from the arcuate side wall; and the second notch portion 362 is communicated to the first notch portion 361 and is provided perpendicular to the first notch portion 361. The blade 4 includes a blade fixing bayonet 45 which is provided opposite to the elastic sheet mounting notch 35, specifically, which directly faces a part of the first notch portion 361.

As shown in FIG. 7, the first clamping plate 7 is provided with a first kidney-shaped slot 72; the second clamping plate 8 is provided with a second kidney-shaped slot 82 provided opposite to the first kidney-shaped slot 72; and the first kidney-shaped slot 72 and the second kidney-shaped slot 82 are provided opposite to a part of the first notch portion 361 and the blade fixing bayonet 45, which constitute a toggle through hole penetrating through all of the first clamping plate 7, the blade mounting plate 3, and the second clamping plate 8 for placing the toggle lever 91.

Figure 10:
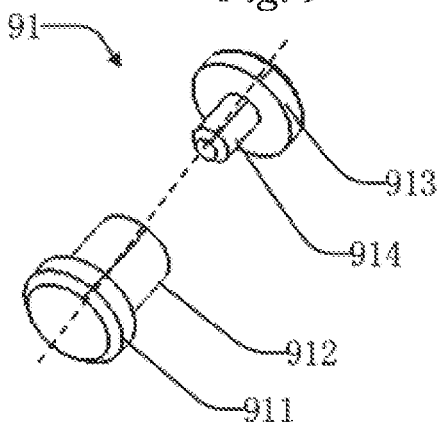
FIG. 10 is a structural schematic view of a toggle lever according to Embodiment 1 of the present invention.

As shown in FIGS. 7 and 10, this embodiment further includes a toggle lever 91, and the toggle lever 91 successively passes through the first kidney-shaped slot 72, the elastic sheet mounting notch 36 and/or the blade fixing bayonet 45, and the second kidney-shaped slot 82. The toggle lever 91 includes a first toggle member and a second toggle member which are connected to each other. The first toggle member includes a first toggle knob 911 and a first toggle post 912 which are formed integrally, and the second toggle member includes a second toggle knob 913 and a second toggle post 914 which are formed integrally.

As shown in FIGS. 1, 2, and 10, the first toggle member and the second toggle member are respectively inserted into the first kidney-shaped slot 72 and the second kidney-shaped slot 82 from both sides of the blade mounting frame 3 and are combined into a toggle lever 91. The first toggle knob 911 is tangent to the first clamping plate 71 and is exposed to the outside of the first clamping plate 7; and the second toggle knob 913 is tangent to the second clamping plate 82 and is exposed to the outside of the second clamping plate 8. The first toggle post 912 passes through the first kidney-shaped slot 72; and the second toggle post 914 passes through the second kidney-shaped slot 82 and is connected to the first toggle post 912. The middle of the first toggle post 912 is a threaded cavity, and the second toggle post 914 is inserted into the cavity of the first toggle post 912. The first toggle knob 911 is exposed to the outside of the first handheld portion 1 so that the user can replace the blade by using the toggle lever 91.

Figure 11:
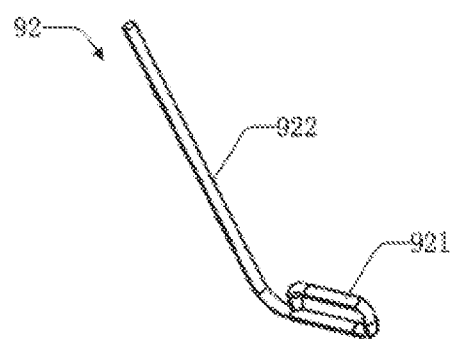
FIG. 11 is a structural schematic view of an elastic sheet according to Embodiment 1 of the present invention.
Figure 12:
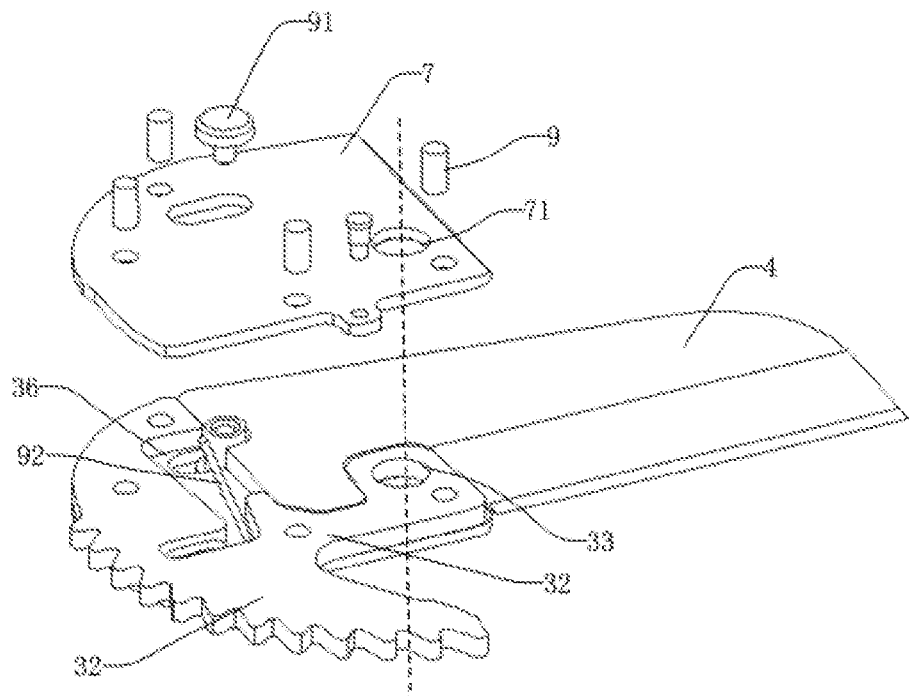
FIG. 12 is an exploded structural schematic view of the cutting structure according to Embodiment 1 of the present invention.

As shown in FIGS. 11 and 12, this embodiment further includes an elastic sheet 92 provided within the elastic sheet mounting notch 36; and one end of the elastic sheet 92 is fixed to the blade mounting plate 3 and the other end thereof is tangent to a side wall of the toggle lever 91, and specifically, the elastic sheet 92 is tangent to a side wall of the first toggle post 912 for pressing the first toggle post 912 against the blade fixing bayonet 45 so that the blade 4 is fixed to the blade mounting plate 3. When the first toggle knob 911 is toggled, the first toggle post 912 is disengaged from the blade fixing bayonet 45 and the blade 4 can be removed in the direction of a ridge thereof.

The elastic sheet 92 includes a linear portion 921 and a bent portion 922 which are formed integrally, and the linear portion 921 is provided within the first notch portion 361; the bent portion 922 is provided within the second notch portion 362; and one end of the linear portion 921 is connected to the bent portion 922 and the other end thereof is tangent to the side wall of the toggle lever 91 (the first toggle post 912). As shown in FIGS. 1, 11 and 12, when the blade 4 is mounted on the blade mounting plate 3, the toggle lever 91 is in a locked position, the elastic sheet 92 is slightly deformed, and the toggle lever 91 is pressed in the blade fixing bayonet 45. Since the blade latch 43 is snapped into the blade mounting plate bayonet 35 and the blade mounting plate latch 34 is snapped into the blade bayonet 44, the blade 4 is locked on the blade mounting plate 3 so that the cutting tool described in this embodiment can be used normally, and the specific use method thereof is the same as that of a blade fixed pipe cutter and will not be described here.

Figure 13:
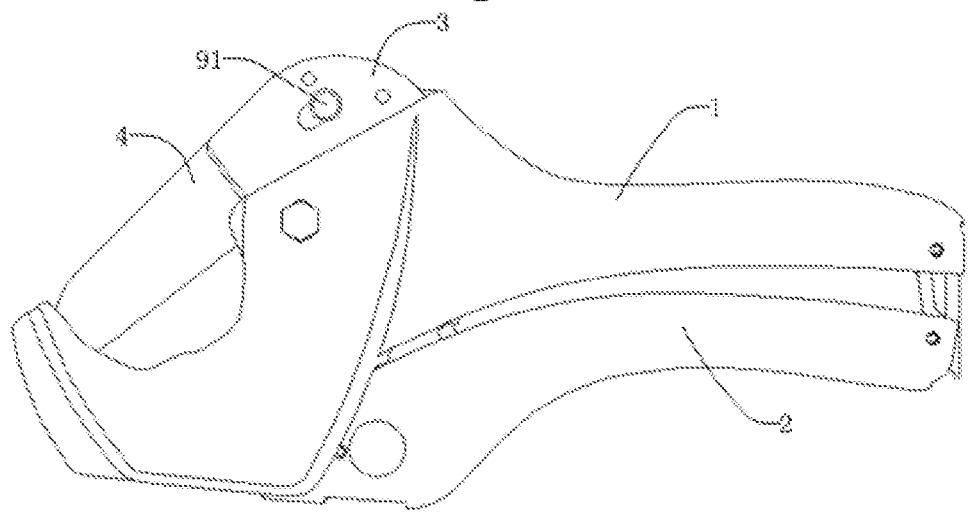
FIG. 13 is a schematic view of the overall structure of Embodiment 1 of the present invention in an unlocked state.

As shown in FIG. 13, when the blade 4 is damaged and needs to be replaced, it is only necessary to toggle the toggle lever 91 from the locked position 93 to an unlocked position, the elastic sheet 92 is greatly deformed, and the toggle lever 91 is disengaged from the blade fixing bayonet 45 and slides into the elastic sheet mounting notch 36, whereby the user can pull out the blade 4 of the blade mounting plate 3 in the direction of the ridge portion 41 and then mount a spare blade into the blade mounting plate 3, release the toggle lever 91 so that it slides back to the locked position under the action of the elastic sheet 92, and then lock the newly mounted spare blade on the blade mounting plate 3, so that the cutting tool can be used normally, completing the entire blade replacement process.

The beneficial effect of this embodiment is to provide a blade-replaceable cutting tool, which can achieve the quick replacement of the blade and is simple to operate and convenient to use; and it requires lower manipulative ability, and an ordinary user can replace the blade, which can effectively extend the overall service life of the cutting tool.

Embodiment 2

Figure 14:
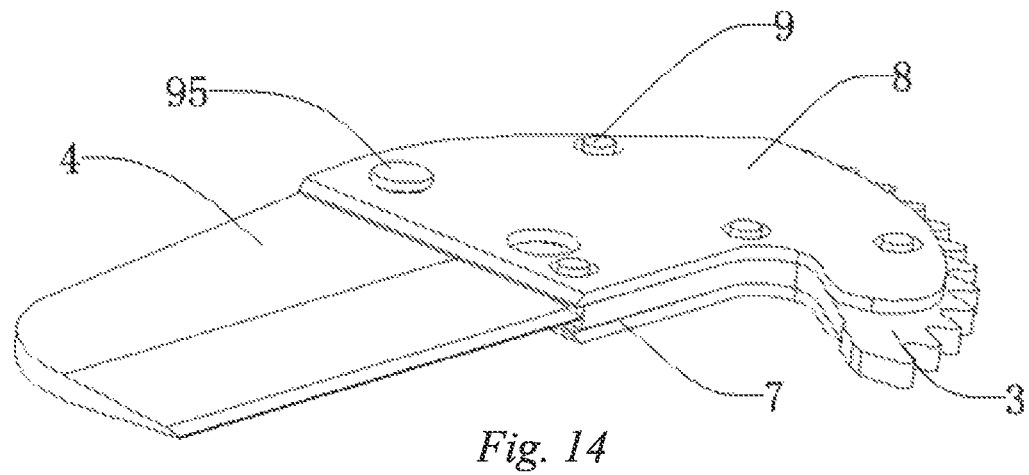
FIG. 14 is a schematic view of the overall structure of a cutting structure according to Embodiment 2 of the present invention.
Figure 15:
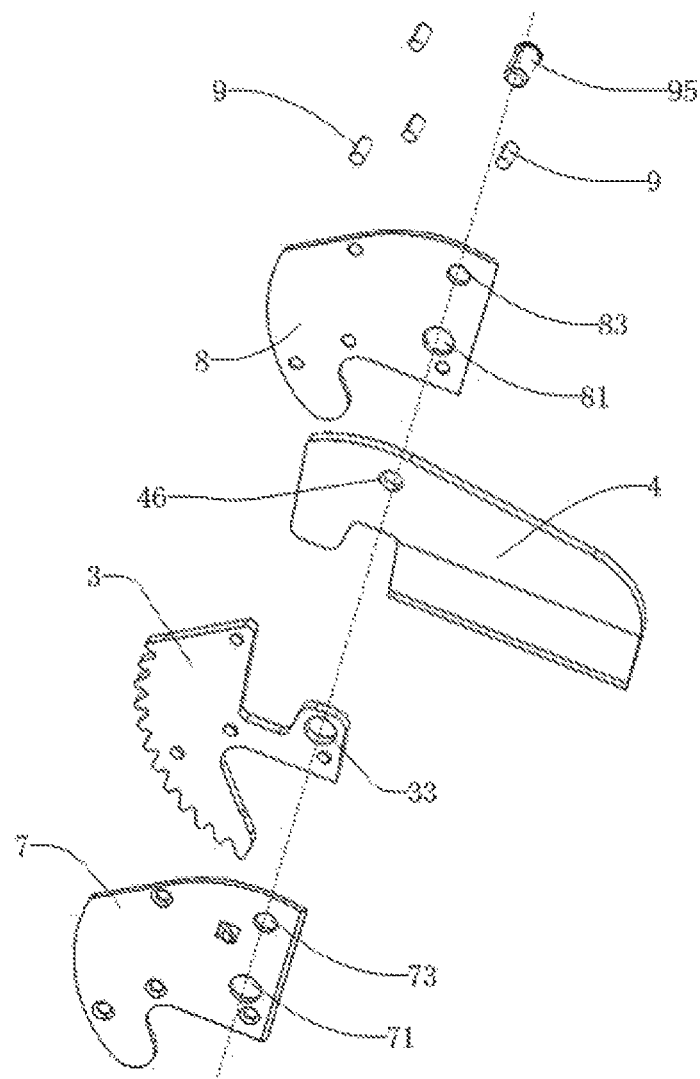
FIG. 15 is an exploded structural schematic view of the cutting structure according to Embodiment 2 of the present invention.

This embodiment provides a blade-replaceable cutting tool, including most of the technical features of Embodiment 1, except that the features of the cutting structure are different, and as shown in FIGS. 14 to 15, the cutting structure is collectively constituted by a blade mounting plate 3, a blade 4, a first clamping plate 7, and a second clamping plate 8.

Specifically, the cutting structure according to this embodiment is also a ratchet type component, and the blade mounting plate 3 is rotatably mounted to a first handheld portion 1; and the blade 4 is detachably mounted to the blade mounting plate 3.

Figure 16:
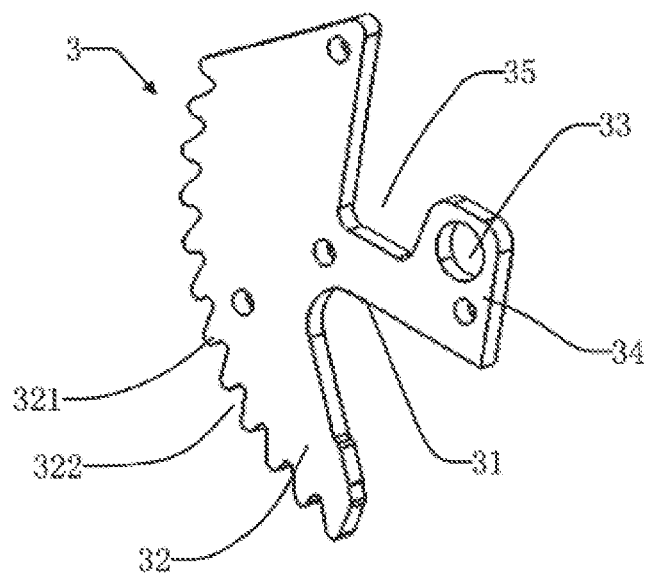
FIG. 16 is a structural schematic view of a blade mounting plate according to Embodiment 2 of the present invention.

As shown in FIG. 16, the blade mounting plate 3 includes a blade mounting plate body 31 having a front end mounted with the blade 4 and a rear end provided with an arcuate plate 32, the arcuate plate 32 is a part of a ratchet, the arcuate plate 32 includes an arcuate side portion and a non-arcuate side portion, and a side wall thereof includes an arcuate side wall and a non-arcuate side wall; and the arcuate side wall of the arcuate plate 32 is provided with a plurality of equally spaced ratchet teeth 321, and a ratchet tooth clearance 322 is formed between any two adjacent ratchet teeth 321 so that a first buckle 15 or a second buckle 25 provided within a second handheld portion opening cavity 23 is snapped into any one of the ratchet tooth clearances 322.

The blade mounting plate 3 includes a blade mounting plate through hole 33, and the blade mounting plate 3 can be rotated with the central axis of the blade mounting plate through hole 33 as the axis of rotation.

In this embodiment, the blade mounting plate 3 includes a blade mounting plate latch 34 and a blade mounting plate bayonet 35. The blade mounting plate latch 34 is provided at a front end of the blade mounting plate body 31 and is connected to the non-arcuate side portion at the middle of the arcuate plate 32; and the blade mounting plate bayonet 35 is provided between the blade mounting plate latch 34 and the arcuate plate 32 and opens to the blade 4.

Figure 17:
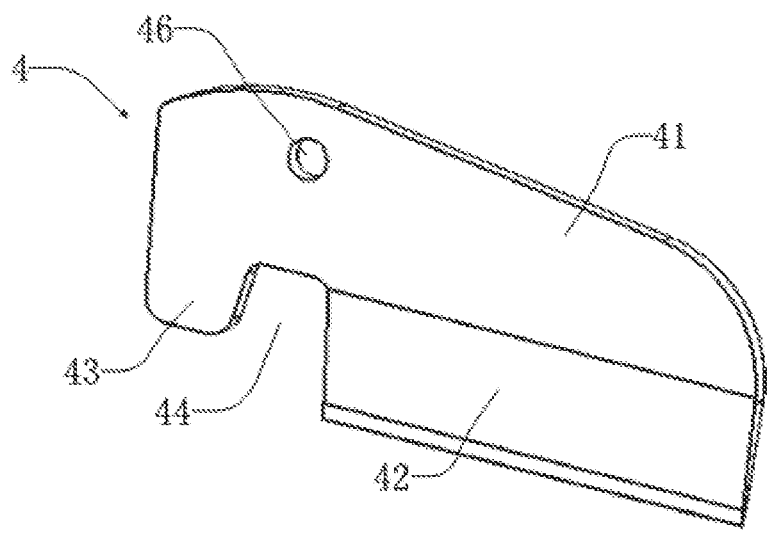
FIG. 17 is a structural schematic view of a blade according to Embodiment 2 of the present invention.

As shown in FIGS. 15 to 17, in this embodiment, the blade 4 includes a ridge portion 41 and a cutting edge portion 42 which are provided integrally, and further includes a blade latch 43 and a blade bayonet 44. The blade latch 43 is provided at an edge of the blade 4 and is provided opposite to the cutting edge portion 42 and is in the same direction as the cutting edge portion 42, and the blade latch 43 is snapped into the blade mounting plate bayonet 35. The blade bayonet 44 is provided between the blade latch 43 and the cutting edge portion 42 and the blade mounting plate latch 34 is snapped into the blade bayonet 44, so that the blade mounting plate 3 is assembled integrally with the blade 4 and remains relatively stable.

This embodiment does not include the toggle lever 91 and the elastic sheet 92, the blade mounting plate 3 also does not include the elastic sheet mounting notch 36, the first clamping plate 7 is not provided with the first kidney-shaped slot 72, and the second clamping plate 8 is also not provided with the second kidney-shaped slot 82.

As shown in FIGS. 15 and 17, this embodiment includes a blade pin mounting hole 46, a first clamping plate pin mounting hole 73, and a second clamping plate pin mounting hole 83. The blade pin mounting hole 46 penetrates through the blade 4 and is located at the portion of the ridge portion 41 close to the blade mounting plate 3. The first clamping plate pin mounting hole 73 penetrates through the first clamping plate 7 and is provided opposite to the blade pin mounting hole 46; and the second clamping plate pin mounting hole 83 penetrates through the second clamping plate 8 and is provided opposite to the blade pin mounting hole 46.

Figure 18:
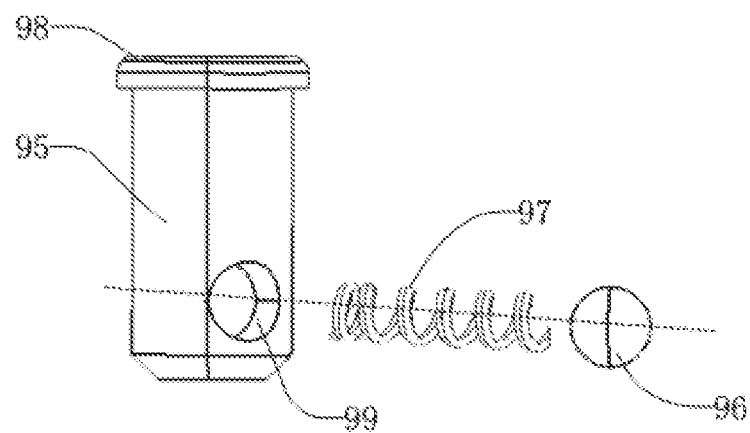
FIG. 18 is a structural schematic view of a pin according to Embodiment 2 of the present invention.

As shown in FIG. 18, this embodiment includes a pin 95, a positioning ball 96, and a positioning spring 97. The pin 95 successively passes through the second clamping plate pin mounting hole 83, the blade pin mounting hole 46, and the second clamping plate pin mounting hole 73, and one end of the pin 95 is provided with a pin cap 98 and a side wall of the other end thereof is provided with a sunken positioning slot 99. The positioning ball 96 is provided at the opening of the positioning slot 99; and one end of the positioning spring 97 is fixedly connected to the bottom of the positioning slot 99 and the other end thereof is fixedly connected to the positioning ball 96. The diameter of the opening of the positioning slot 99 is slightly smaller than the diameter of the positioning ball 96 to prevent the positioning ball 96 from sliding out of the positioning slot 99 entirely.

When the blade 4 is mounted on the blade mounting plate 3, the positioning spring 97 is in a normal shape, the positioning ball 96 protrudes beyond the pin 95, and the pin 95 passes through both the blade 4 and the blade mounting plate 3; and since the blade latch 43 is snapped into the blade mounting plate bayonet 35 and the blade mounting plate latch 34 is snapped into the blade bayonet 44, the blade 4 is locked on the blade mounting plate 3 so that the cutting tool described in this embodiment can be used normally, and the specific use method thereof is the same as that of a blade fixed pipe cutter and will not be described here.

When the blade 4 is damaged and needs to be replaced, it is only necessary to press down the positioning ball 96 and then compress the positioning spring 97, and when the positioning ball 96 is fully retracted into the positioning slot 99, a user can pull out the pin 95 and then pull out the blade 4 in the direction of the ridge portion 41, and then mount a spare blade into the blade mounting plate 3, insert the pin 95, and then lock the newly mounted spare blade on the blade mounting plate 3, so that the cutting tool can be used normally, completing the entire blade replacement process.

The beneficial effect of this embodiment is to provide a blade-replaceable cutting tool, which can achieve the quick replacement of the blade and is simple to operate and convenient to use; and it requires lower manipulative ability, and an ordinary user can replace the blade, which can effectively extend the overall service life of the cutting tool.

Embodiment 3

Figure 19:
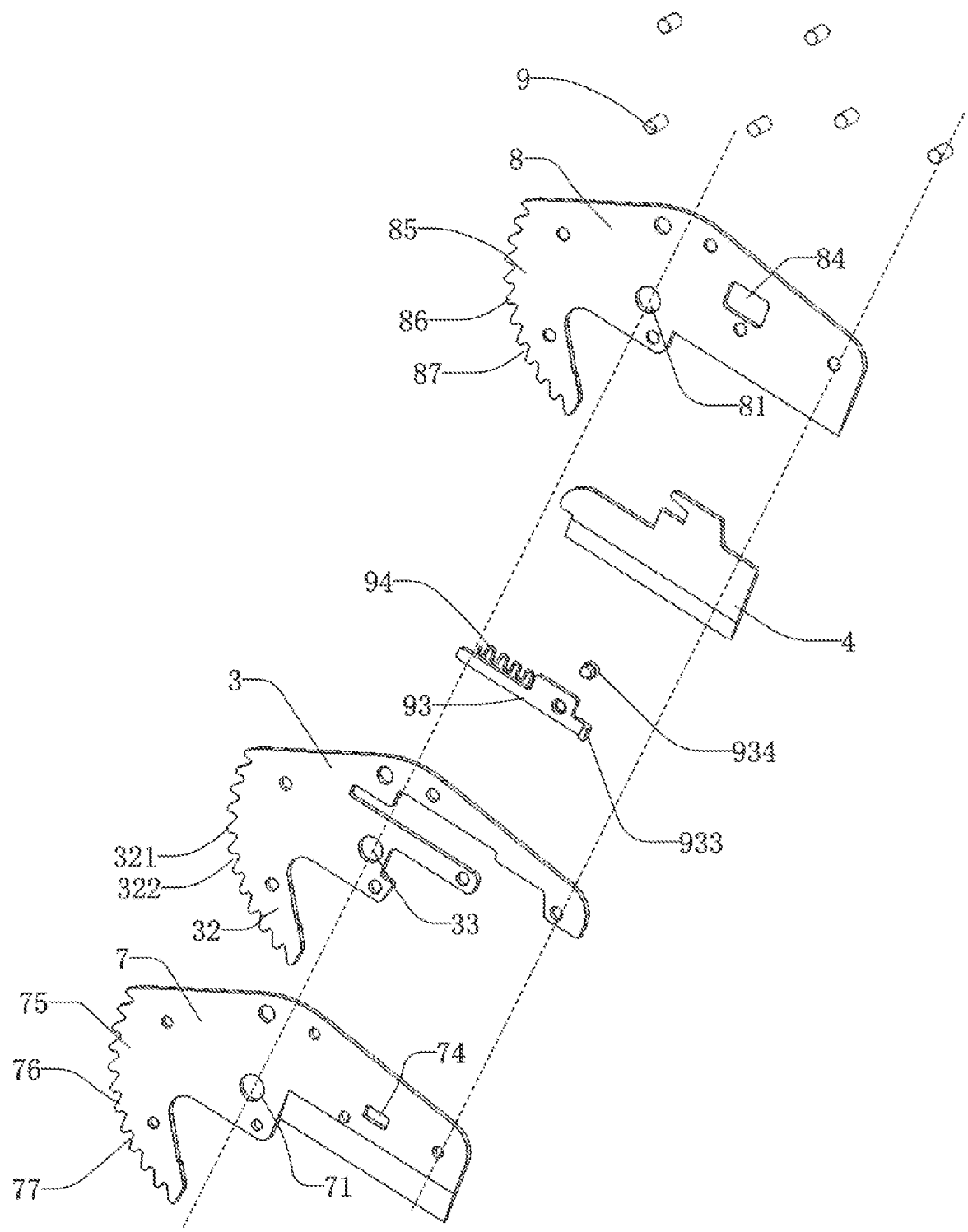
FIG. 19 is an exploded structural schematic view of the cutting structure according to Embodiment 3 of the present invention.
Figure 20:
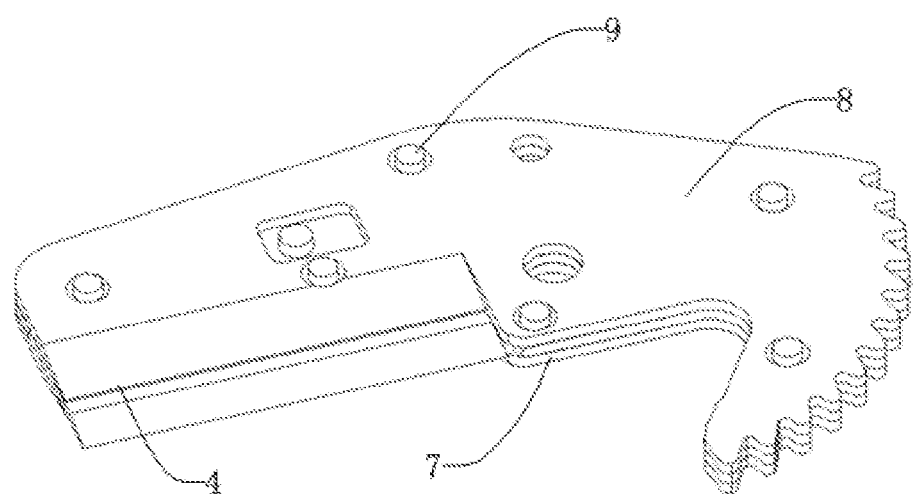
FIG. 20 is a schematic view of the overall structure of a cutting structure according to Embodiment 3 of the present invention.
Figure 21:
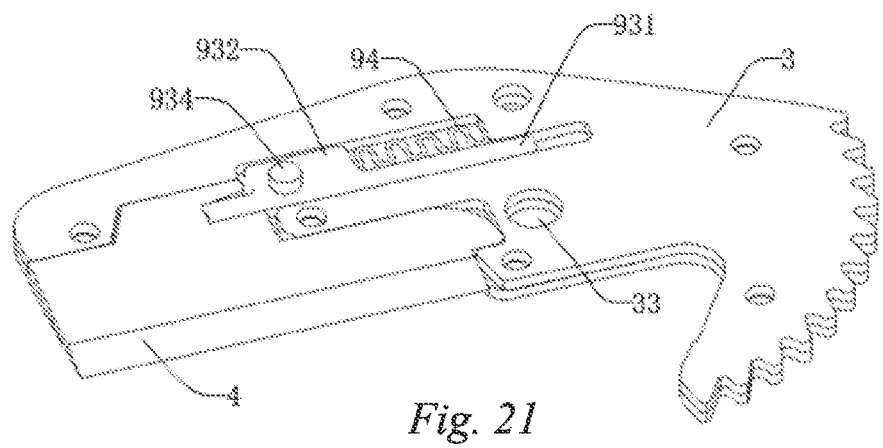
FIG. 21 is a structural schematic view of the cutting structure according to Embodiment 3 of the present invention with a second clamping plate removed.
Figure 22:
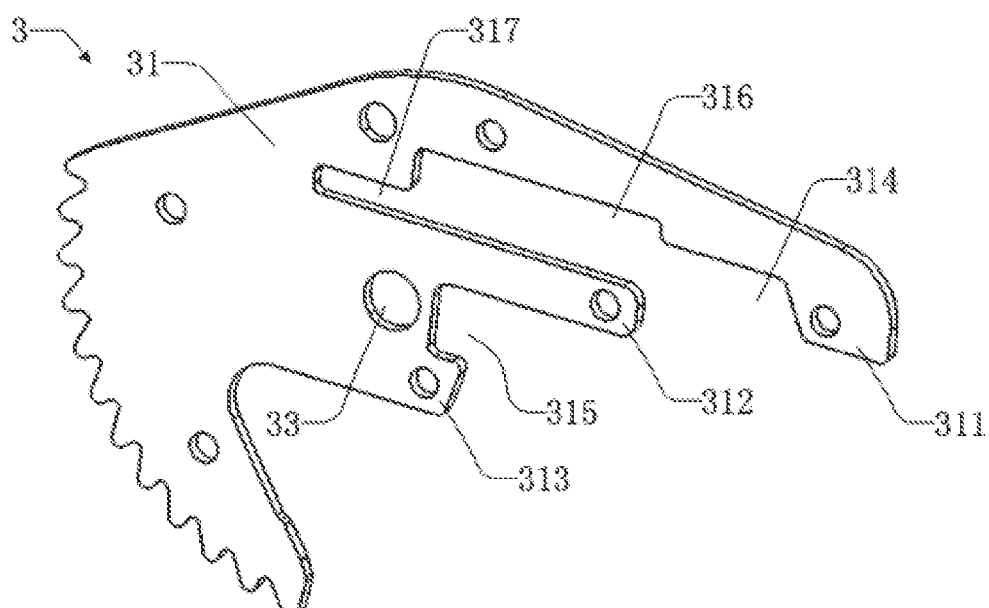
FIG. 22 is a structural schematic view of a blade mounting plate according to Embodiment 3 of the present invention.
Figure 23:
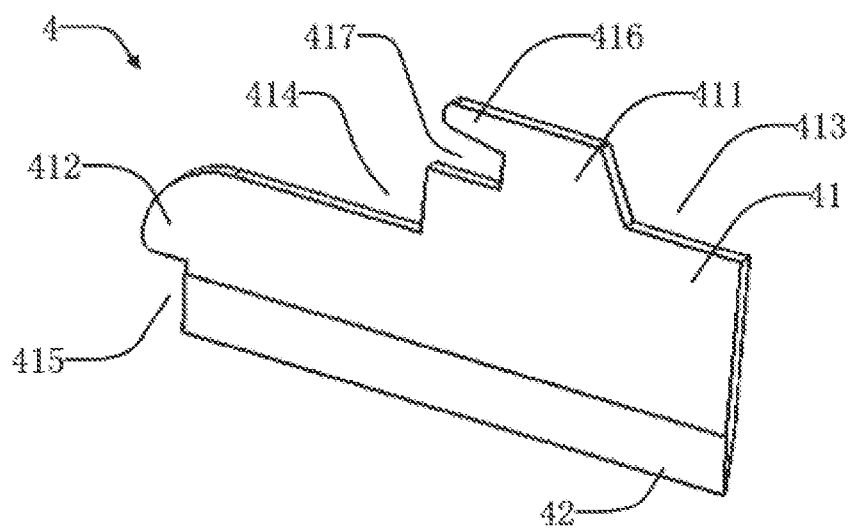
FIG. 23 is a structural schematic view of a blade according to Embodiment 3 of the present invention.

This embodiment provides a blade-replaceable cutting tool, including most of the technical features of Embodiment 1, except that the features of the cutting structure are different, and as shown in FIGS. 19 to 20, the cutting structure is collectively constituted by a blade mounting plate 3, a blade 4, a first clamping plate 7, and a second clamping plate 8.

The blade mounting plate 3 is rotatably mounted to the first handheld portion 1; and the blade 4 is detachably mounted to the blade mounting plate 3.

As shown in FIGS. 21 to 24, the blade mounting plate 3 includes a blade mounting plate body 31 having a front end mounted with the blade 4 and a rear end provided with an arcuate plate 32, the arcuate plate 32 is a part of a ratchet, the arcuate plate 32 includes an arcuate side portion and a non-arcuate side portion, and a side wall of the arcuate plate 32 includes an arcuate side wall and a non-arcuate side wall; and the arcuate side wall of the arcuate plate 32 is provided with a plurality of equally spaced ratchet teeth 321, and a ratchet tooth clearance 322 is formed between any two adjacent ratchet teeth 321 so that a first buckle 15 or a second buckle 25 provided within a second handheld portion opening cavity 23 is snapped into any one of the ratchet tooth clearances 322. The blade mounting plate 3 includes a blade mounting plate through hole 33, and the blade mounting plate 3 can be rotated with the central axis of the blade mounting plate through hole 33 as the axis of rotation.

Both the blade mounting plate 3 and the blade 4 are provided with a plurality of latches and bayonets which cooperate with each other and form snap structures correspondingly, so that the blade mounting plate 3 and the blade 4 are integrally assembled and remain relatively stable.

In this embodiment, the blade mounting plate 3 includes a first latch 311 of the blade mounting plate, a second latch 312 of the blade mounting plate, and a third latch 313 of the blade mounting plate. The first latch 311 of the blade mounting plate is provided at a front end of the blade mounting plate body 31; the second latch 312 of the blade mounting plate is provided at the middle of the blade mounting plate body 31 and corresponds to a ridge portion 41; and the third latch 313 of the blade mounting plate is provided at the middle of the blade mounting plate body 31 and corresponds to a cutting edge portion 42.

The blade mounting plate 3 further includes a first bayonet 314 of the blade mounting plate and a second bayonet 315 of the blade mounting plate; the first bayonet 314 of the blade mounting plate is provided between the first latch 311 of the blade mounting plate and a locking member 93; and the second bayonet 315 of the blade mounting plate is provided between the second latch 312 of the blade mounting plate and the third latch 313 of the blade mounting plate.

The blade 4 includes a ridge portion 41 and a cutting edge portion 42 which are provided integrally, and further includes a first latch 411 of the blade, a second latch 412 of the blade, a first bayonet 413 of the blade, a second bayonet 414 of the blade, and a third bayonet 415 of the blade.

The first latch 411 of the blade protrudes from the top of the ridge portion 41 and is snapped into the first bayonet 314 of the blade mounting plate; and the second latch 412 of the blade protrudes from a rear end of the ridge portion 41 and is snapped into the second bayonet 315 of the blade mounting plate.

The first bayonet 413 of the blade is provided at a front end of the ridge portion 41; and the first latch 311 of the blade mounting plate is snapped into the first bayonet 413 of the blade and is tangent to the first latch 411 of the blade. The second bayonet 414 of the blade is provided at the rear end of the ridge portion 41; and the second latch 312 of the blade mounting plate is snapped into the second bayonet 414 of the blade. The third bayonet 415 of the blade is provided at a rear end of the cutting edge portion 42; and the third latch 313 of the blade mounting plate is snapped into the third bayonet 415 of the blade and is tangent to the second latch 414 of the blade.

The blade mounting plate 3 includes an elastic member mounting notch 316 and a locking member mounting notch 317, and the elastic member mounting notch 316 is communicated to the first bayonet 314 of the blade mounting plate for mounting an elastic member; and the locking member mounting notch 317 is communicated to the elastic member mounting notch 316 for mounting a locking key.

The blade 4 includes a blade locking latch 416 and a blade locking bayonet 417, and the blade locking latch 416 protrudes backward from the first latch 411 of the blade; and the blade locking bayonet 417 is enclosed by the blade locking latch 416, the first latch 411 of the blade and the ridge portion 41.

The cutting tool described in this embodiment further includes a locking member 93 and a fourth elastic member 94. The locking member 93 includes a locking lever 931 and a locking block 932 which are provided integrally, and the locking lever 931 slides within the locking member mounting notch 316 and has a front end snapped into the blade locking bayonet 417; and the locking block 932 is connected to the middle of the locking lever 931 and slides within the elastic member mounting notch 316. The locking member 93 is used to lock the blade 4 on the blade mounting plate 3, and the blade 4 can be removed from the blade mounting plate 3 by a user when the locking member 93 is slid. The fourth elastic member 94 is provided within the elastic member mounting notch 316, and one end of the fourth elastic member 94 is connected to a side wall of the locking block 932 and the other end thereof is connected to an inner side wall of the elastic member mounting notch 316, and the fourth elastic member 94 is preferably a spiral spring. The fourth elastic member 94 enables the locking member 93 to lock the blade in a normal state so that the locking member 93 can slide within the locking member mounting notch 317 under the action of an external force.

Figure 24:
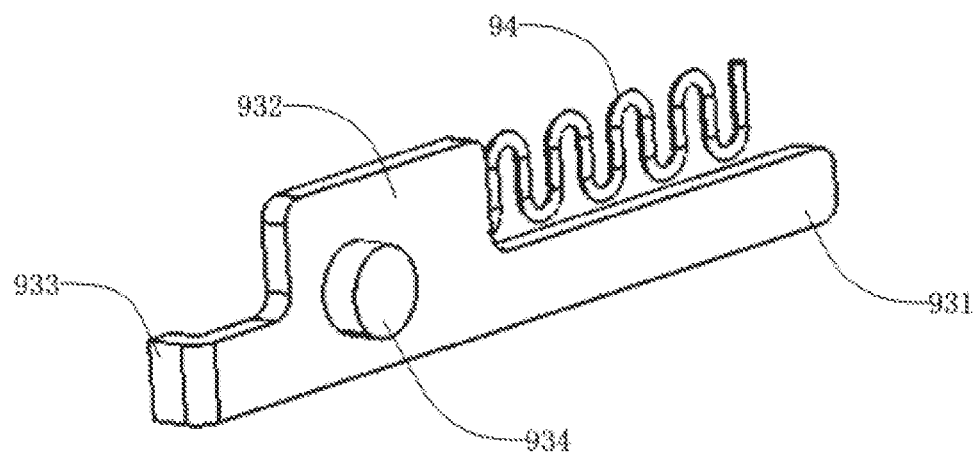
FIG. 24 is a structural schematic view of an elastic member and a locking key according to Embodiment 3 of the present invention.

As shown in FIGS. 19 and 24, the first clamping plate 7 is provided with a first control hole 74 which is provided opposite to the locking block 932; the side of the locking block 932 facing the first clamping plate 7 is provided with a protruded third toggle member 933; and the third toggle member 933 passes through the first control hole 74. The second clamping plate 8 is provided with a second control hole 84 which is provided opposite to a front end of the locking lever 931; the side of the front end of the locking lever 931 facing the second clamping plate 8 is provided with a protruded fourth toggle member 934; and the fourth toggle member 934 passes through the second control hole 84. The third toggle member 933 and the fourth toggle member 934 are respectively provided on both sides of the blade mounting plate 3 and exposed to the outside of the blade mounting plate 3 and the first handheld portion 1, so that the user can toggle the locking member 93 from any direction of the two sides of the blade mounting plate 3, so that the locking member 93 slides within the locking member mounting notch 317.

The first clamping plate 7 includes a first clamping plate arcuate plate 75, a first clamping plate ratchet teeth 76, and a first clamping plate ratchet tooth clearance 77. The first clamping plate arcuate plate 75 is provided at a rear end of the first clamping plate 7, and the first clamping plate arcuate plate 75 is a part of the ratchet; the first clamping plate ratchet teeth 76 are provided on an arcuate side wall of the first clamping plate arcuate plate 75; and the first clamping plate ratchet tooth clearance 77 is provided between any two adjacent first clamping plate ratchet teeth 76. The second clamping plate 8 includes a second clamping plate arcuate plate 85, a second clamping plate ratchet teeth 86, and a second clamping plate ratchet tooth clearance 87. The second clamping plate arcuate plate 85 is provided at a rear end of the second clamping plate 8 and it is a part of the ratchet; the second clamping plate ratchet teeth 86 are provided on an arcuate side wall of the second clamping plate arcuate plate 85; and the second clamping plate ratchet tooth clearance 87 is provided between any two adjacent second clamping plate ratchet teeth 86. The first clamping plate arcuate plate 75, the second clamping plate arcuate plate 85, and the arcuate plate 32 of the blade mounting plate 3 have the same shape and size, and the first clamping plate ratchet tooth clearance 77, the second clamping plate ratchet tooth clearance 87 and the ratchet tooth clearance 322 of the blade mounting plate 3 have the same shape and the corresponding position. The first buckle 15 or the second buckle 25 of the second handheld portion 23 is snapped into any one of the ratchet tooth clearances 322 and is also snapped into the first clamping plate ratchet tooth clearance 77 and the second clamping plate ratchet tooth clearance 87.

In this embodiment, during the operation, when the blade 4 is mounted on the blade mounting plate 3, the fourth elastic member 94 is slightly deformed, the front end of the locking lever 931 is inserted into the blade locking bayonet 417, and since the first latch 411 of the blade is snapped into the first bayonet 314 of the blade mounting plate and the second latch 412 of the blade is snapped into the second bayonet 315 of the blade mounting plate, the blade 4 is now locked on the blade mounting plate 3 so that the cutting tool described in this embodiment can be used normally, and the specific use method thereof is the same as that of a blade fixed pipe cutter and will not be described here.

When the blade 4 is damaged and needs to be replaced, the third toggle member 933 or the fourth toggle member 934 is toggled, the fourth elastic member 94 is compressed and then deformed, and the front end of the locking lever 931 is disengaged from the blade locking bayonet 417, whereby the user can pull out the blade 4 of the blade mounting plate 3 in the direction of the cutting edge portion 42 and then mount a spare blade into the blade mounting plate 3, release the third toggle member 933 or the fourth toggle member 934 so that the front end of the locking lever 931 is inserted into the blade locking bayonet 417 under the action of the fourth elastic member 94, and then lock the newly mounted spare blade on the blade mounting plate 3, so that the cutting tool can be used normally, completing the entire blade replacement process.

The beneficial effect of this embodiment is to provide a blade-replaceable cutting tool, which can achieve the quick replacement of the blade and is simple to operate and convenient to use; and it requires lower manipulative ability, and an ordinary user can replace the blade, which can effectively extend the overall service life of the cutting tool.

Embodiment 4

Figure 25:
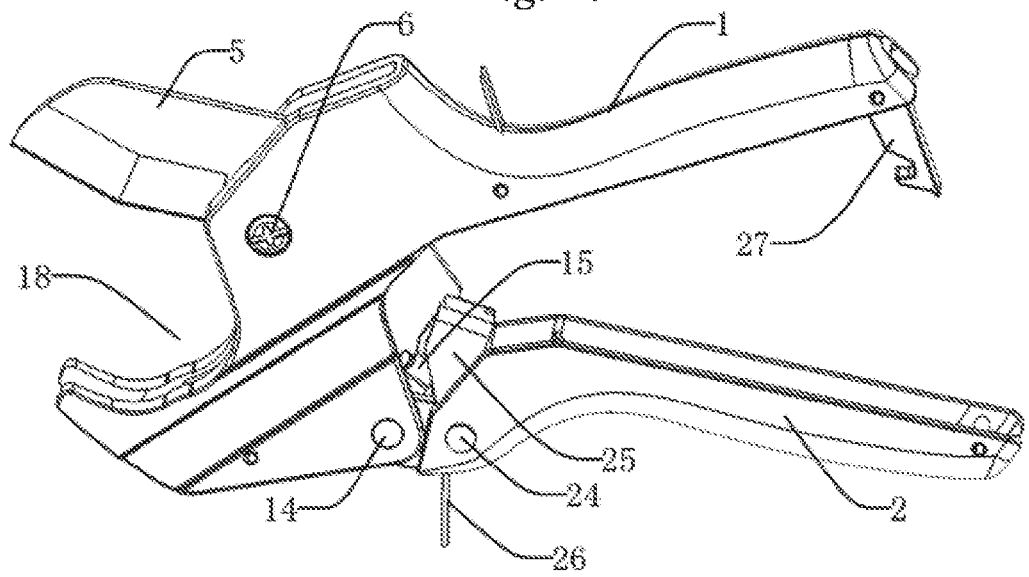
FIG. 25 is a schematic view of the overall structure of Embodiment 4 of the present invention in an open state.
Figure 26:
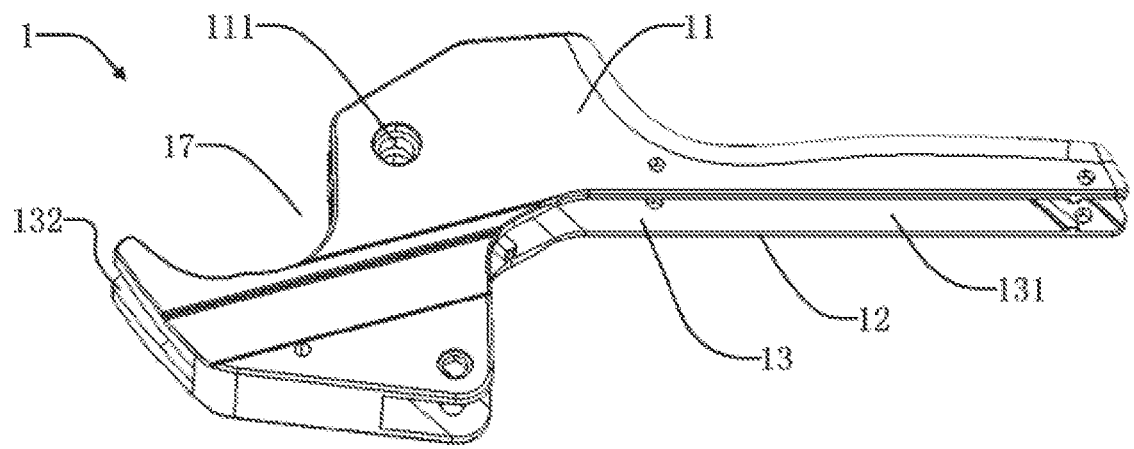
FIG. 26 is a structural schematic view of the first handheld portion according to Embodiment 4 of the present invention.
Figure 27:
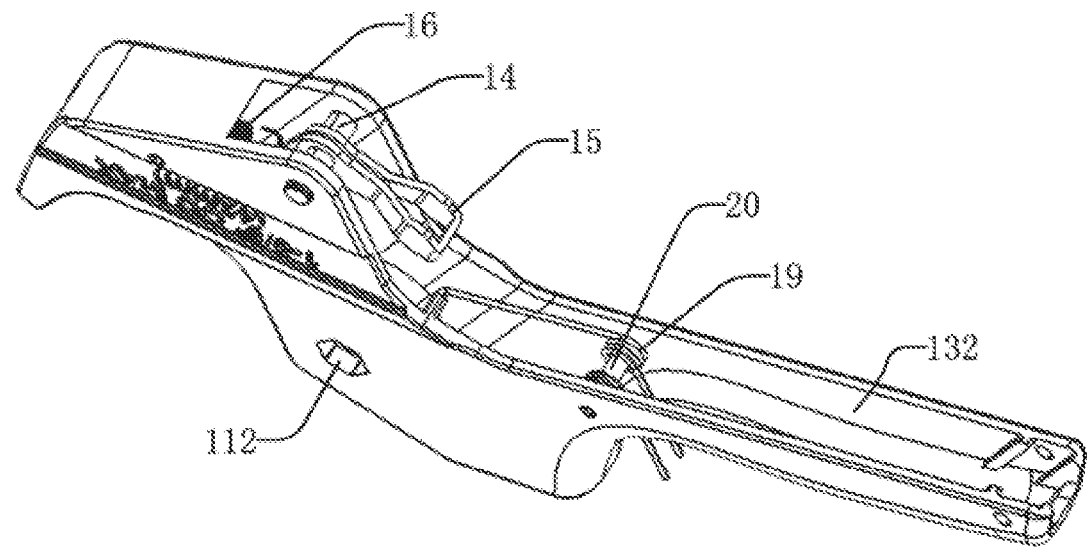
FIG. 27 is a structural schematic view of the first handheld portion and some components inside the first handheld portion according to Embodiment 4 of the present invention.
Figure 28:
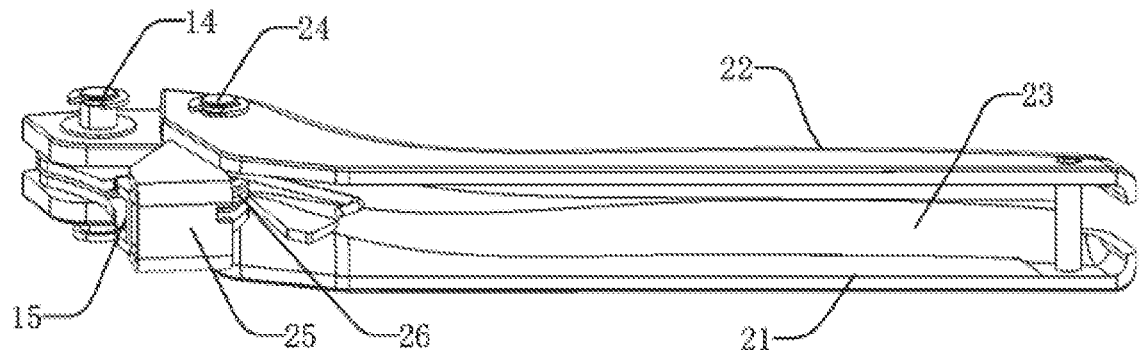
FIG. 28 is a structural schematic view of a second handheld portion according to Embodiment 4 of the present invention.

As shown in FIG. 25, this embodiment provides a blade-replaceable cutting tool, including a first handheld portion 1, a second handheld portion 2, and a ratchet blade 5. The ratchet blade 5 refers to a blade having a part of a side wall designed to be ratchet-shaped, the ratchet blade 5 includes an arcuate plate 52, the arcuate plate 52 is a part of a ratchet and an arcuate side wall thereof is provided with a plurality of uniformly distributed ratchet teeth 521, and a ratchet tooth clearance 522 is formed between any two adjacent ratchet teeth 521. In this embodiment, the blade mounting plate 3 and the blade 4 in Embodiments 1, 2 or 3 are replaced with the ratchet blade 5, and the structure of the ratchet blade 5 is similar to the structure formed by the combination of the blade mounting plate 3 and the blade 4.

As shown in FIGS. 26 to 29, the first handheld portion 1 includes a first side wall 11 of the first handheld portion and a second side wall 12 of the first handheld portion which are opposite to each other and provided integrally, the first side wall 11 of the first handheld portion and the second side wall 12 of the first handheld portion enclose a first handheld portion opening cavity 13, the first handheld portion opening cavity 13 includes a first opening 131 of the first handheld portion and a second opening 132 of the first handheld portion, and the first opening 131 of the first handheld portion faces the direction of a second handheld portion 2; the second opening 132 of the first handheld portion faces the outside of the first handheld portion 1; and a part of the ratchet blade 5 is located within the first handheld portion opening cavity 13.

This embodiment further includes a first pin 14, a first buckle 15, and a first elastic member 16, the first pin 14 is perpendicularly assembled on an inner side of the two side walls 11, 12 of the first handheld portion 1; and the first handheld portion 1 and the second handheld portion 2 are rotatably sleeved on the first pin 14. A rear end of the first buckle 15 is rotatably sleeved on the first pin 14 and a front end thereof is snapped into any one of the ratchet tooth clearances. One end of the first elastic member 16 is connected to the first handheld portion 1 and the other end thereof is connected to the first buckle 15, and the first elastic member 16 in this embodiment is preferably an extension spring.

The end of the first handheld portion 1 provided with the ratchet blade 5 further includes a first arcuate groove 17 and a second arcuate groove 18, and the first arcuate groove 17 is provided at an edge of the first side wall 11 of the first handheld portion; the second arcuate groove 18 is provided at an edge of the second side wall 12 of the first handheld portion and is provided opposite to the first arcuate groove 17; and the first arcuate groove 17 and the second arcuate groove 18 are provided on both sides of the first handheld portion opening cavity 13, respectively, and two arcuate grooves are used for placing and fixing a pipe to achieve the function of cutting the pipe. A cutting edge of the ratchet blade 5 directly faces the first handheld portion opening cavity 13, and the cutting edge falls into the first handheld portion opening cavity 13 after the cutting process is completed.

The second handheld portion 2 is rotatably connected to the first handheld portion 1 and includes a first side wall 21 of the second handheld portion and a second side wall 22 of the second handheld portion which are opposite to each other and provided integrally, the first side wall 21 of the second handheld portion and the second side wall 22 of the second handheld portion enclose a second handheld portion opening cavity 23, and the second handheld portion opening cavity 23 opens to the first handheld portion 1.

This embodiment further includes a second pin 24, a second buckle 25, and a second elastic member 26, and the second pin 24 is perpendicularly assembled to the inner side of the two side walls 21, 22 of the second handheld portion 2. A rear end of the second buckle 25 is rotatably sleeved on the second pin 24 and a front end thereof is snapped into any one of the ratchet tooth clearances; and one end of the second elastic member 16 is connected to the second handheld portion 2 and the other end thereof is connected to the second buckle 25. The second elastic member 26 is preferably a torsion spring which is sleeved on the second pin 24, and one end of the torsion spring is connected to the first handheld portion 1 and the other end thereof is detachably connected to the second buckle 25.

In this embodiment, the first buckle 15 or the second buckle 25, under the action of the first elastic member 16 or the second elastic member 26, is snapped into the ratchet tooth clearance in an appropriate place, and during the cutting of the pipe, the two buckles can assist the blade in exerting a force to cut the pipe located between the ratchet blade 5 and the two arcuate grooves 17, 18, thereby achieving a labor-saving effect.

This embodiment further includes a detachable pin 6 provided at a joint between the first handheld portion 1 and the ratchet blade 5, and the first handheld portion 1 and the ratchet blade 5 can be rotated about the detachable pin 6 so that the cutting tool described in this embodiment can be used normally, and the specific use method thereof is the same as that of a blade fixed pipe cutter and will not be described here.

The first side wall 11 of the first handheld portion is provided with a first side wall through hole 111 of the first handheld portion; and the second side wall 12 of the first handheld portion is provided with a second side wall through hole 121 of the first handheld portion, the ratchet blade 5 is provided with a blade through hole 54, the detachable pin 6 successively passes through the first side wall through hole 111 of the first handheld portion, the blade through hole 54, and the second side wall through hole 121 of the first handheld portion, and the ratchet blade 5 is rotatably connected to the first handheld portion 1 via the detachable pin 6.

Figure 30:
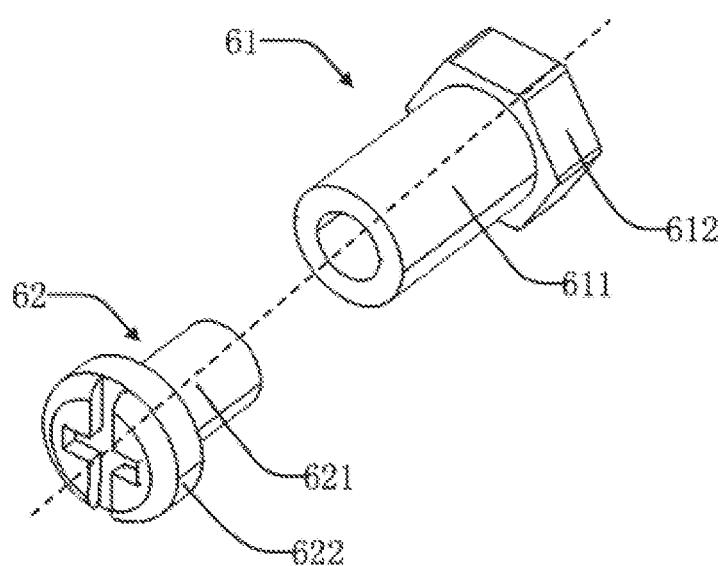
FIG. 30 is a structural schematic view of a detachable pin according to Embodiment 4 of the present invention.

As shown in FIG. 30, the detachable pin 6 includes a hollow shaft 61 and a rotating member 62 which are combined together, and the rotating member 62 is detachably assembled to the hollow shaft 61.

The hollow shaft 61 includes a hollow shaft sleeve 611 and a shaft sleeve base 612 which are formed integrally, and the hollow shaft sleeve 611 successively passes through the first side wall through hole 111 of the first handheld portion, the blade through hole 54, and the second side wall through hole 121 of the first handheld portion; and the shaft sleeve base 612 is exposed to the outside of the first side wall 11 of the first handheld portion.

The rotating member 62 includes a rotating shaft 621 and a rotating shaft base 622 which are formed integrally, and the rotating shaft 621 is inserted into and threadedly connected to the hollow shaft sleeve 611; and the rotating shaft base 622 is exposed to the outside of the second side wall 12 of the first handheld portion, and an outer surface thereof is provided with a flat or cross-shaped groove.

Figure 31:
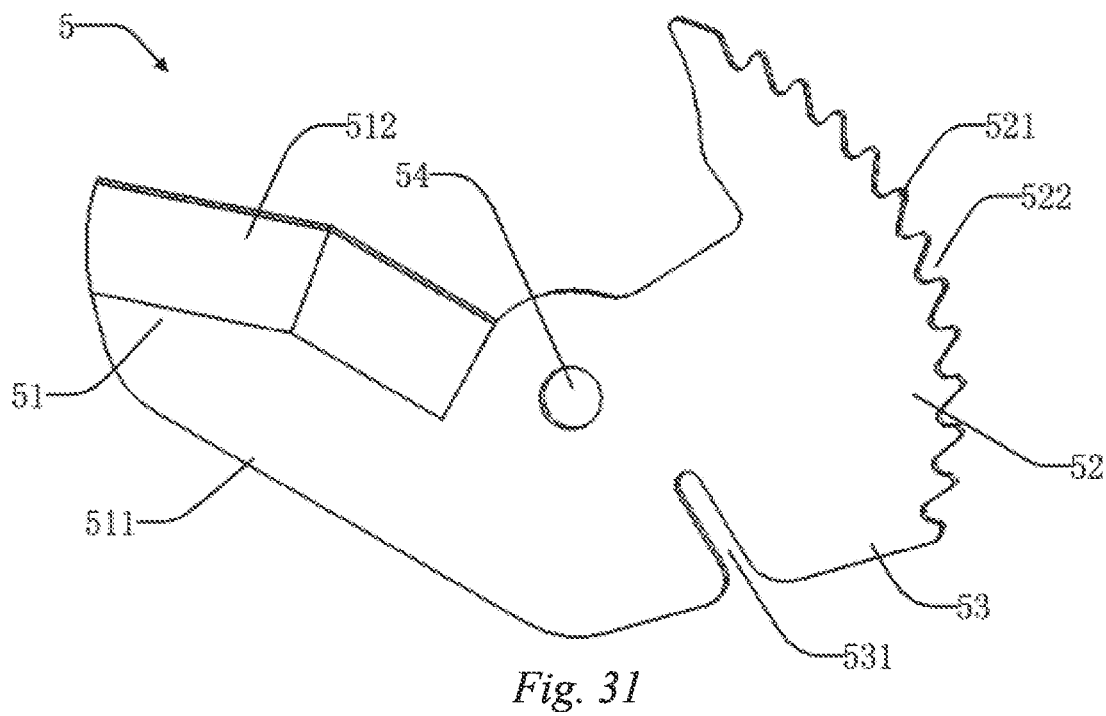
FIG. 31 is a structural schematic view of a ratchet blade according to Embodiment 4 of the present invention.

As shown in FIG. 31, the ratchet blade 5 refers to a blade having a part of the side wall designed to be ratchet-shaped, including a cutting portion 51, an arcuate plate 52, and a connecting portion 53. This embodiment is opened or closed when in use, the first handheld portion 1 and the second handheld portion 2 are relatively rotated, and the arcuate plate 32 of the ratchet blade 5 cooperates with the first buckle 15 and the second buckle 25 so that the cutting portion 51 can achieve an effective cutting operation, which will not be described here. The cutting portion 51 is provided at a front end of the ratchet blade 5 for cutting an article. The cutting portion 51 includes a ridge portion 511 and a cutting edge portion 512, and the ridge portion 511 faces the outside of the first handheld portion 1; and the cutting edge portion 512 faces the second opening 132 of the first handheld portion, and the cutting edge portion 512 is linear or arcuate. When the first handheld portion 1 and the second handheld portion 2 are closed, the cutting edge portion 512 is used to cut a pipe.

The arcuate plate 52 is provided at a rear end of the ratchet blade 5, the arcuate plate 52 is designed as a part of the ratchet, which includes ratchet teeth 521 and a ratchet tooth clearance 522, and the ratchet teeth 521 are provided on the arcuate side wall of the arcuate plate 52; and the ratchet tooth clearance 522 is provided between any two adjacent ratchet teeth 521. The side of the second handheld portion 12 facing the first handheld portion 11 is provided with a first buckle 15 and/or a second buckle 25, which is snapped into any one of the ratchet tooth clearances 522.

The connecting portion 53 is provided between the cutting portion 51 and the arcuate plate 52 and is rotatably connected to the first handheld portion 11. The connecting portion 53 includes a connecting portion snap slot 531 which is sunken to a side wall of the connecting portion 53 and is snapped by one end of the third elastic member 19.

Figure 29:
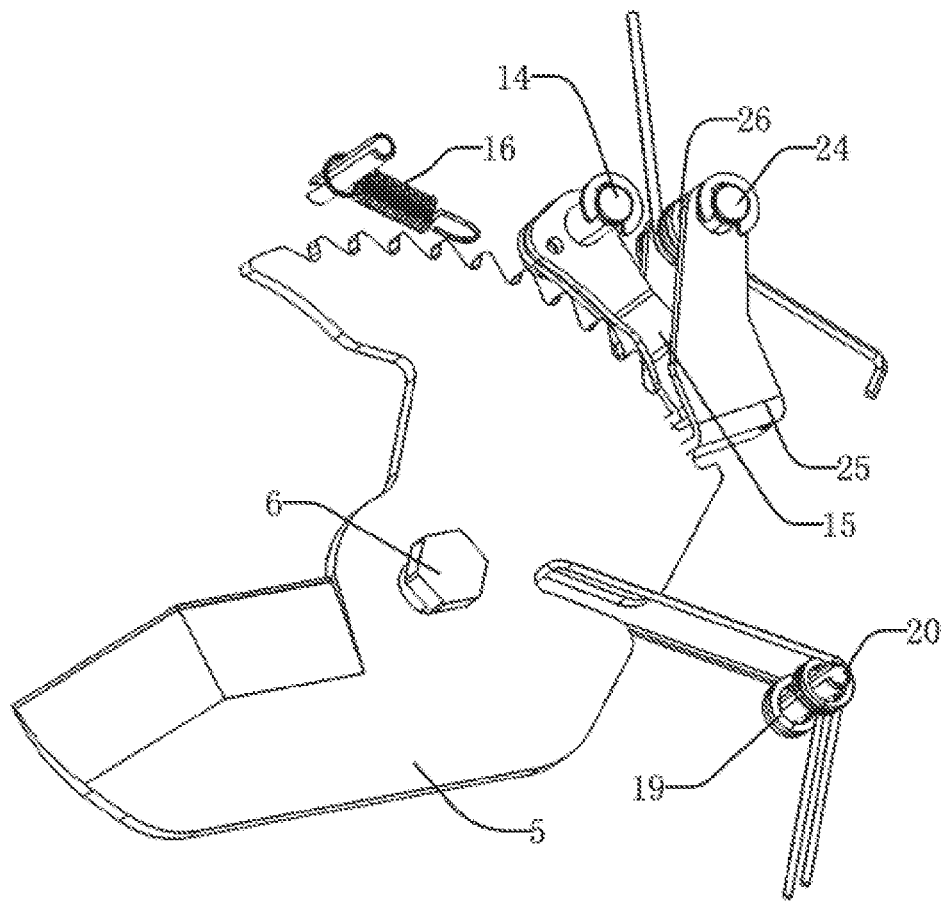
FIG. 29 is a structural schematic view of components inside the first and second handheld portions according to Embodiment 4 of the present invention.

As shown in FIG. 29, this embodiment further includes a third elastic member 19 having one end connected to the first handheld portion 1 and the other end connected to the ratchet blade 5; and the third elastic member 19 is preferably a torsion spring such as a double torsion spring which is sleeved on a torsion spring mounting shaft 20, and both ends of the torsion spring mounting shaft 20 are perpendicularly fixed to the inner side of the two side walls 11, 12 of the first handheld portion 1. One end of the third elastic member 19 is fixed to the first handheld portion 1, and the other end thereof is connected to the ratchet blade 5, and in this embodiment, is snapped into the connecting portion snap slot 531 of the ratchet blade 5.

In this embodiment, during the opening or closing of the first handheld portion 1 and the second handheld portion 2, the third elastic member 19 assists in exerting a force or limits the range of rotation of the blade, which can ensure that the opening angle is within an appropriate range to prevent the components from being damaged and to reduce the security risk during use.

As shown in FIG. 25, a distal end of the second handheld portion 2 is provided with a handheld portion fixing device 27 having one end hinged to the distal end of the second handheld portion 2 and the other end detachably mounted to a distal end of the first handheld portion 1 for closing the first handheld portion 1 and the second handheld portion 2.

When the ratchet blade 5 is damaged and needs to be replaced, a user can remove the rotating member 62 from the hollow shaft 61 by means of a handheld tool such as a screwdriver, so that the detachable pin 6 can be removed from the first handheld portion 1, and then the ratchet blade 5 can be separated from the first handheld portion 1 so that the user can replace it by himself with a spare blade which has exactly the same shape and size as the original ratchet blade 5. During the mounting of the spare blade, the spare blade is placed within the first handheld portion 1 so that the blade through hole 54 of the spare blade is on the same straight line as the first side wall through hole 111 of the first handheld portion and the second side wall through hole 121 of the first handheld portion. Thereafter, the user passes the hollow shaft 61 successively through the first side wall through hole 111 of the first handheld portion, the blade through hole 54, and the second side wall through hole 121 of the first handheld portion, and then connects it to the rotating member 62. The user can mount the rotating member 62 to the hollow shaft 61 by means of a handheld tool such as a screwdriver so that the two are relatively fixed.

The beneficial effect of this embodiment is to provide a blade-replaceable cutting tool, the ratchet blade is assembled to the first handheld portion by means of a detachable pin, so that the ratchet blade can be easily and quickly separated from the first handheld portion, thereby achieving the replacement of the ratchet blade. This embodiment is simple to operate and convenient to use and requires lower manipulative ability of the user, and an ordinary user can replace the blade, which can effectively extend the overall service life of the cutting tool.

Embodiment 5

Figure 32:
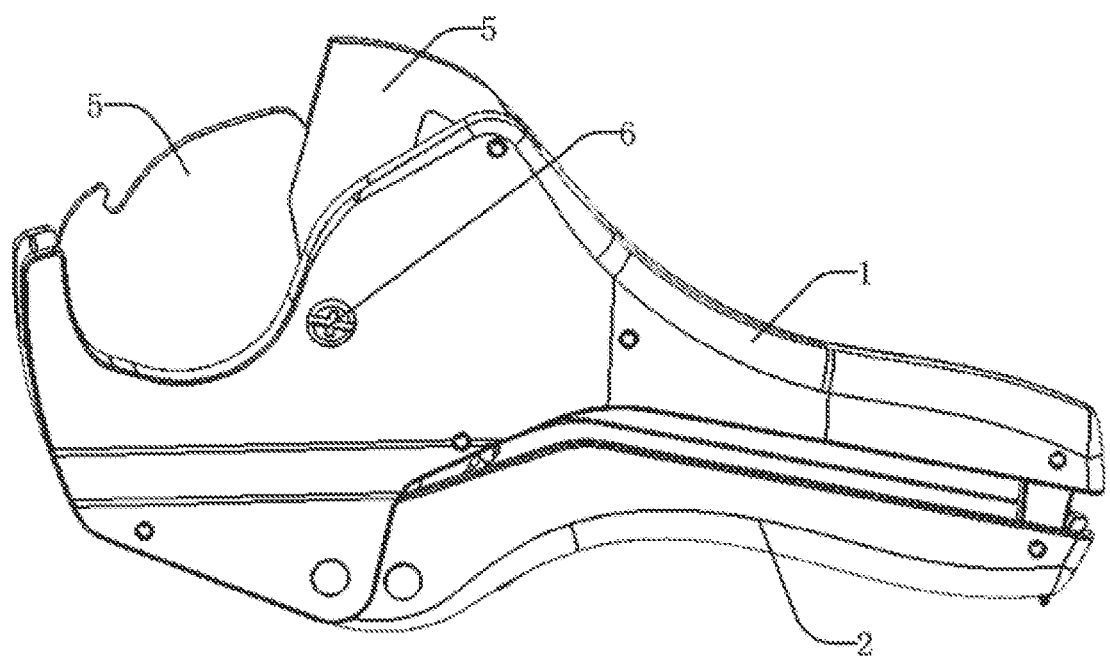
FIG. 32 is a schematic view of the overall structure of Embodiment 5 of the present invention.

This embodiment provides a blade-replaceable cutting tool, as shown in FIG. 32, including a first handheld portion 1, a second handheld portion 2, and more than two ratchet blades 5 which are rotatably mounted to a first handheld portion 11 by means of a detachable pin 6.

Embodiment 5 includes most of the technical features of Embodiment 4, and the distinguishing technical feature between them is that, as shown in FIGS. 32 to 36, in Embodiment 5, the detachable pin 6 includes a nut 63 and a screw 64, and the nut 63 is exposed to the outside of a first side wall 11 of the first handheld portion; the screw 64 successively passes through a first side wall through hole 111 of the first handheld portion, a blade through hole 54, and a second side wall through hole 112 of the first handheld portion, and a front end thereof is inserted into and threadedly connected to the nut 63 and a rear end thereof is provided with a screw base 65; and the screw base 65 is exposed to the outside of a second side wall 12 of the first handheld portion, and an outer surface thereof is provided with a flat or cross-shaped groove.

The ratchet blade 5 refers to a blade having a part of a side wall designed to be ratchet-shaped, including a cutting portion 51, an arcuate plate 52, and a connecting portion 53. Another distinguishing feature between Embodiment 5 and Embodiment 4 is that the arcuate plate 52 includes an arcuate plate retaining hole 523 penetrating through one end of the arcuate plate 52 and snapped by one end of a third elastic member 19.

Figure 33:
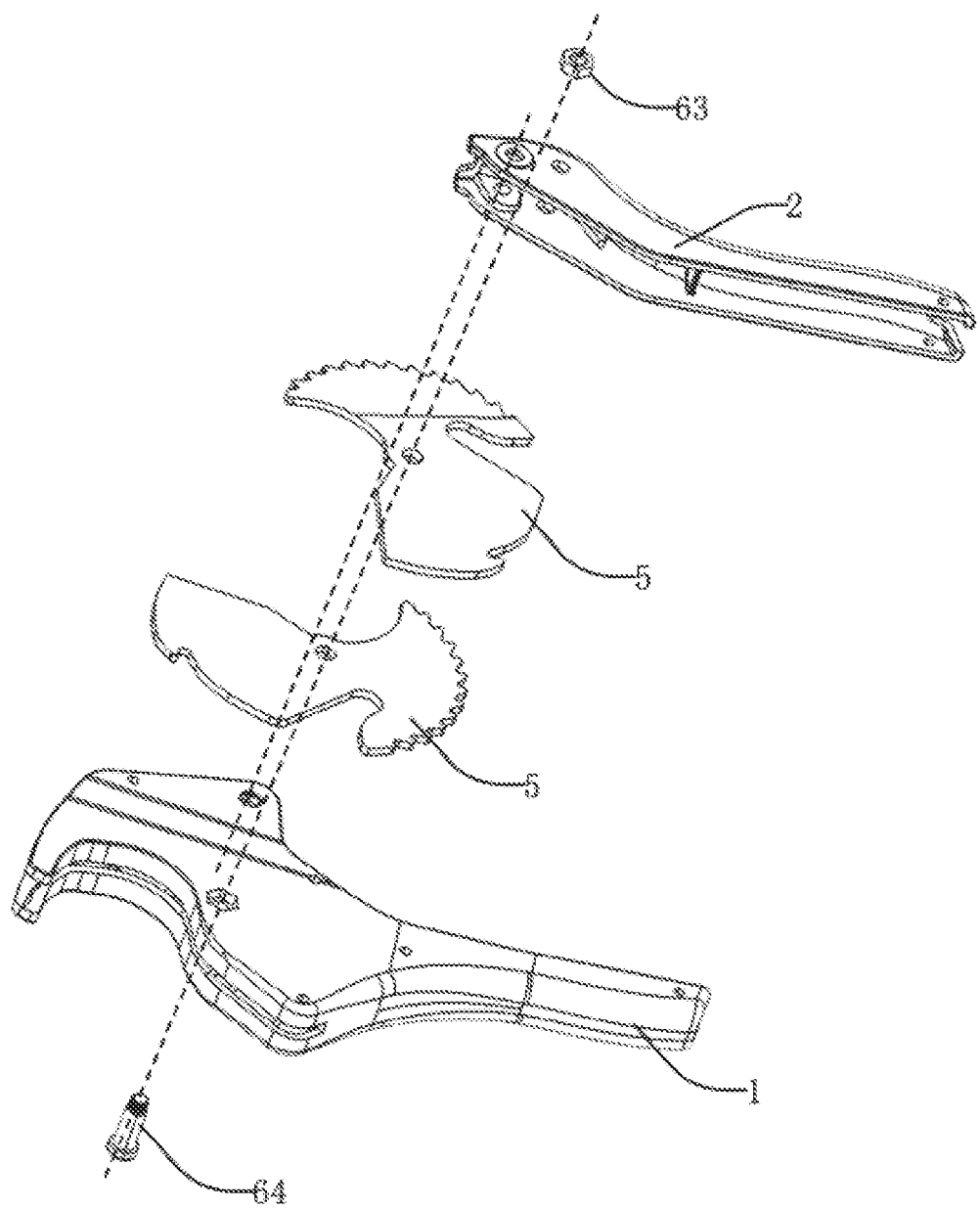
FIG. 33 is an exploded structural schematic view of a part of the structure of Embodiment 5 of the present invention.
Figure 34:
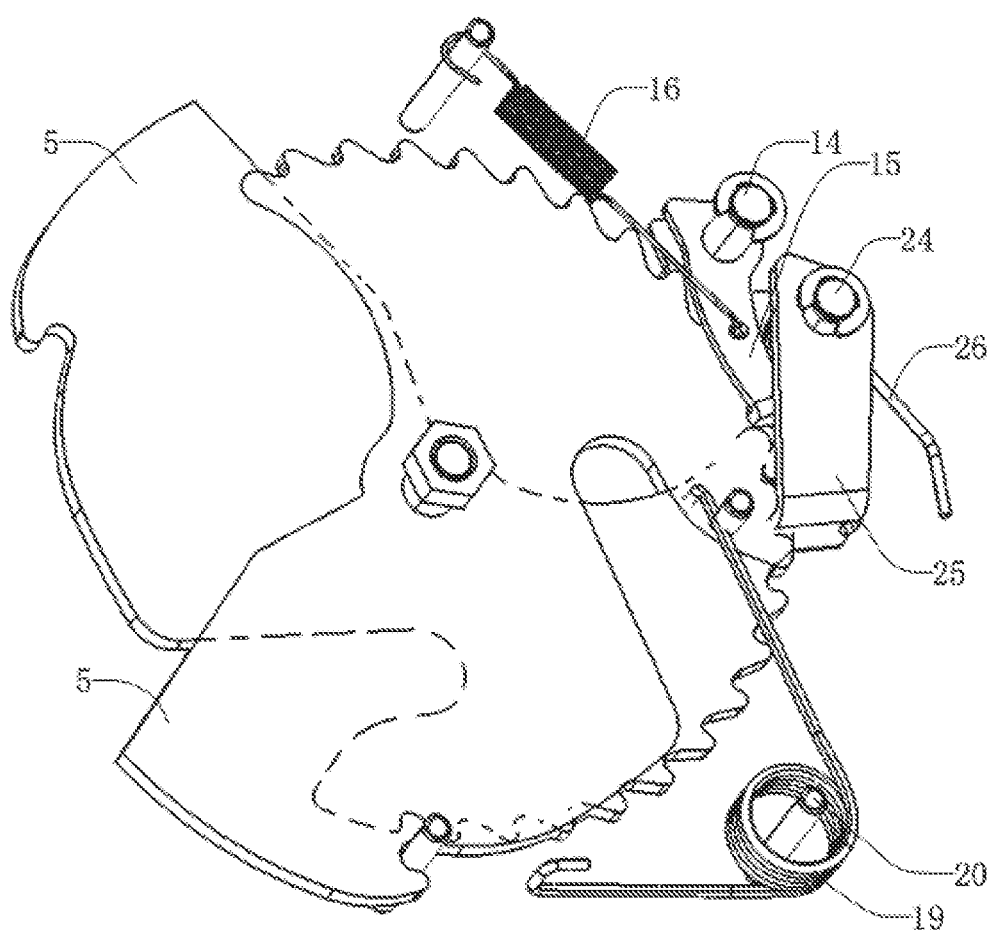
FIG. 34 is a structural schematic view of components inside the first and second handheld portions according to Embodiment 5 of the present invention.
Figure 35:
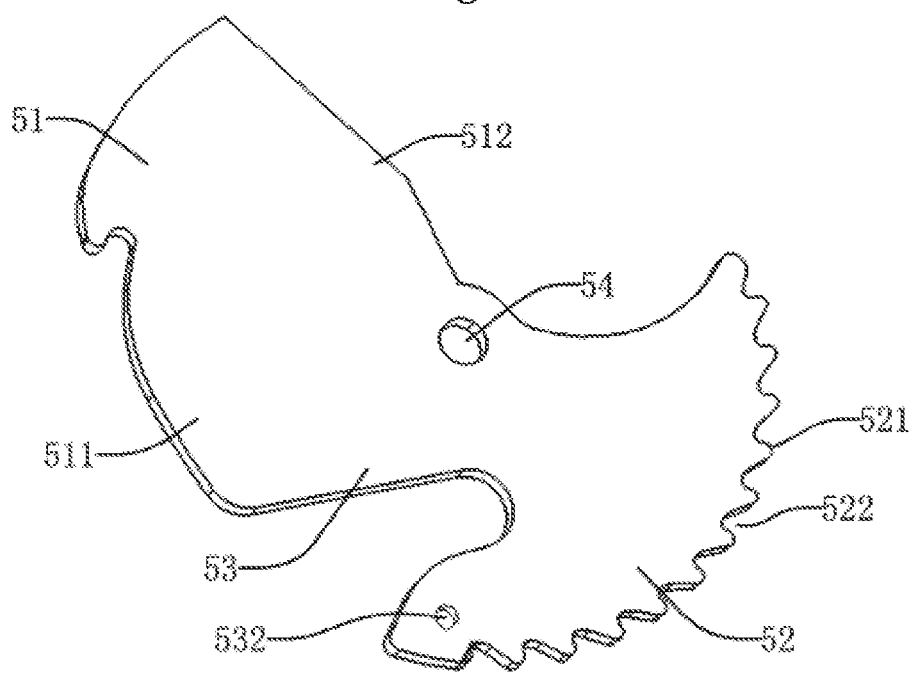
FIG. 35 is a structural schematic view of a ratchet blade according to Embodiment 5 of the present invention.
Figure 36:
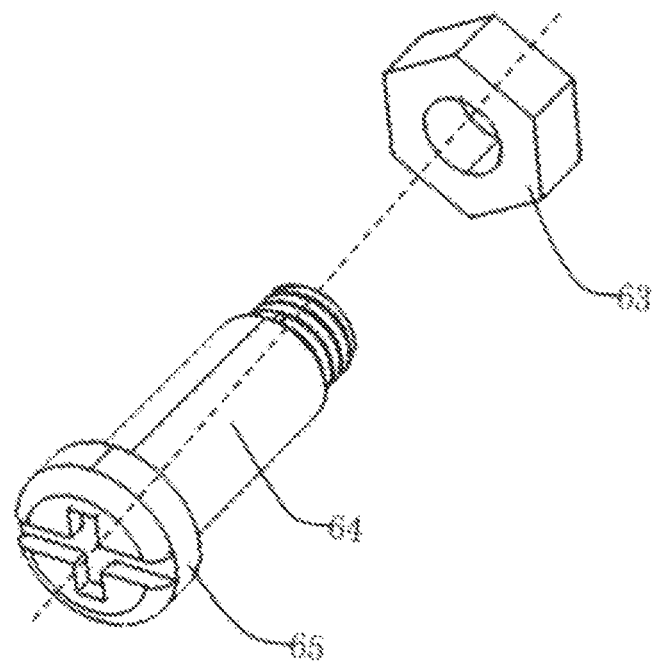
FIG. 36 is a structural schematic view of a detachable pin according to Embodiment 5 of the present invention.

As shown in FIG. 33, this embodiment includes two ratchet blades 5 which have the same shape and are adjacent to each other, both of which are sleeved on the detachable pin 6, and the two remain relatively deflected and have a deflection angle of 90 to 150 degrees, preferably 120 degrees. The arcuate plate retaining hole 523 of one ratchet blade 5 is provided at a left end of the arcuate plate 52 and the arcuate plate retaining hole 523 of the other ratchet blade 5 is provided at a right end of the arcuate plate 52, and one end of the third elastic member 19 passes through both of the two arcuate plate retaining holes 523 so that the two ratchet blades 5 are relatively fixed.

In this embodiment, the third elastic member 19 is preferably a torsion spring which is sleeved on a torsion spring mounting shaft 20, one end of the torsion spring is connected to the first handheld portion 1 and the other end thereof is simultaneously snapped into the two arcuate plate snap holes 532 of the two ratchet blades 5. In this embodiment, during the opening and closing of the first handheld portion 1 and the second handheld portion 2, the third elastic member 19 assists in exerting a force or limits the range of rotation of the ratchet blade 5, which can prevent the components from being damaged and reduce the security risk during use.

The other technical solutions and technical effects of this embodiment are the same as or similar to those of Embodiment 4 and will not be described here.

When any one of the ratchet blades 5 is damaged and the ratchet blade 5 needs to be replaced, a user can remove the screw 64 from the nut 63 by means of a handheld tool such as a screwdriver so that the detachable pin 6 can be removed from the first handheld portion 1, and then the two ratchet blades 5 can be separated from the first handheld portion 1 so that the user can replace it by himself with a spare blade which has exactly the same shape and size as the original ratchet blade 5. The spare blade is placed within the first handheld portion 1 so that the blade through holes 54 of the two ratchet blades 5 are on the same straight line as the first side wall through hole 111 of the first handheld portion and the second side wall through hole 121 of the first handheld portion, and then the user passes the screw 64 successively through the first side wall through hole 111 of the first handheld portion, the blade through hole 54, and the second side wall through hole 121 of the first handheld portion, and then threadedly connects it to the nut 63. The user can mount the screw 64 to the nut 63 by means of a handheld tool such as a screwdriver so that the two are relatively fixed.

The beneficial effect of this embodiment is to provide a blade-replaceable cutting tool, and a plurality of ratchet blades are assembled to the first handheld portion by means of a detachable pin, so that the ratchet blades can be easily and quickly separated from the first handheld portion, thereby achieving the replacement of the ratchet blades. This embodiment is simple to operate and convenient to use and requires lower manipulative ability of the user, and an ordinary user can replace the blade, which can effectively extend the overall service life of the cutting tool.

Embodiment 6

Referring to FIGS. 37 to 42, this embodiment provides a blade-replaceable cutting tool, including most of the technical features of Embodiment 1, except that the features of the cutting structure are different.

Figure 37:
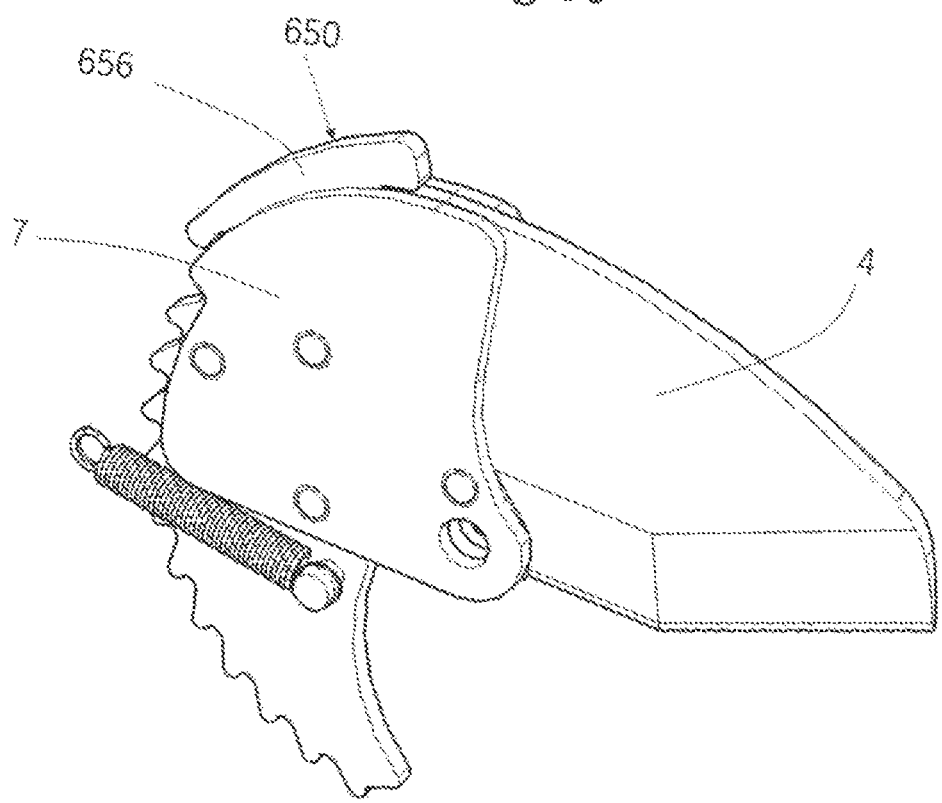
FIG. 37 is a schematic view of the overall structure of a cutting structure according to Embodiment 6 of the present invention.
Figure 38:
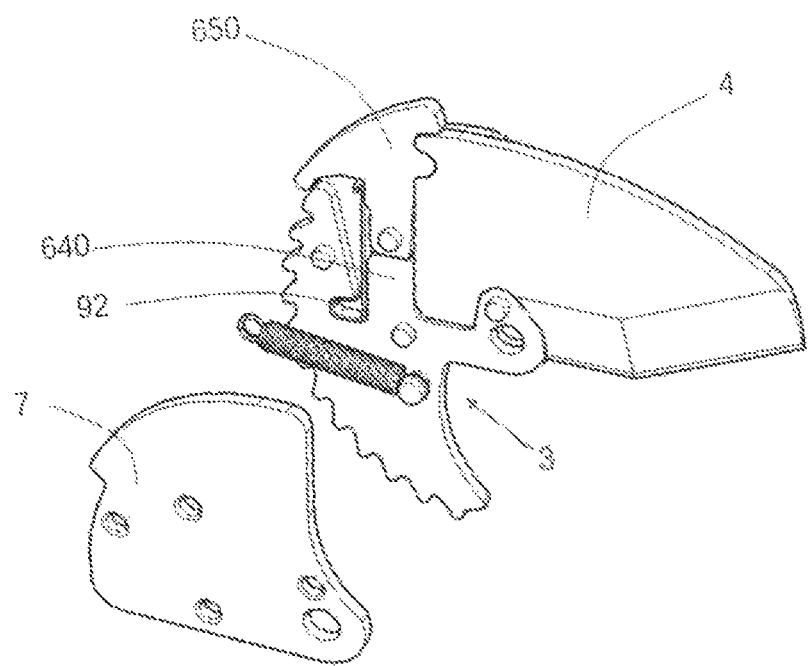
FIG. 38 is an exploded structural schematic view of a part of the cutting structure according to Embodiment 6 of the present invention.
Figure 39:
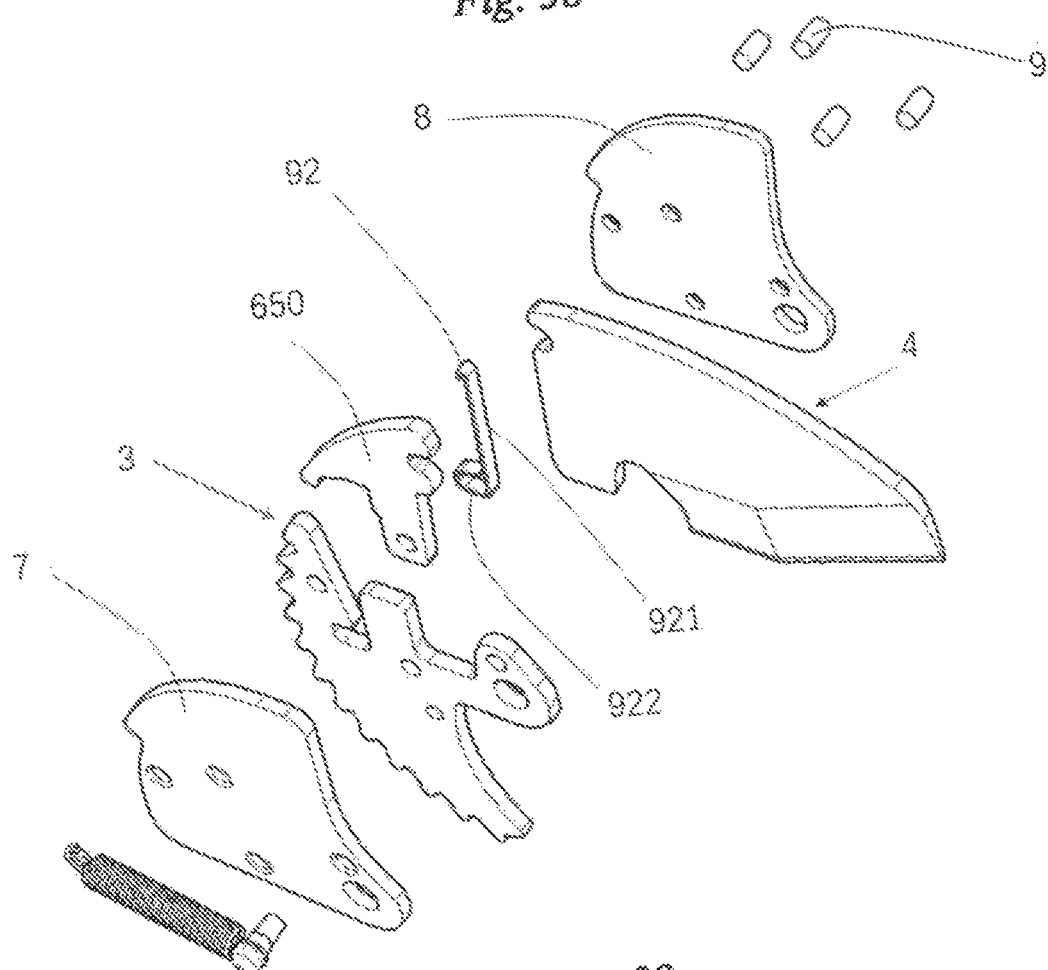
FIG. 39 is an exploded structural schematic view of the cutting structure according to Embodiment 6 of the present invention.

As shown in FIGS. 37 to 39, the cutting structure is collectively constituted by a blade mounting plate 3, a blade 4, a first clamping plate 7, and a second clamping plate 8.

The cutting structure according to this embodiment is also a ratchet type component, and the blade mounting plate is rotatably mounted to a first handheld portion; and the blade is detachably mounted to the blade mounting plate.

Figure 40:
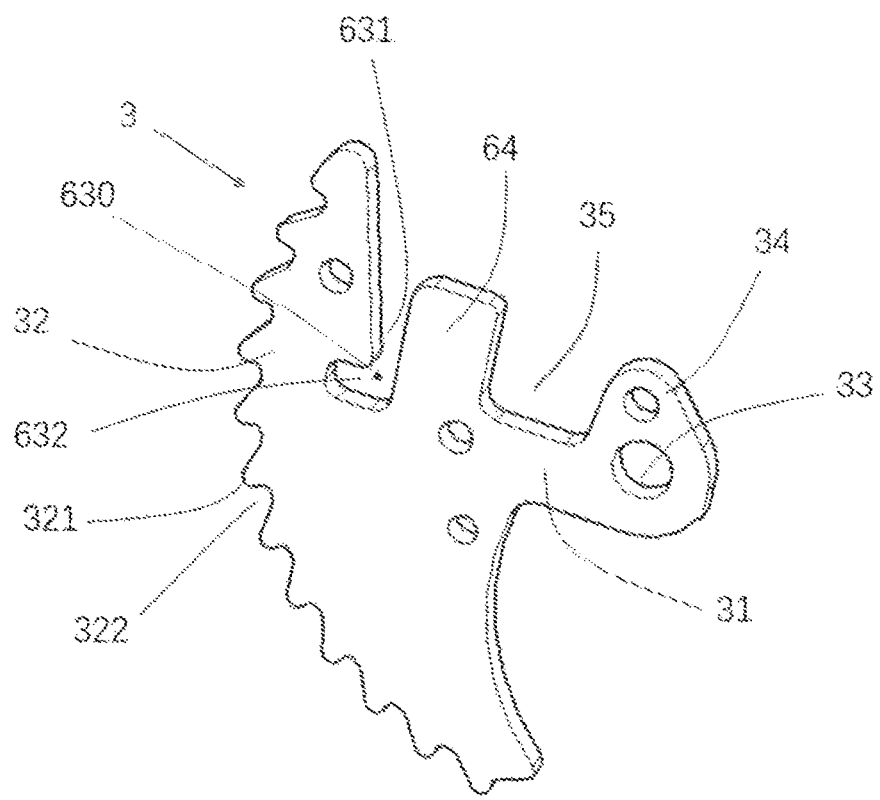
FIG. 40 is a structural schematic view of a blade mounting plate according to Embodiment 6 of the present invention.

As shown in FIG. 40, the blade mounting plate 3 includes a blade mounting plate body 31 having one end mounted with the blade 4 and the opposite end provided with an arcuate plate 32, the arcuate plate 32 is a part of a ratchet, and the arcuate plate 32 includes an arcuate side portion and a non-arcuate side portion, and a side wall thereof includes an arcuate side wall and a non-arcuate side wall; and the arcuate side wall of the arcuate plate is provided with a plurality of equally spaced ratchet teeth 321, and a ratchet tooth clearance 322 is formed between any two adjacent ratchet teeth so that a first buckle 15 or a second buckle 25 provided within a second handheld portion opening cavity 23 is snapped into any one of the ratchet tooth clearances 322.

The blade mounting plate 3 includes a blade mounting plate through hole 33, and the blade mounting plate 3 can be rotated with the central axis of the blade mounting plate through hole 33 as the axis of rotation.

In this embodiment, the blade mounting plate 3 includes a blade mounting plate latch 34 and a blade mounting plate bayonet 35, and the blade mounting plate latch 34 is provided on the side of the blade mounting plate body 31 for mounting the blade 4 and is connected to the non-arcuate side portion at the middle of the arcuate plate 32; and the blade mounting plate bayonet 35 is provided between the blade mounting plate latch 34 and the arcuate plate 32 and opens to the blade 4.

Figure 41:
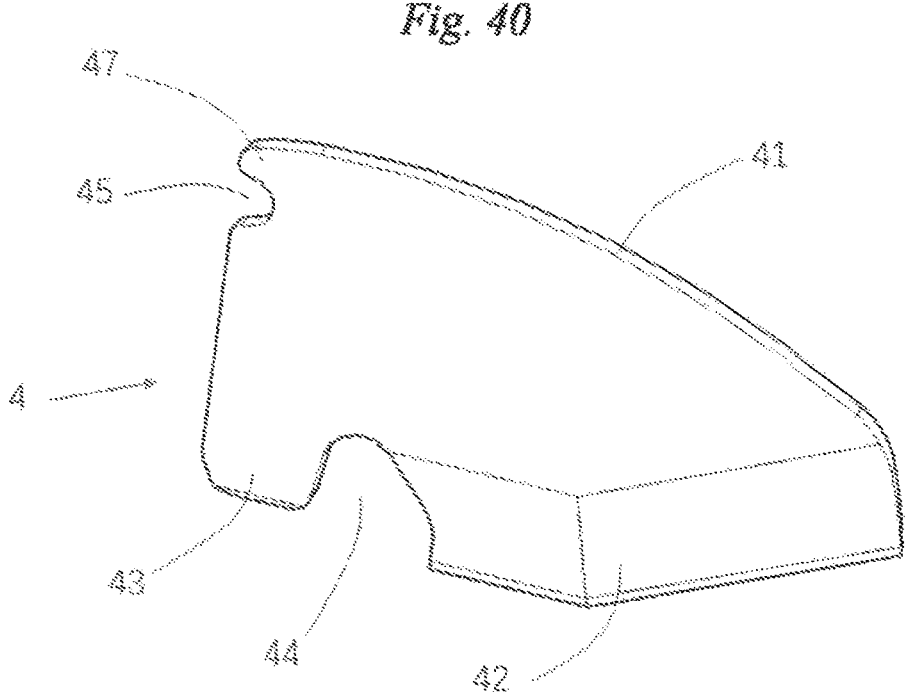
FIG. 41 is a structural schematic view of a blade according to Embodiment 6 of the present invention.

As shown in FIG. 41, in this embodiment, the blade 4 includes a ridge portion 41 and a cutting edge portion 42 which are provided integrally, and further includes a blade latch 43 and a blade bayonet 44. The blade latch 43 is provided at an edge of the blade 4 and is provided opposite to the cutting edge portion 42 and is in the same direction as the cutting edge portion 42, and the blade latch 43 is snapped into the blade mounting plate bayonet 35. The blade bayonet 44 is provided between the blade latch 43 and the cutting edge portion 42 and the blade mounting plate latch 34 is snapped into the blade bayonet 44, so that the blade mounting plate 3 is assembled integrally with the blade 4 and remains relatively stable.

As shown in FIG. 40, the blade mounting plate 3 further includes a second elastic sheet mounting notch 630 for assembling an elastic sheet 92, and the second elastic sheet mounting notch 630 is provided on the side of the arcuate plate 32 away from the arcuate side wall. Unlike the elastic sheet mounting notch 36 in Embodiment 1, the second elastic sheet mounting notch 630 in this embodiment does not open to the blade 4, but is parallel to the blade 4. The blade mounting plate 3 includes a first protruding portion 640, the first protruding portion 640 is located between the blade mounting plate bayonet 35 and the arcuate side wall of the arcuate plate 32, and a top end of the first protruding portion 640 is lower than that of the arcuate side wall of the arcuate plate 32. The second elastic sheet mounting notch 630 includes a first notch 631 and a second notch 632, and the first notch 631 is located between the arcuate side wall of the arcuate plate 32 and the first protruding portion 640 and an opening direction thereof is parallel to the blade 4; and the notch 632 is communicated to the first notch 631 and is provided perpendicular to the first notch 631.

Figure 42:
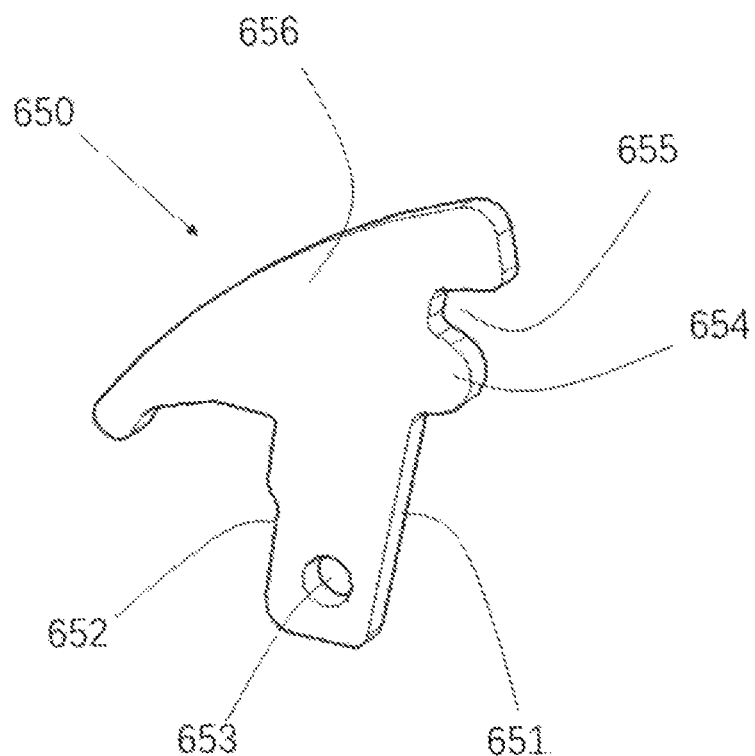
FIG. 42 is a structural schematic view of a toggle sheet according to Embodiment 6 of the present invention.

Referring to FIGS. 38 and 42, this embodiment further includes a toggle sheet 650, and the toggle sheet 650 is provided on the first protruding portion 640 and has a first side 651 facing the blade 4 and a second side 652 opposite to the first side 651 facing the first notch 631. The toggle sheet 650 can rotate in a direction away from the blade 4 relative to the clamping plate, specifically, the toggle sheet 650 is provided with a pin hole 653, the pin hole 653 can be aligned with one fastener mounting hole in the first clamping plate 7 and the second clamping plate 8, and when a first fastener 9 is used to fix the first clamping plate 7 and the second clamping plate 8, one of the first fasteners 9 also passes through the pin hole 653 on the toggle sheet 650, so that the toggle sheet 650 can rotate around the first fastener 9 passing through the pin hole 653. The blade 4 includes a blade fixing bayonet 45, which is provided opposite to the toggle sheet 650; and the first side 651 of the toggle sheet 650 is provided with a latch portion 654, and the latch portion 654 can be snapped into the blade fixing bayonet 45. Preferably, a blade fixing latch 47 is provided on an upper portion of the blade fixing bayonet 45, a bayonet portion 655 is provided on an upper portion of the latch portion 654 of the toggle sheet 65, and when the latch portion 654 of the toggle sheet 650 is snapped into the blade fixing bayonet 45, the blade fixing latch 47 is also snapped into the bayonet portion 655 of the toggle sheet 650, so that the toggle sheet 650 can fix the blade 4 more stably. As shown in FIGS. 37 and 42, the toggle sheet 650 includes a toggle portion 656, and when the toggle sheet 650 is mounted between the first clamping plate 7 and the second clamping plate 8, the toggle portion 656 is exposed to the outside of the first clamping plate 7 and the second clamping plate 8, which is convenient for a user to operate the toggle sheet 650. Optionally, the toggle portion 656 may be provided in an arcuate shape and extend from the blade 4 to the arcuate side wall of the arcuate plate 32. Further, one end of the toggle portion 656 is located above the ridge portion 41 of the blade 4 and the opposite end is located above the top end of the arcuate side wall of the arcuate plate 32.

As shown in FIG. 38, this embodiment further includes an elastic sheet 92 provided within the second elastic sheet mounting notch 630. One end of the elastic sheet 92 is fixed to the blade mounting plate 3 and the other end thereof is at least in contact with the second side 652 of the toggle sheet 650 for pressing the latch portion 654 of the toggle sheet 650 against the blade fixing bayonet 45, so that the blade 4 is fixed to the blade mounting plate 3. When the toggle sheet 650 is toggled, that is, when the toggle sheet 650 rotates away from the blade 4, the latch portion 654 is disengaged from the blade fixing bayonet 45, and the blade 4 can be removed in the direction of a ridge thereof.

The elastic sheet 92 includes a linear portion 921 and a bent portion 922 which are formed integrally, and the linear portion 921 is provided within the first notch portion 631; the bent portion 922 is provided within the second notch portion 632; and one end of the linear portion 921 is connected to the bent portion 922. At least a part of the linear portion 921 is in contact with the toggle sheet 650, for example, one end of the linear portion 921 contacts the second side 652 of the toggle sheet 650, or the linear portion 921 simultaneously contacts the first protruding portion 640 and the toggle sheet 650 of the second side 652. As shown in FIG. 38, when the blade 4 is mounted on the blade mounting plate 3, the toggle sheet 650 is in a locked position (that is, the latch portion 654 of the toggle sheet 650 is snapped into the blade fixing bayonet 45), the elastic sheet 92 is slightly deformed, and the latch portion 654 of the toggle sheet 650 is pressed against the blade fixing bayonet 45. Since the blade latch 43 is snapped into the blade mounting plate bayonet 35 and the blade mounting plate latch 34 is snapped into the blade bayonet 44, the blade 4 is locked on the blade mounting plate 3 so that the cutting tool described in this embodiment can be used normally, and the specific use method thereof is the same as that of a blade fixed pipe cutter and will not be described here.

When the blade is damaged and the blade 4 needs to be replaced, it is only necessary to rotate the toggle sheet 650 in a direction away from the blade 4, the elastic sheet 92 is greatly deformed, and the toggle sheet 650 is disengaged from the blade fixing bayonet 45, whereby the user can pull out the blade 4 of the blade mounting plate 3 in the direction of the ridge portion 41, and then mount a spare blade into the blade mounting plate 3, release the toggle sheet 650 so that under the action of the elastic sheet 92, the latch portion 654 is snapped into the blade fixing bayonet 45, and then lock the newly mounted spare blade 4 on the blade mounting plate 3, so that the cutting tool can be used normally, completing the entire blade replacement process.

The beneficial effect of this embodiment is to provide a blade-replaceable cutting tool, which can achieve the quick replacement of the blade and is simple to operate and convenient to use; and it requires lower manipulative ability, and an ordinary user can replace the blade, which can effectively extend the overall service life of the cutting tool.

Embodiment 7

In Embodiments 1 to 6, a pipe to be cut is placed in the first arcuate groove and the second arcuate groove of the first handheld portion. However, the sizes of the first arcuate groove and the second arcuate groove are fixed, and thus, the cutting tools in Embodiments 1 to 6 can only be applied to pipes of specific pipe diameters, and cannot be applied to pipes of different pipe diameters, with a limited application scope.

Referring to FIGS. 43 to 56, this embodiment provides a blade-replaceable cutting tool, which improves structures of the first arcuate groove 17 and the second arcuate groove 18 of the first handheld portion on the basis of Embodiments 1 to 6, so that the sizes of the first arcuate groove 17 and the second arcuate groove 18 are adjustable, which can be applied to pipes of different pipe diameters. It is to be understood that this embodiment can be applied to any one of Embodiments 1 to 6.

Figure 43:
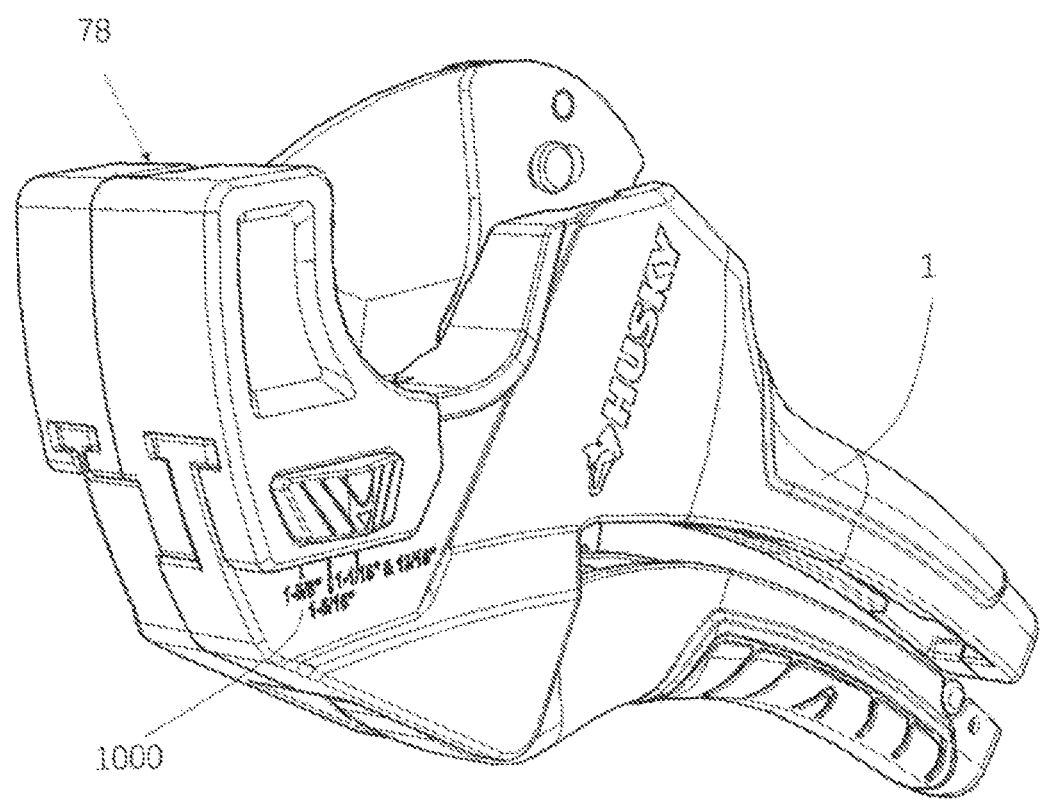
FIG. 43 is a schematic view of the overall structure of a cutting tool with movable portions according to Embodiment 7 of the present invention.
Figure 44:
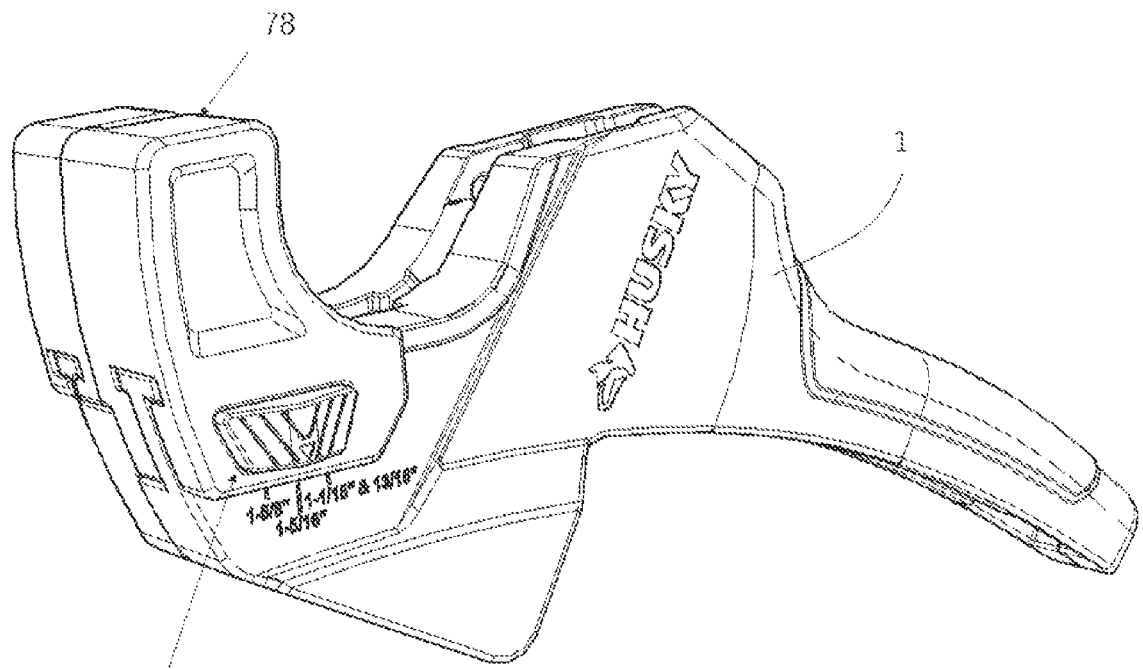
FIG. 44 is a schematic view of the overall structure of a first handheld portion with a movable portion according to Embodiment 7 of the present invention.
Figure 45:
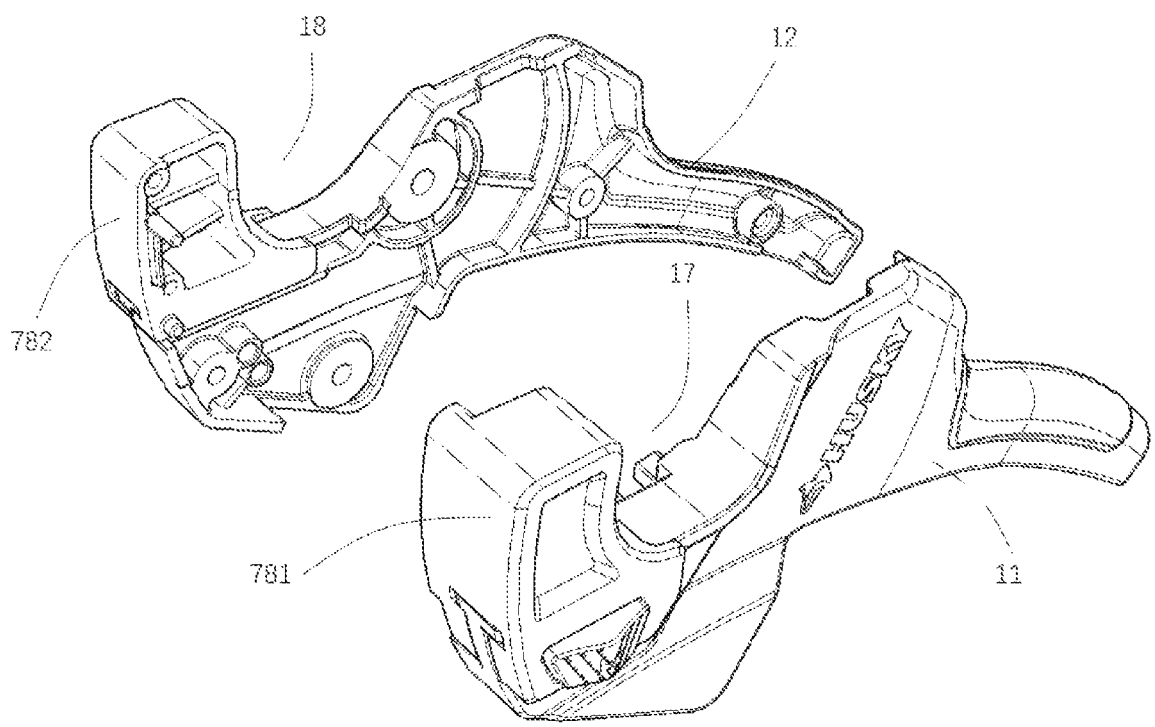
FIG. 45 is an exploded structural schematic view of a part of the first handheld portion according to Embodiment 7 of the present invention.

As shown in FIGS. 43 to 45, the cutting tool of this embodiment includes a movable portion 78 movably connected to the first handheld portion. Specifically, the movable portion 78 is provided on the end of the first handheld portion 1 mounted with a blade, and forms the grooves 17, 18 together with the first handheld portion 1 for accommodating the pipe to be cut. The movable portion 78 can move in a length direction of the first handheld portion 1 to adjust the sizes of the grooves 17, 18 between the movable portion 78 and the first handheld portion 1 to be suitable for pipes of different pipe diameters.

Figure 46:
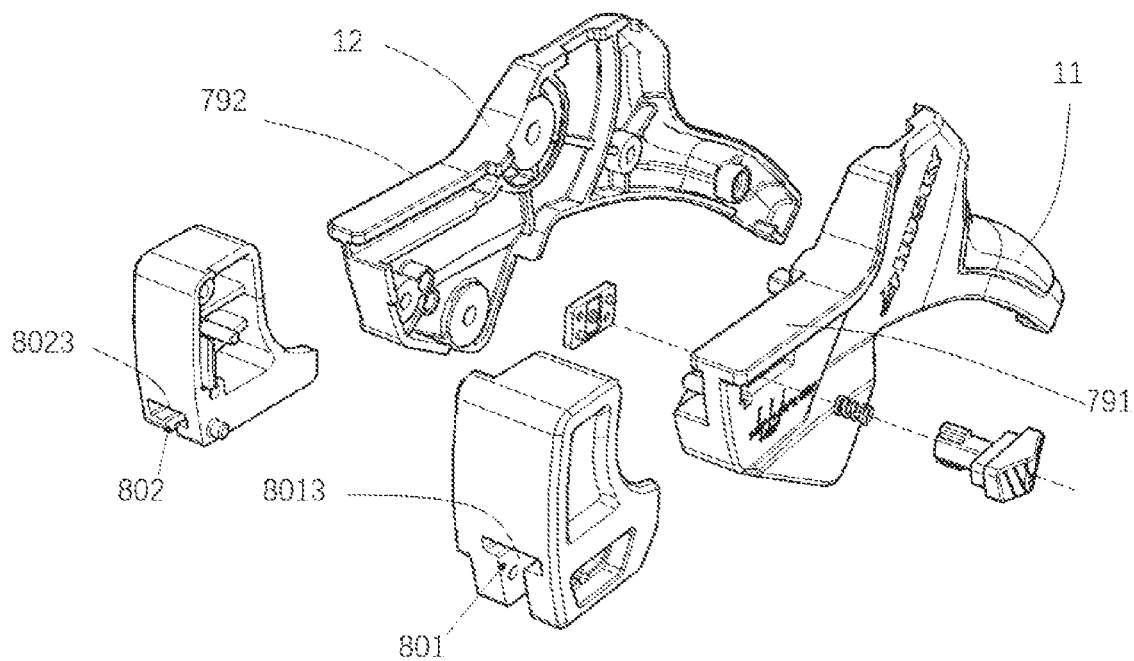
FIG. 46 is an exploded structural schematic view of the first handheld portion according to Embodiment 7 of the present invention.
Figure 47:
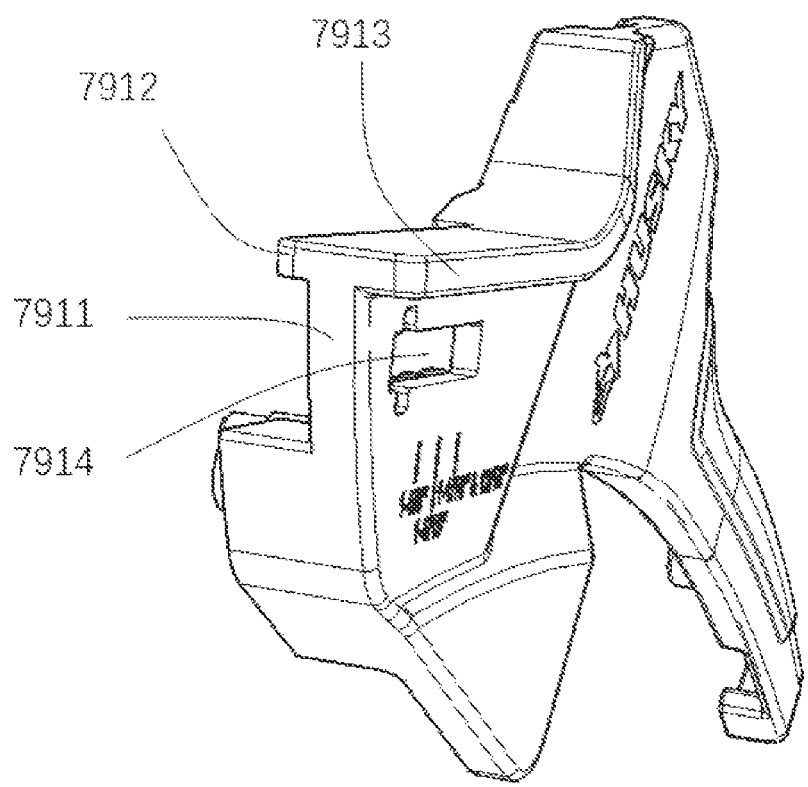
FIG. 47 is a structural schematic view of a first guide rail according to Embodiment 7 of the present invention.
Figure 48:
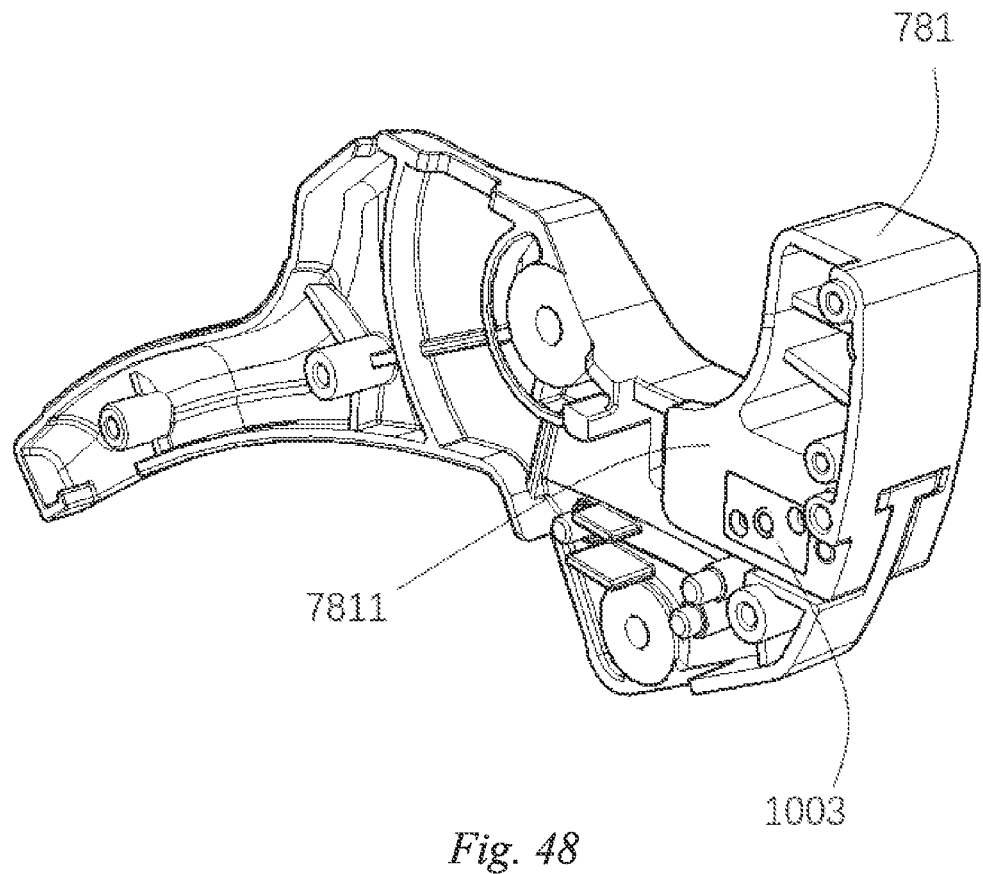
FIG. 48 is a schematic view of the assembly of the first side wall and a first movable portion of the first handheld portion according to Embodiment 7 of the present invention.

As shown in FIGS. 45 and 46, the movable portion 78 includes a first movable portion 781 and a second movable portion 782 which are provided oppositely, the first movable portion 781 is provided on a first side wall 11 of the first handheld portion, and the second movable portion 782 is provided on a second side wall 12 of the first handheld portion. The first movable portion 781 is combined with the first side wall 11 of the first handheld portion to form the first arcuate groove 17, the second movable portion 782 is combined with the second side wall 12 of the first handheld portion to form the second arcuate groove 18, and the first movable portion 781 and the second movable portion 782 can move in the length direction of the first handheld portion 1 simultaneously, so as to adjust the sizes of the first arcuate groove 17 and the second arcuate groove 18 simultaneously.

Referring to FIG. 46, a first guide rail 791 is provided at a joint between the first side wall 11 of the first handheld portion and the first movable portion 781, the first movable portion 781 is provided with a first chute 801 that cooperates with the first guide rail 791, and the first chute 801 is sleeved on the first guide rail 791, so that the first chute 801 can slide relative to the first guide rail 791, thereby adjusting the size of the first arcuate groove 17. The connection between the second side wall 12 of the first handheld portion and the second movable portion 782 is the same as the connection between the first side wall 11 of the first handheld portion and the first movable portion 781, that is, the second side wall 12 of the first handheld portion is provided with a second guide rail 792, the second movable portion 782 is provided with a second chute 802, the second chute 802 is sleeved on the second guide rail 792, and can slide relative to the second guide rail 792.

Specifically, a cross section of the first guide rail 791 is T-shaped, that is, the first guide rail 791 includes a first vertical portion 7911 and extends from a top end of the first vertical portion 7911 to both sides thereof to form a first side wing 7912 and a second side wing 7913. The first chute 801 corresponds to the first guide rail 791, and includes a first channel 8011 that cooperates with the first vertical portion 7911, and a first slot 8012 and a second slot 8013 that are perpendicular to the first channel and provided oppositely. When the first chute 801 is sleeved on the first guide rail 791, two side walls of the first channel 8011 correspond to both sides of the first vertical portion 7911 respectively, at least a part of the first side wing 7912 is located within the first slot 8012, and at least a part of the second side wing 7913 is located within the second slot 8013. Similarly, the second guide rail 792 and the first guide rail 791 have the same shape, and the second chute 802 and the first chute 801 have the same shape, which will not be repeated here.

As shown in FIG. 46, the first chute 801 penetrates through the first movable portion 781 in a length direction of the first movable portion 781, and a first opening 8013 is formed on an outer side wall of the first movable portion 781; and the second chute 802 penetrates through the second movable portion 782 in a length direction of the second movable portion 782, and a second opening 8023 is formed on an outer side wall of the second movable portion 782. In this way, the moving distance of the first movable portion 781 and the second movable portion 782 on the first handheld portion can be increased, and the sizes of the first movable portion 781 and the second movable portion 782 can be reduced, so that the structure of the cutting tool is more compact.

As shown in FIG. 43, the cutting tool of this embodiment further includes a locking assembly 100, the locking assembly 100 has two working states, and when the locking assembly 100 is in a first state, the locking assembly 100 locks the movable portion 78 at a preset position on the first handheld portion 1 to fix the movable portion 78, facilitating the completion of the cutting operation; and when the locking assembly 100 is in a second state, the locking assembly 100 unlocks the movable portion 78, and the movable portion 78 can move to a preset position in the length direction of the first handheld portion 1.

As shown in FIGS. 43 and 46, the locking assembly 100 can be provided at a joint between the first movable portion 781 and the first side wall 11 of the first handheld portion, or can be provided at a joint between the second movable portion 782 and the second side wall 12 of the first handheld portion. In this embodiment, the locking assembly 100 being provided at the joint between the first movable portion 781 and the first side wall 11 of the first handheld portion is taken as an example for description.

Figure 49:
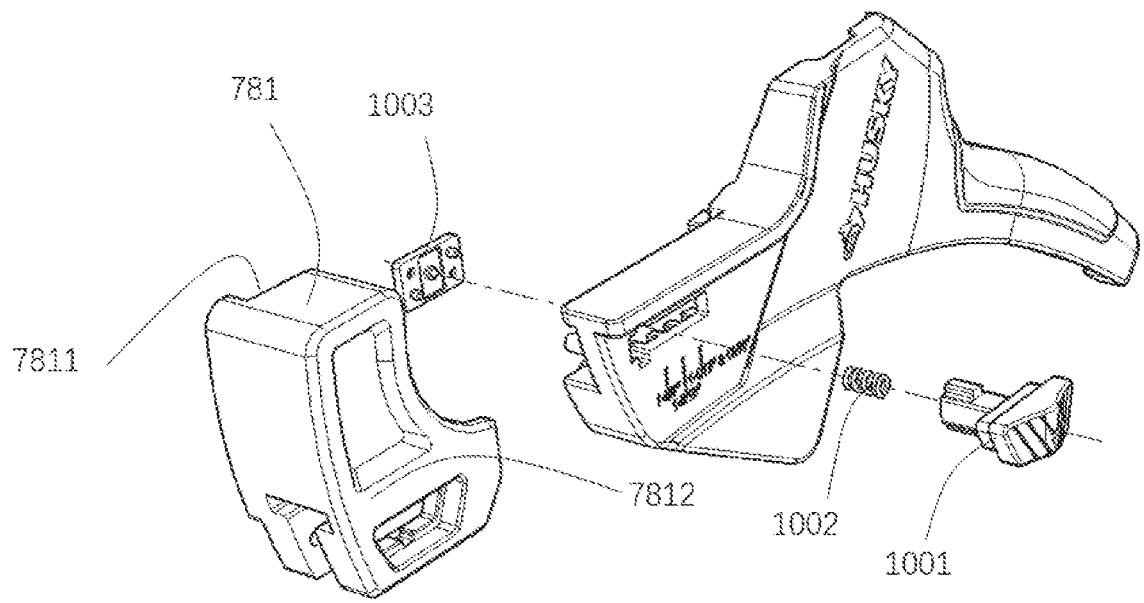
FIG. 49 is an exploded schematic view of the first side wall and the first movable portion of the first handheld portion according to Embodiment 7 of the present invention.

As shown in FIG. 49, the locking assembly 100 includes a button 1001, an elastic element 1002, and a blocking sheet 1003. The first movable portion 781 has a first side 7811 facing the second side wall 12 of the first handheld portion and a second side 7812 facing outward and opposite to the first side 7811. The blocking sheet 1003 is connected to the first side 7811 of the first movable portion 781, one end of the button 1001 successively penetrates through the first movable portion 781 and the first guide rail 791 from the second side 7812 of the first movable portion 781, and the elastic element 1002 is provided between the button 1001 and the blocking sheet 1003. When the button 1001 is not subjected to an external force, the locking assembly 100 is in the first state and locks the first movable portion 781 at the preset position of the first side wall 11 of the first handheld portion. When the button 1001 is pressed, the button 1001 moves in the direction of the blocking sheet 1003 and overcomes an elastic force of the elastic element 1002, so that the locking assembly 100 is in the second state, whereby the locking assembly 100 unlocks the first movable portion 781, an external force is applied to the movable portion 781 to move it, and the locking assembly 100 moves together with the first movable portion 781; and when the first movable portion 781 moves to a preset position, the button 1001 is released, the button 1001 is reset under the elastic force of the elastic element 1002, and the locking assembly 100 returns to the first state again.

Figure 50:
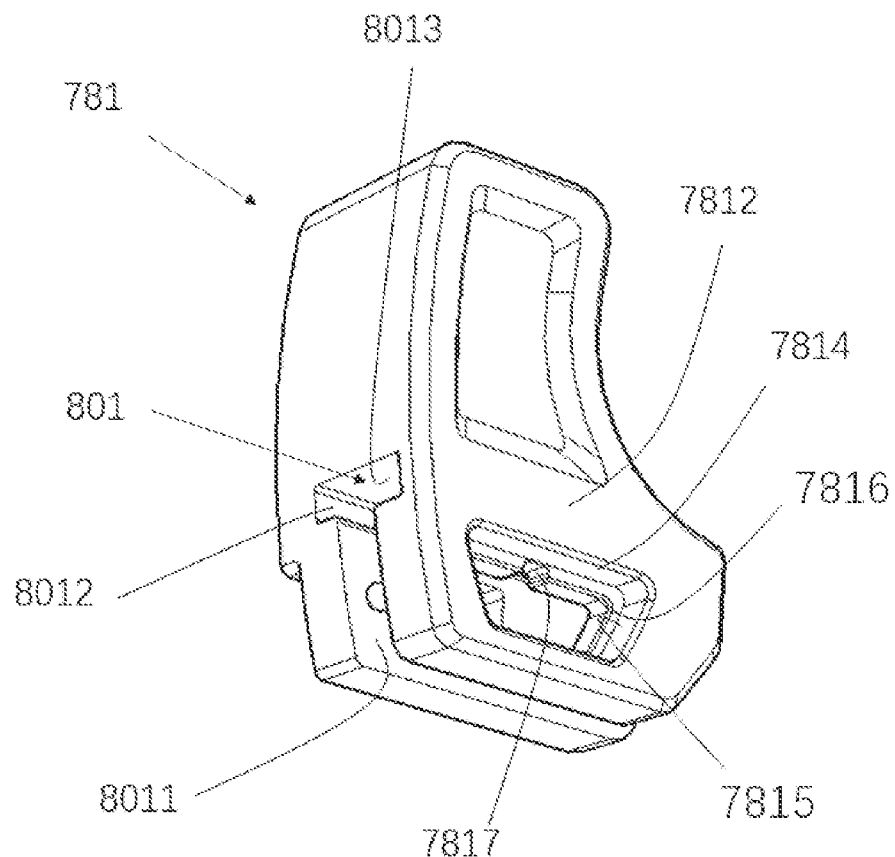
FIG. 50 is a structural schematic view of the first movable portion according to Embodiment 7 of the present invention.
Figure 51:
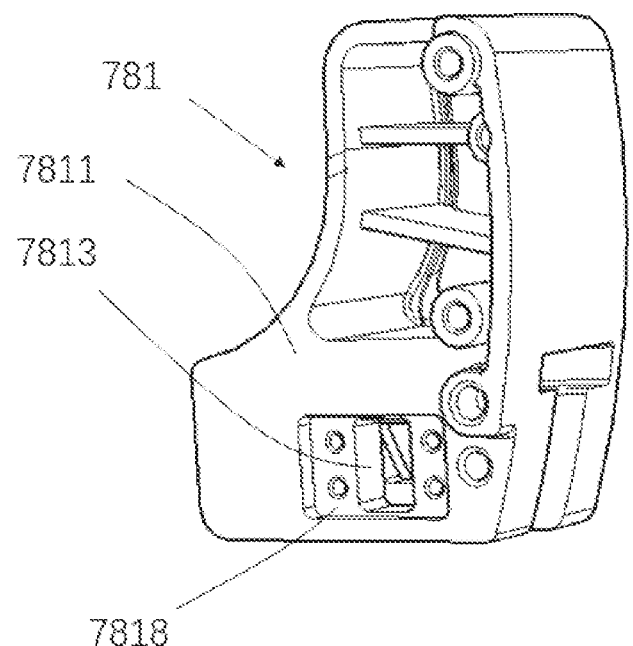
FIG. 51 is a structural schematic view of the first movable portion according to Embodiment 7 of the present invention from another perspective.
Figure 52:
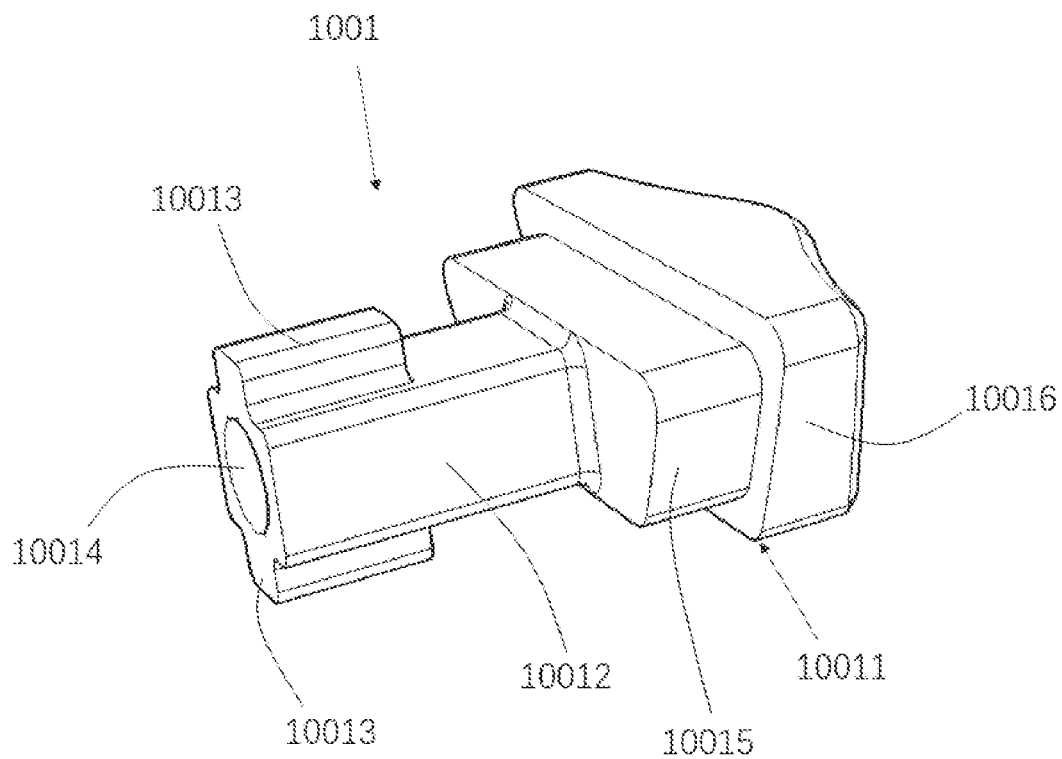
FIG. 52 is a structural schematic view of a button according to Embodiment 7 of the present invention.
Figure 53:
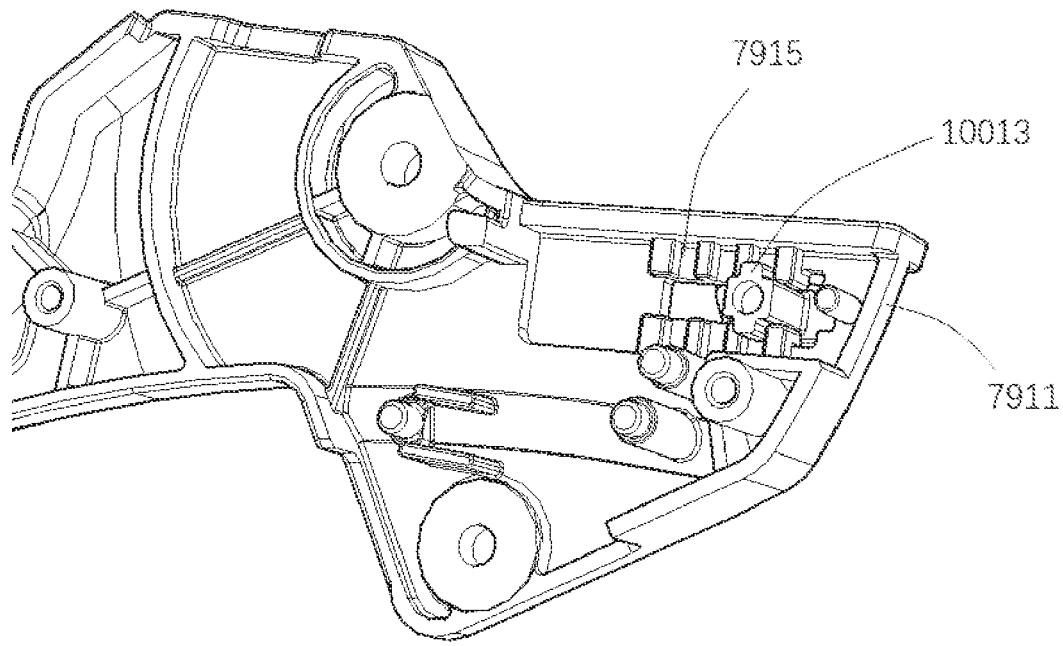
FIG. 53 is a structural schematic view when the button according to Embodiment 7 of the present invention is locked with the first side wall of the first handheld portion.
Figure 54:
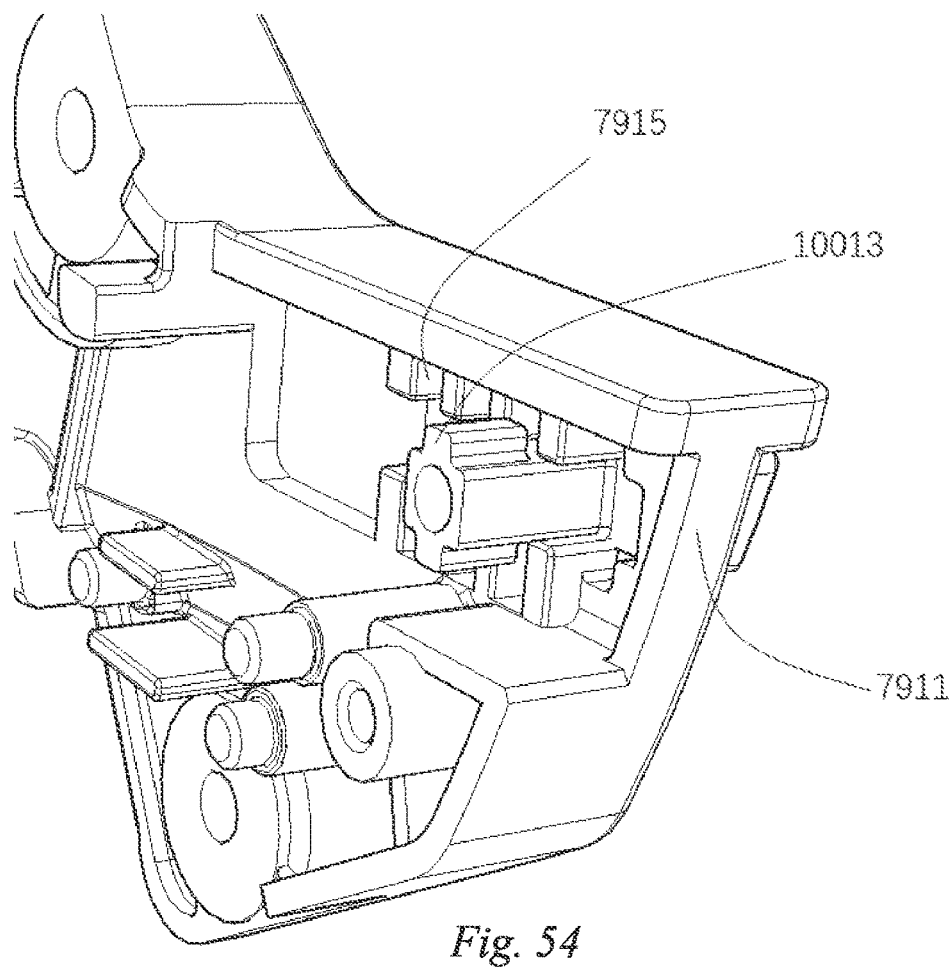
FIG. 54 is a structural schematic view when the button according to Embodiment 7 of the present invention is disengaged from the first side wall of the first handheld portion.
Figure 55:
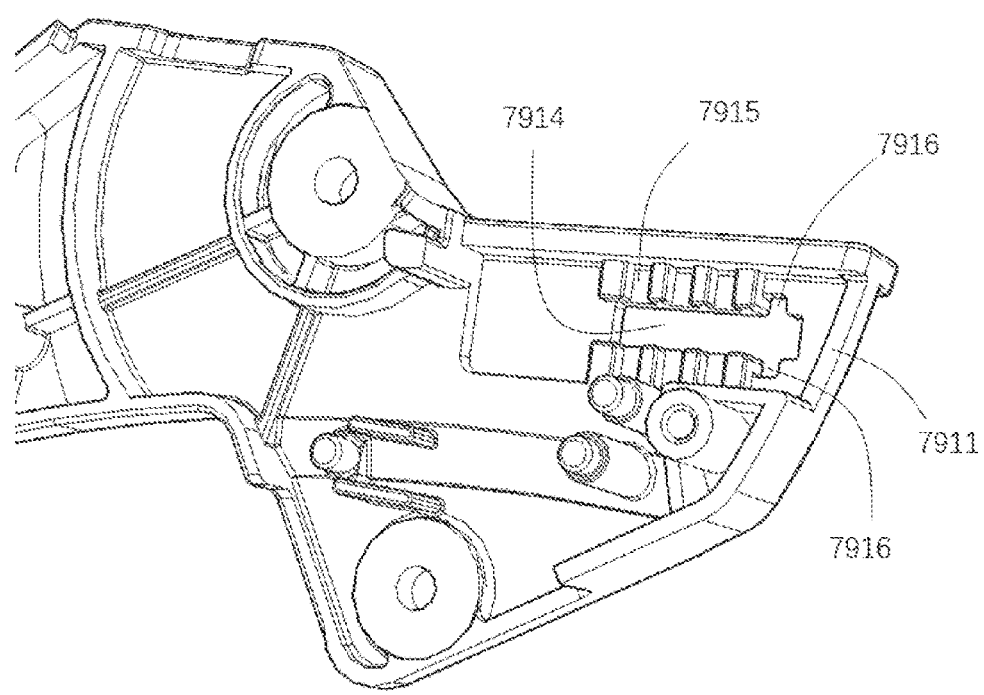
FIG. 55 is a structural schematic view of a limiting slot on the first side wall of the first handheld portion according to Embodiment 7 of the present invention.

As shown in FIGS. 50 and 51, the first movable portion 781 is provided with a first through hole 7813 and a second through hole 7814 which are opposite to each other, and one end of the first through hole 7813 is connected to the first channel 8011 and the other end thereof penetrates to the first side 7811; and one end of the second through hole 7814 is connected to the first channel 8011 and the other end thereof penetrates to the second side 7812, and the first vertical portion 7911 of the first guide rail 791 is provided with a third through hole 7914 that corresponds to the first through hole 7813 and the second through hole 7814. The button 1001 successively penetrates through the second through hole 7814, the third through hole 7914, and the first through hole 7813. When the button 1001 is pressed, the button 1001 can slide within the third through hole 7914 in a length direction of the first guide rail 791. As shown in FIG. 52, the button 1001 includes a pressing portion 10011, a guide post 10012, and at least one protruding portion 10013, and one end of the guide post 10012 is connected to the pressing portion 10011 and the other end thereof successively passes through the second through hole 7814, the third through hole 7914, and the first through hole 7813. The elastic element 1002 is a spring, the guide post 10012 is hollow inside and is provided with a fourth hole 10014, and one end of the spring is provided within the fourth hole 10014 and the other end thereof abuts against the blocking sheet 1003. Referring to FIGS. 53 and 54, the end of the guide post 10012 close to the blocking sheet 1003 is provided with at least one protruding portion 10013, and the size of the portion of the protruding portion 10013 provided with the guide post 10012 is greater than the height of the third through hole 7914, which can prevent the guide post 10012 from passing through the third through hole 7914 in the direction of the pressing portion 10011. The side of the first vertical portion 7911 facing the second side wall 12 of the first handheld portion is provided with several limiting slots 7915 arranged side by side in sequence, and when the locking assembly 100 is in the first state, the protruding portion 10013 is located within one of the limiting slots 7915, thereby locking the first movable portion 781 at the preset position. The guide post 10012 may be provided with only one protruding portion 10013, the protruding portion 10013 faces the direction of the first arcuate groove, and the limiting slots 7915 are located above the third through hole 7914. The guide post 10012 may also be provided with two opposite protruding portions 10013, with one protruding portion 10013 facing the direction of the first arcuate groove and the other protruding portion 10013 facing away from the first arcuate groove, and correspondingly, several limiting slots 7915 arranged side by side in sequence may be provided at positions corresponding to the protruding portions 10013 (as shown in FIG. 55, the limiting slots 7915 are provided above and below the third through hole 7914). As shown in FIG. 53, when the locking assembly 100 is in the first state, the two protruding portions 10013 both fall into the corresponding limiting slots 7915, which can increase the strength of the locking assembly 100 when it is locked. When it is necessary to unlock, the pressing portion 10011 is pressed, the elastic force of the spring is overcome, and the button 1001 moves in the direction of the blocking sheet 1003, and when the protruding portion 10013 is disengaged from the limiting slot 7915 (as shown in FIG. 54), the locking assembly 100 is in the second state, whereby the first movable portion 781 can be moved; and when the first movable portion 781 moves together with the locking assembly 100 until the protruding portion 10013 corresponds to another limiting slot 7915, the button 1001 can be released, and under the action of the elastic force, the protruding portion 10013 falls into the corresponding limiting slot 7915, and the button 1001 is reset.

As shown in FIG. 50, the second through hole 7814 of the first movable portion 781 is provided in a stepped shape, that is, the second through hole 7814 is divided into two portions: a first portion 7815 close to the pressing portion 10011 (away from the third through hole 7914) and a second portion 7816 close to the third through hole 7914, and the size of the first portion 7815 is greater than that of the second portion 7816 so that a step is formed between the first portion 7815 and the second portion 7816. Correspondingly, as shown in FIG. 52, the pressing portion 10011 is also formed in a stepped shape, specifically, the pressing portion 10011 includes a third portion 10015 and a fourth portion 10016, and the size of the third portion 10015 is smaller than that of the fourth portion 10016 so that a stepped shape is formed between the third portion 10015 and the fourth portion 10016, the size of the third portion 10015 matches that of the second portion 7816 of the second through hole 7814, and the size of the fourth portion 10016 matches that of the first portion 7815 of the second through hole 7814. When the button 1001 moves in the direction of the blocking sheet 1003, the third portion 10015 of the pressing portion 10011 moves within the second portion 7816 of the second through hole 7814, and the fourth portion 10016 of the pressing portion 10011 moves within the first portion 7815 of the second through hole 7814, and when the fourth portion 10016 of the pressing portion 10011 moves until it contacts the step of the second through hole 7814, the button 1001 is blocked and cannot continue to move, whereby the protruding portion 10013 on the guide post 10012 is disengaged from the limiting slot 7915. Since the third portion 10015 of the pressing portion 10011 matches the second portion 7816 of the second through hole 7814, the two are attached, so that the first movable portion 781 can move together with the locking assembly 100.

As shown in FIG. 55, in order to facilitate the removal and mounting of the locking assembly 100, one end of the third through hole 7914 in a length direction is provided with a third slot 7916 corresponding to the protruding portion 10013, and the depth of the third slot 7916 is at least greater than that of the protruding portion 10013. The second portion 7816 of the second through hole 7814 is provided with a corresponding fourth slot 7817, that is, a fourth slot 7817 is formed by recessing from a side wall of the second portion 7816. When the button 1001 moves to the position of the third slot 7916 within the first through hole 7813, the protruding portion 10013 can pass through the third through hole 7914 from the third slot 7916, so as to pass the guide post 10012 through the third through hole 7914; and then the protruding portion 10013 is passed out of the fourth slot 7817, and the button 1001 may be passed out of the second through hole 7814, thereby removing the button 1001. Conversely, when the button 1001 needs to be mounted, the protruding portion 10013 is successively passed through the fourth slot 7817 and the third slot 7916 to complete the mounting. When the button 1001 is provided with only one protruding portion 10013, the third slot 7916 and the fourth slot 7817 are correspondingly set to be only one; and when the button 1001 is provided with a first protruding portion 10013 and a second protruding portion 10013, two third slots 7916 are provided at corresponding positions of the through hole 7914, and two fourth slots 7817 are provided at corresponding positions of the second through hole 7814.

As shown in FIG. 51, the first side 7811 of the first movable portion 781 is also provided with a sunken slot 7818 for mounting the blocking sheet 1003. The blocking sheet 1003 is mounted within the sunken slot 7818 so that an outer surface of the blocking sheet 1003 is flush with the first side 7811, making the structure more compact. The blocking sheet 1003 can be fixed onto the first movable portion 781 by means of screws.

As shown in FIG. 43, in order to facilitate the display of a moving gear of the movable portion, the first side wall is also provided with scales 1000, which can display the pipe diameter of a pipe that can be applied to the movable portion at a current position.

When the sizes of the arcuate grooves need to be adjusted, the pressing portion 10011 is pressed, and the button 1001 overcomes the elastic force of the spring and moves in the direction of the blocking sheet 1003, and when the protruding portion 10013 on the button 1001 is disengaged from the limiting slot 7915, the locking assembly 100 is in the second state and releases the locking of the first movable portion 781. At this time, the movable portion can be moved in the direction of the guide rail, and when it moves to the preset position, the pressing portion 10011 is released, and under the action of the elastic force, the protruding portion 10013 falls into a corresponding limiting slot 7915, and the button 1001 returns to its original position, completing the locking of the moving portion.

The beneficial effect of this embodiment is to provide a blade-replaceable cutting tool, which can adapt to pipes of different pipe diameters while realizing rapid blade replacement, and can expand the application scope of the cutting tool.

The preferred specific embodiments of the present invention have been described in detail above. It is to be understood that numerous modifications and variations can be made by those ordinary skilled in the art in accordance with the concepts of the present invention without any inventive effort. Therefore, all technical solutions that can be obtained by a person skilled in the art based on the prior art through logical analysis, deduction, or limited experiments according to the concept of the present invention should fall within the protection scope defined by the claims.

The invention claimed is:

1. A blade-replaceable cutting tool, comprising:
   a first handheld portion;
   a second handheld portion rotatably connected to the first handheld portion;
   a cutting structure rotatably connected to the first handheld portion,
   wherein the cutting structure comprises:
   a blade mounting plate rotatably mounted to the first handheld portion; and
   a blade detachably mounted to the blade mounting plate; and
   a locking mechanism comprising a toggle component and an elastic component, wherein the elastic component is connected to the blade mounting plate and the toggle component respectively, and the toggle component is movably connected to the blade mounting plate, and the locking mechanism is configured that: the toggle component locks the blade on the blade mounting plate when the toggle component is in contact with the blade under an action of an elastic force of the elastic component, and the toggle component unlocks the blade when the toggle component overcomes the elastic force under an action of an external force and move to separate from the blade, so that the blade can be detached from the blade mounting plate;
   wherein the toggle component is a toggle sheet, the toggle sheet comprising a toggle portion, a latch portion and a bayonet portion, wherein the toggle portion is exposed to outside of the cutting structure from an edge of the cutting structure; the latch portion is configured to be snapped into a fixing bayonet of the blade, a fixing latch of the blade is configure to be snapped into the bayonet portion; the toggle sheet is configured that the toggle sheet locks the blade when the latch portion is snapped into the fixing bayonet of the blade and the fixing latch of the blade is configure to be snapped into the bayonet portion, and the toggle sheet is rotated relative to the cutting structure under the external force, so that the latch portion is separated from the fixing bayonet of the blade and the bayonet portion is separated from the fixing latch of the blade, thereby unlocking the blade.

2. The blade-replaceable cutting tool of claim 1, wherein the cutting structure further comprises:
   a first clamping plate attached and fixed to one side of the blade mounting plate; and
   a second clamping plate attached and fixed to the other side of the blade mounting plate,
   wherein a joint between the blade and the blade mounting plate is sandwiched between the first clamping plate and the second clamping plate.

3. The blade-replaceable cutting tool of claim 1, wherein the blade mounting plate comprises an elastic sheet mounting notch which opens to the toggle component; and the elastic component is provided within the elastic sheet mounting notch, one end of the elastic component is connected to the blade mounting plate, and at least a part of the elastic component is attached to the toggle component.

4. The blade-replaceable cutting tool of claim 2, wherein the toggle sheet is rotatably connected to the first clamping plate and the second clamping plate, one side of the toggle sheet is in contact with at least a part of the elastic component, and the elastic component exerts an elastic force on the toggle sheet to make the toggle sheet rotate towards the blade.

5. The blade-replaceable cutting tool of claim 3, wherein the blade mounting plate further comprises:
a body of the blade mounting plate having one end mounted with the blade; and
an arcuate plate provided on the other end of the body of the blade mounting plate; wherein
the elastic sheet mounting notch is provided on a side of the arcuate plate away from its arcuate side wall.

6. The blade-replaceable cutting tool of claim 5, wherein the arcuate plate is a part of a ratchet, which comprises:
ratchet teeth provided on the arcuate side wall of the arcuate plate; and
a ratchet tooth clearance provided between any two adjacent ratchet teeth,
wherein the second handheld portion is provided with a first buckle and/or a second buckle on a side facing the first handheld portion, which is snapped into any one of the ratchet tooth clearances.

7. The blade-replaceable cutting tool of claim 6, wherein the blade mounting plate comprises:
at least one latch of the blade mounting plate; and
at least one bayonet of the blade mounting plate which opens to the blade;
the blade comprises:
a ridge portion;
a cutting edge portion provided integrally with the ridge portion;
at least one latch of the blade snapped into a corresponding bayonet of the blade mounting plate; and
at least one bayonet of the blade snapped into a corresponding latch of the blade mounting plate;
the latch of the blade mounting plate is provided on one end of the body of the blade mounting plate opposite to the arcuate plate, and the bayonet of the blade mounting plate is provided between the latch of the blade mounting plate and the arcuate plate; and
the latch of the blade is provided at an edge of the blade and is provided opposite to the cutting edge portion, and the bayonet of the blade is provided between the latch of the blade and the cutting edge portion.

8. The blade-replaceable cutting tool of claim 1, further comprising a movable portion that is movably connected to one end of the first handheld portion mounted with the blade, and forms a groove for accommodating a pipe with the first handheld portion; and the movable portion is configured to be able to move in a length direction of the first handheld portion to adjust the size of the groove.

9. The blade-replaceable cutting tool of claim 8, further comprising a locking assembly provided at a joint between the movable portion and the first handheld portion, and the locking assembly is configured to lock the movable portion at a preset position of the first handheld portion when in a first state, and to unlock the movable portion when in a second state.

10. The blade-replaceable cutting tool of claim 9, wherein the movable portion comprises a first movable portion and a second movable portion that are provided oppositely, the first handheld portion comprises a first side wall and a second side wall that are provided oppositely, the first movable portion is movably connected to the first side wall, and the second movable portion is movably connected to the second side wall; and the locking assembly is provided at a joint between the first movable portion and the first side wall.

11. The blade-replaceable cutting tool of claim 10, wherein the first side wall comprises a first guide rail, and the first movable portion comprises a first chute that is sleeved on the first guide rail and configured to be movable in the first guide rail; and the second side wall comprises a second guide rail, and the second movable portion comprises a second chute that is sleeved on the second guide rail and configured to be movable in the second guide rail.

12. The blade-replaceable cutting tool of claim 11, wherein the locking assembly comprises a button, an elastic element, and a blocking sheet, one end of the button successively passes through the first movable portion and the first side wall and faces the blocking sheet, the elastic element is located between the button and the blocking sheet, and the button is configured to lock the first movable portion at the preset position of the first side wall when not subjected to an external force, and to be able to overcome an elastic force of the elastic element and move in the direction of the blocking sheet to unlock the first movable portion when subjected to the external force.

13. The blade-replaceable cutting tool of claim 12, wherein the first movable portion comprises a first through hole and a second through hole that are opposite to each other, and the first through hole and the second through hole are communicated with a first channel respectively; the first guide rail comprises a third through hole; and the button successively passes through the second through hole, the third through hole, and the first through hole, and is configured to be able to move in a length direction of the third through hole.

14. The blade-replaceable cutting tool of claim 13, wherein one end of the button facing the blocking sheet is provided with at least one protruding portion, and a side of the first side wall facing the second side wall is provided with a plurality of parallel limiting slots, the protruding portion is configured to lock the first movable portion at the preset position when falling into one of the limiting slots, and to be able to be disengaged from the one of the limiting slots when the button moves in the direction of the blocking sheet, so that the button can move in the length direction of the third through hole.

15. The blade-replaceable cutting tool of claim 14, wherein one end of the third through hole is provided with at least one slot recessed in the direction of the limiting slots, and the protruding portion of the button is configured to be able to pass through the slot from one side of the first guide rail to the other side of the first guide rail.

16. The blade-replaceable cutting tool of claim 13, wherein the second through hole is provided in a stepped shape and comprises a second portion close to the third through hole and a first portion away from the third through hole, and the inner diameter of the second portion is smaller than that of the first portion; and the button comprises a pressing portion, which matches the shape of the second through hole and comprises a third portion that matches the second portion and a fourth portion that cooperates with the first portion, and the button is configured to be blocked when moving toward the blocking sheet until the fourth portion is in contact with the second portion.

17. The blade-replaceable cutting tool of claim 8, wherein the first handheld portion is provided with scales to display the pipe diameter of the pipe that can be cut by the movable portion at a current position.

* * * * *